US010209963B2

(12) United States Patent
Hutchison

(10) Patent No.: US 10,209,963 B2
(45) Date of Patent: Feb. 19, 2019

(54) SYSTEMS AND METHODS FOR PARALLELIZATION OF PROGRAM CODE, INTERACTIVE DATA VISUALIZATION, AND GRAPHICALLY-AUGMENTED CODE EDITING

(71) Applicant: Luke Hutchison, Palo Alto, CA (US)

(72) Inventor: Luke Hutchison, Palo Alto, CA (US)

(73) Assignee: Luke Hutchison, Seoul (KR)

( * ) Notice: Subject to any disclaimer, the term of this patent is extended or adjusted under 35 U.S.C. 154(b) by 0 days.

(21) Appl. No.: 15/029,430

(22) PCT Filed: Oct. 21, 2014

(86) PCT No.: PCT/US2014/061440
§ 371 (c)(1),
(2) Date: Apr. 14, 2016

(87) PCT Pub. No.: WO2015/061239
PCT Pub. Date: Apr. 30, 2015

(65) Prior Publication Data
US 2016/0291942 A1    Oct. 6, 2016

(51) Int. Cl.
*G06F 9/45*    (2006.01)
*G06F 8/30*    (2018.01)
(Continued)

(52) U.S. Cl.
CPC ............ *G06F 8/314* (2013.01); *G06F 3/0608* (2013.01); *G06F 3/0631* (2013.01);
(Continued)

(58) Field of Classification Search
USPC ....................................................... 717/141
See application file for complete search history.

(56) References Cited

U.S. PATENT DOCUMENTS 5,704,053 A   12/1997  Santhanam
6,128,773 A   10/2000  Snider
(Continued)

OTHER PUBLICATIONS

PCT/US14/61440, Written Opinion of the ISA, filed Oct. 21, 2014.
(Continued)

*Primary Examiner* — Chuck O Kendall
(74) *Attorney, Agent, or Firm* — Paul Roberts

(57) ABSTRACT

A system for providing a computer configured to read an immutable value for a variable; read the value of the variable at a specific timestamp, thereby providing an ability to create looping constructs; set a current or next value of a loop variable as a function of previous or current loop variables; read a set of all values that a variable will assume; push or scatter the values into collections; reduce the collections into a single value; display graphical node representations to indicate computed values next to corresponding source code lines in an editor, and edge representations to indicate dependencies between values; visualize data output by a given node; permit the user to reorder source code lines by dragging nodes; cache or memoize computed values, and reuse cached or memoized values to implement reactive programming, minimizing recomputation in response to changes to program or data.

46 Claims, 34 Drawing Sheets

(51) Int. Cl.
*G06F 8/34* (2018.01)
*G06F 8/41* (2018.01)
*G06F 3/06* (2006.01)

(52) U.S. Cl.
CPC ............ *G06F 3/0673* (2013.01); *G06F 8/311* (2013.01); *G06F 8/34* (2013.01); *G06F 8/41* (2013.01); *G06F 8/451* (2013.01); *G06F 8/433* (2013.01)

(56) References Cited

U.S. PATENT DOCUMENTS

| | | | |
|---|---|---|---|
| 7,107,585 B2* | 9/2006 | Berent | .................... G06F 8/447 714/E11.205 |
| 2003/0221121 A1 | 11/2003 | Chow | |
| 2009/0113185 A1 | 4/2009 | Hansen et al. | |
| 2010/0199257 A1 | 8/2010 | Biggerstaff | |
| 2012/0324141 A1 | 12/2012 | Seong et al. | |
| 2013/0159981 A1 | 6/2013 | Klemenz et al. | |

OTHER PUBLICATIONS

Toda, T. et al. 'Parallel, Distributed, and Differential Processing System for Human Activity 41 Sensing Flows', Session: International Workshop on Human Activity Sensing Corpus and Its Application (HASCA2013), UbiComp'12, Sep. 8-12, 2013, Zurich, Switzerland; Publication [online]. Sep. 2013 [retrieved Feb. 18, 2015]. Retrieved from the Internet: <URL: http://www.ubicomp.org/ubicomp2013/adjunctladjunct/p689.pdf>: pp. 689-699.

Brett Victor, "Inventing on Principle," https://vimeo.com/36579366. Feb. 10, 2012.

Chris Granger, "Light Box," http://www.kickstarter.com/projects/ibdknox/light-table. Apr. 17, 2012.

Luke Hutchison, "Solving the Multicore Dilemma," http://www.flowlang.net/p/solving-multicore-dilemma.html. Mar. 10, 2012.

Luke Hutchison, "The Flow Manifesto," http://www.flowlang.net/p/flow-manifesto.html. Nov. 15, 2010.

* cited by examiner

SYSTEMS AND METHODS FOR PARALLELIZATION OF PROGRAM CODE, INTERACTIVE DATA VISUALIZATION, AND GRAPHICALLY-AUGMENTED CODE EDITING

BACKGROUND OF THE INVENTION

Imperative programming languages such as C, C++, Java and Python are the workhorses of software engineering, but by default generate code that runs on only a single CPU core. Pure functional languages such as Haskell can be automatically parallelized, but are difficult for the majority of programmers to use productively, as evidenced by the limited adoption of pure functional languages in production environments. This patent covers a new class of languages known as "lattice-based languages" that is a strict superset of the pure functional paradigm and a strict subset of the imperative paradigm, retaining both the automatic parallelization property of pure functional languages and the practical usefulness of imperative languages.

Integrated Development Environments (IDEs) facilitate the editing of program code by providing to a programmer facilities that go beyond direct editing of program source, such as mechanisms for understanding the relationship between parts of a program (e.g. cross-linking a symbol with its definition), transforming a program's source code in useful ways (e.g. allowing for all usages of a variable to be renamed in a single operation), and for integrating the debugging of a program at runtime with the same environment used to edit the source code before compiling and/or running the code. IDEs that display a program as text miss an opportunity to display program structure to a programmer in graphical form, however IDEs that use a purely graphical representation for program editing are difficult for programmers to reason about quickly. This patent covers an IDE that augments the text display of a program in a lattice-based language with a graphical display of data dependencies between expressions in the program.

Functional reactive programming has been used in spreadsheets and some programming systems to reduce the amount of computation required to compute a final result by caching or memoizing intermediate values, such that when a part of the spreadsheet or program is changed, only those things that depend upon that changed part (or things that depend on them) need to be recomputed. This patent extends the use of functional reactive programming to lattice-based languages, and covers the use of functional reactive programming in an IDE for lattice-based languages.

SUMMARY

Configurations in the current application provide a system for parallel programming that may be implemented as a language. The system may be able to automatically parallelize code by turning a program written by a programmer into a Directed Acyclic Graph (DAG) of parallel computing operations, requiring little or no extra effort on the part of the programmer to produce optimized or partially optimized parallel code while preventing race conditions and deadlocks.

Methods and systems for providing an integrated development environment are provided. The methods and systems describe an environment that can in some configurations display a DAG, nodes, and edges along with corresponding source code.

Methods and systems for providing differential compilation and reactive programming are provided.

A difference between existing parallel computing systems is whether the system is implemented as a library or a language. For example, TBB, Storm and FlumeJava are libraries, and Apache Pig's language Pig Latin is an example of a parallel computing language. Fundamentally, library solutions designed for producing computational DAGs suffer from the following major shortfalls:

1. Calling library routines to construct the DAG structure usually litters a program with a significant amount of boilerplate function calls, and in most languages can result in a large amount of boilerplate type information scattered through the program.
2. Most parallel computing libraries of this form are built on (and can be called from) imperative languages like C++ and Java, in which it is possible for code to act badly and violate any parallelization safety guarantees offered by the library, causing race conditions, deadlocks, crashes etc.
3. The DAG structure must be manually constructed by the programmer after carefully considering the data dependencies in the problem that is being implemented; it is possible for the programmer to miss a data dependency in some circumstances, resulting in an unstable or incorrect program, and/or it is possible or likely that the DAG structure created by a human may not be the fastest structure for the system to execute.
4. Libraries offer no parallelization opportunities at a finer grained resolution than the operations defined by the programmer, because the system has no way of introspecting within those operations. In particular, optimization logic is able to group together functions or operations for optimality purposes (as in FlumeJava, which can use profile-guided optimization at runtime to regroup operations that should run on a single node to increase computational efficiency), but these systems cannot break operations into sub-operations if needed to achieve better load balancing: to achieve maximum use of available processing resources, the compiler may need to break operations into smaller pieces than the resolution of DAG nodes presented to the runtime system by the programmer. (A good illustration of this is a DAG-structured data analytics system like KNIME, where each DAG node can represent the KNIME shell launching a monolithic single-threaded program to handle one stage of data processing. KNIME knows nothing about what is in each "black box", and cannot parallelize within those boxes, so is limited to running jobs in parallel if they do not depend on each other's output.)
5. Libraries for parallel computation on DAGs can only apply a limited amount of static (compile-time) optimization to the structure of the DAG itself (e.g. to reduce redundant computations) for the same reason. Opportunities for applying graph-based compiler optimizations are limited when the DAG is only known at coarse resolution.

These shortfalls are mitigated when a parallel computing system is implemented as a language rather than as a library. However, previous parallel computing languages have been difficult to use or are not general-purpose in nature, so are limited in the range of problems they may be employed to solve. The computing system described in this patent presents a method for constructing a compiler for a general-purpose parallel computing language that solves these issues.

BRIEF DESCRIPTION

DETAILED DESCRIPTION

Figure 1:
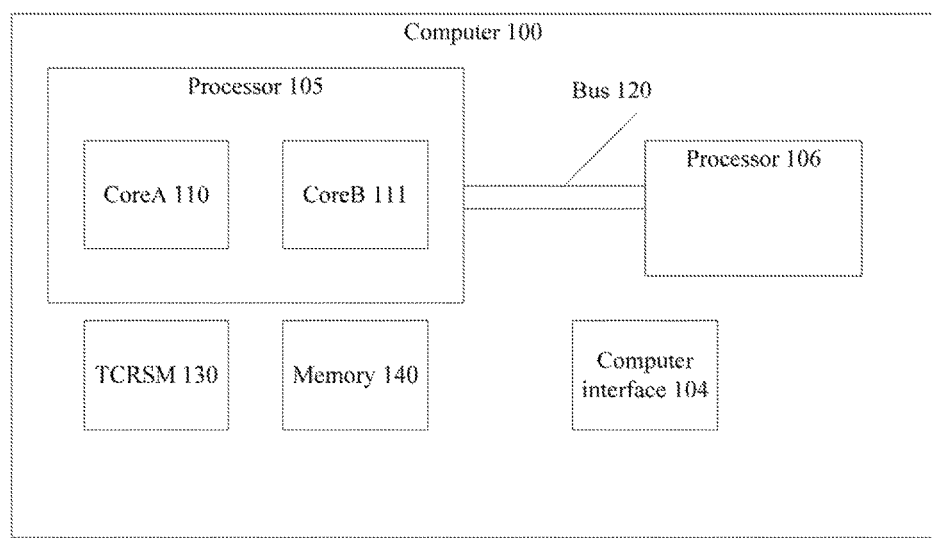
FIG. 1 is a schematic illustration of a computer and a language storage device.
Figure 1:
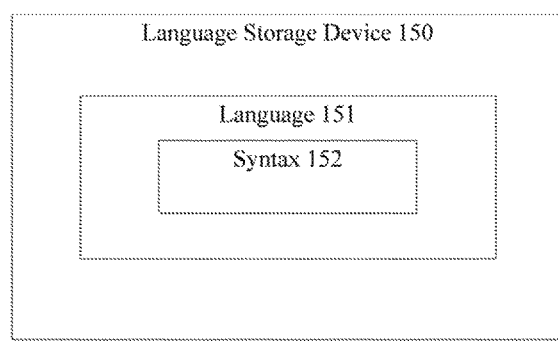

The following explanations of the bold faced terms is intended to be exemplary only to help familiarize the reader with some of these terms. This glossary is not intended to be limiting to the claims.

A node may refer to an element of a graph, in some configurations to a particular element in a Directed Acyclic Graph or DAG. A node may represent both a computational operation (the "top half" of the node, which is a function or expression) and the value or collection of values produced by the computational operation (the "bottom half" of the node, which is the result of the function or expression). Nodes may also only include a top half or bottom half. Nodes may be connected to other nodes by edges if the expression in the top half of a node depends upon (or takes as parameters) values or collections of values in the bottom half of other nodes.

An edge or are may refer to a directed edge. A directed edge may be a connecting element in a graph that links one node to another in a specific order, e.g. A→B represents an edge from node A to node B (the edge is "outgoing" from the point of view of A and "incoming" from the point of view of B). In practical terms, an edge may be implemented in a number of ways, for example as a memory reference, a variable lookup, a database query, a network communication, an inter-process communication, or an inter-processor communication.

A path may refer to a directed path. A directed path may be embodied as a connected sequence of one or more directed edges that lead from an initial node to a final node. If the path consists of only one edge, e.g. A→B, it is a "simple path"; if it passes through one or more intermediate nodes, e.g. A→B→C→D (also written A→ . . . →D), it is a "complex path".

Upstream may refer to nodes earlier (prior) in a directed path, and downstream may refer to nodes later (subsequent) in a directed path. For example, in the path A→B→C, the node A is upstream of both B and C, and the node C is downstream of both A and B.

A Directed Acyclic Graph (DAG) may be a graph of nodes and arcs. The arcs may branch outwards from nodes in a tree-like formation, except that individual branches of the tree-like structure may merge together (coalesce) downstream. For example, there may be directed edges between nodes A→B and A→C (both edges branch outwards from A), but if there are also directed edges from B→D and C→D, then the two unique complex paths from A coalesce at D. The underlying graph structure of a DAG may appear to contain cycles if the edges are considered as undirected edges, but there can be no cycle when considering the edges as directed: it is not possible to start at a node A and follow a directed path back to A.

A DAG-structured graph may be a graph that is a DAG.

A partial ordering may be an ordering that may impose constraints between some pairs of elements or nodes (e.g. "X is upstream of Y", meaning there is a directed path from X to Y), but not between other pairs of elements (e.g. "P is neither upstream nor downstream of Q", meaning there is no directed path from P to Q or from Q to P). A DAG is a partial ordering if the edges in the DAG follow the arrow of time, such that for any path X→ . . . →Y, X occurs before (or must be computed before) Y. If there is no directed path between two nodes P and Q, then there is no constraint on the relative ordering of P and Q: P may occur before (or may be computed before) Q or vice versa, or they may occur (or be computed) concurrently.

A data dependency graph (DDG) may be a graph of which values in a program are computed from which other values, or equivalently, which values (dependant values) must be computed before which other values (data dependencies or dependencies). (Note the distinction here between actual computed values, and variables or memory locations, which may only hold or refer to values.) Since a value cannot be computed before the values it depends upon are computed, a data dependency graph induces a partial ordering, i.e. a data dependency graph is a DAG, and the DAG is a partial ordering.

A lattice may be a partially ordered set in which every two elements have a supremum (also called a least upper bound or join) and an infimum (also called a greatest lower bound or meet). Restated, a lattice is a DAG that has a "furthest upstream" node and a "furthest downstream" node, and where there is some path from the "furthest upstream" node to the "furthest downstream" node that passes through any given node in the lattice. If we add a node to the data dependency graph of a program that represents the initial state of the program (representing all constants and fixed inputs to the program) and another node that represents the final state of the program (representing all outputs from the program), then after pruning away any unused computations (nodes that represent computations whose results do not have a path to the final state), the data dependency graph forms a lattice.

An implicitly parallel programming language may be a language that can be automatically parallelized by a compiler or runtime with little or no configuration or work or attention to parallelization concerns required of the programmer.

A programming language paradigm or paradigm may refer to a fundamental style of computer programming, i.e. a specific method for building the structure and elements of computer programs, e.g. an imperative programming language paradigm or a functional programming language paradigm.

An imperative programming language paradigm or programming language may relate to one or more of a mainstream class of programming languages, or a language in that class, including C/C++, Java, Python, Javascript and many others, in which functions are not "pure" or have access to mutable external state, meaning that calling a function twice with the same parameters may not produce the same result, and/or may have "side effects" of interacting with other code indirectly through external mutable state. Imperative languages are not implicitly parallel. For imperative languages, it is difficult to fully determine the structure of this data dependency graph without running the program, in other words, it can be difficult to statically determine (to determine at compile time) the specific origin of some values computed by the program. It is possible to introduce race conditions into parallel programs written in imperative languages, wherein one value or another will be read by a specific instruction in a program depending on the precise timing of when the instruction is executed.

A (pure) functional programming language paradigm or programming language may relate to a class of programming languages that deals with immutable values, or a language in that class, in which functions are "pure" or do not have access to mutable external state, disallowing "side effects," such that calling a function twice with the same parameters will always produce the same result. Haskell is the most well-known example of the pure functional paradigm. The pure functional paradigm is a strict subset of the imperative paradigm (making the imperative paradigm a strict superset of the imperative paradigm), in that the pure functional paradigm is missing some syntactical and semantic features that are included in the imperative paradigm. Functional languages are implicitly parallel, but many programmers find it difficult to be productive in the pure functional paradigm.

A declarative programming language paradigm or programming language may relate to a class of programming languages, or a language in that class, that describes what should be computed without necessarily describing how it should be computed. A functional programming language may be a declarative language, but declarative languages are not necessarily purely functional. Apache Pig's language Pig Latin is an example of a declarative language for parallel computing.

A lattice-based paradigm/lattice paradigm/lattice-based programming language corresponds with the system described in this patent, and refers to a class of programming languages that is syntactically constrained such that the data dependency graph of the program is statically determinable, allowing the compiler to identify the data dependency graph at compile-time, and to determine at compile-time whether the dependency graph is a DAG. This class of languages may be a strict superset of the functional paradigm and a strict subset of the imperative paradigm, i.e. may include syntactic or semantic features that are not present in the functional paradigm, and may exclude syntactic or semantic features that are present in the imperative paradigm. Lattice-based programming languages are implicitly parallel but are designed to be familiar to programmers of imperative languages by including some imperative-like features that are missing from pure functional languages, such as looping, and the ability to push values into collections.

A lattice paradigm syntactic constraint (LPSC) is a specific constraint that must be imposed on the syntax of an imperative language or a set of one or more additional features that must be added to a functional programming language to produce a lattice-based programming language.

A statically determinable assertion about a program may refer to a fact about the program that can be determined at compile-time, or that can be determined without necessarily executing the code in full. "Statically determinable" may mean "algebraically determinable" or "statically determinable in algebraic or symbolic form", meaning that a precise assertion about a value or set of values can be reasoned about at compiletime, even if the actual values that will be computed are not known until the code is executed. For example, the compiler may be able to track where x[t] (version t of variable x) was computed and what expressions depend upon it, distinguishing it from x[t−1], even if the precise values x[t] and x[t−1] cannot be known without running the code.

MapReduce may refer to a type of parallel computing paradigm in which computations are represented using one or both of the operational building blocks or stages known as Map and Reduce, and which may also optionally include other operations before or after Map or Reduce operations such as Shuffle and GroupByKey. The Map stage can take a collection of key-value pairs or tuples $(k_1,v_1)$ and applies a mapper function to each pair, producing zero or more tuples $(k_2,v_2)$. The keys $k_2$ can be hashed, and using the hash key, the pairs may then be redistributed by the Shuffle operation into shards for load leveling purposes. The GroupByKey operation may be used to find all $(k_2,v_2)$ pairs that share a matching key, grouping the corresponding values for each unique key into a collection and producing a new collection of pairs $(k_2,\{v_2\})$ mapping the unique keys to the collection of corresponding values. The Reduce stage takes all the values $\{v_2\}$ corresponding to a specific given key $k_2$ and applies a reduce or fold operation (a reducer function) to the collection to aggregate the set of values in some way, producing zero or more output values $v_3$, and outputting these values as key-value pairs $(k_3,v_3)$.

A DDG Node Result may comprise a single value or a non-empty collection of values, where a collection may be a list, map, set, multiset, bag, tree, DAG, graph or other data structure.

A compiler-interpreter is a system configured to accept a program in source code form, checking the program against a defined syntax, reporting an error if the program does not conform to the syntax, or compiling or interpreting the program if it does conform to the syntax. Compiling or interpreting the program may comprise generating a parsed representation of a program, building a Data Dependency Graph (DDG), checking the dependencies between values that are to be computed by the program to ensure the data dependencies are statically determinable and that the DDG contains no cycles, ensuring the DDG is structured in the form of a Directed Acyclic Graph (DAG). If the DDG is not a Directed Acyclic Graph, the compiler-interpreter may be configured to report an error, otherwise and if the structure of the DDG is a DAG, the compiler-interpreter may be examined to find pairs or groups of values that do not depend upon one another, indicating that the values can be computed in parallel. These pairs or groups of values that do not depend upon each other are marked as executable in parallel, forming a parallel execution plan. The compiler-interpreter may either execute the instructions in the parsed representation of the program directly, or it may generate compiled instructions in a lower-level representation for later execution by the processor or a runtime environment, or by an Integrated Development Environment (IDE), or by the compiler-interpreter itself (collectively, the "execution environment").

The execution environment may be configured to accept a program in source form, parsed form or object code form, a parallel execution plan, and a set of program inputs, and to cause a target hardware platform to execute parts of the program that do not depend upon one another in parallel according to the parallel execution plan.

As shown in FIG. 1, a computer (100) is shown comprising a processor (105). The processor may comprise one or more cores (110 and 111) capable of executing instructions. The computer may comprise a computer interface 104 for receiving commands and may include peripherals such as a keyboard, mouse, and related hardware. The computer may comprise tangible computer readable storage media (130) connected to the processor (105) and a communications bus (120) or network interface for connecting the processor (105) to one or more additional processors (106). The storage media (130) may comprise instructions to cause the processor (105) to generate (200P) in memory (140) a compiler-interpreter (200) for a language (151) stored in a language storage device (150). The language (151) may conform to a syntax (152).

The computer (100) may comprise a plurality of processors, microprocessors, logic chips, logic arrays, FPGAs, ASICs, etc. . . . essentially circuits capable of executing software code. The tangible computer readable storage media (130) may be a hard drive, network attached storage, flash drive, RAM, database, or other system designed to store data. The computer may be embodied as a desktop computer, server, laptop, smart phone, watch, SOC, embedded device, coprocessor or other computing device. Some embodiments may comprise an attached display, integrated display, or no display. The computer may also comprise memory (130) such as RAM, DRAM, swap space, SDRAM, RDRAM, MRAM, flash, magnetic storage or other storage medium used to store code, objects, and data used by, created by, or stored by the processor. Some computers can be constructed with memory in which case the computer uses the computer readable media as storage space, and some computers can be constructed without computer readable storage media, in which case the computer may store and read data from the memory. As a consequence, an exemplary process shown to be stored or connected the tangible computer readable media, could also be stored or connected to the memory and vice versa. The processor may take data from the computer readable storage media and store into memory 140 or vice versa. The computer may also comprise a network interface, wireless network interface including Wifi, Bluetooth or other interface, etc., and this interface or bus may be used to send communications and synchronization commands between different computers or processors. The computer may be embodied as a single computer, as a parallel computing system (a GPU or set of GPUs, a multicore system, etc.), or as an array of computers (computing cluster, datacenter, cloud platform, cluster of networked virtual machines, etc.)

Figure 2:
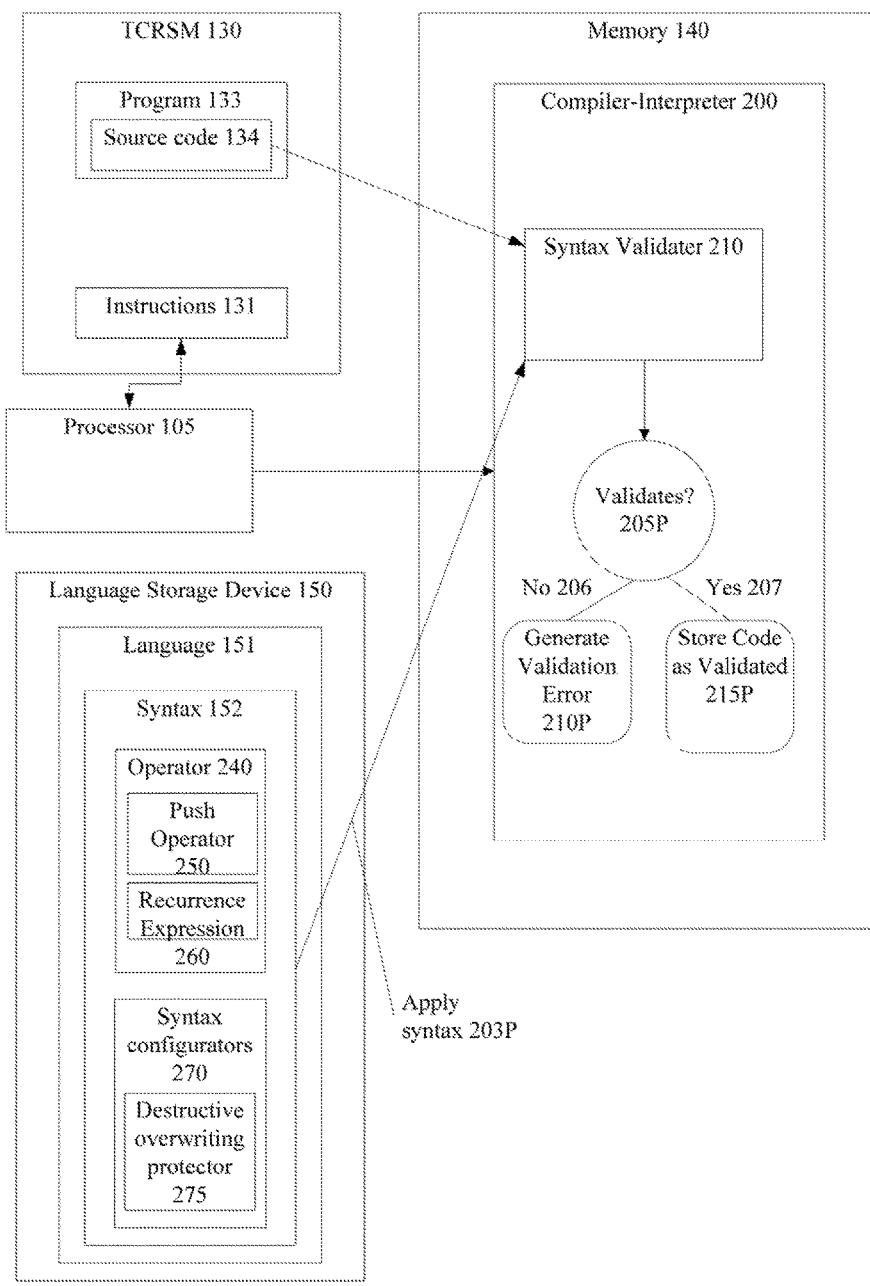
FIG. 2 is a schematic illustration of a syntax validator validating source code.

As shown in FIG. 2, the compiler-interpreter (200) may comprise a syntax validator (210) configured to apply (203P) the syntax (152) of the language (151) to source code (134) of a program (133) written in the language (151) to validate (205P) the program (133). The syntax (152) may include one or more operators (240) selected from the group consisting of: a push operator (250) and a recurrence expression (260). The syntax (152) may have syntax configurators (270) set such destructive overwriting protector 275 to prevent destructively overwriting (i.e. destructive data writing protection) a current value of a variable or memory location. The syntax validator may be configured to store (215P) the source code 134 as validated if the validation is true (yes) 207 and generate a validation error (210P) if the validation is false (no) 206. Destructively overwriting a current value of a variable or memory location can be defined as writing over a value stored in a variable or memory location without keeping a copy of the value in the variable or memory location at the time the value is written. Functional programming language operators are pure functions, defined as functions that always return the same value when called with the same parameter or parameters, as well as conditional logic and operators for building and working with data structures such as lists. Imperative programming language operators include functional programming language operators and additional operators for setting the current value of a variable or memory location and reading the current value of a variable or memory location, as well as non-functional methods or procedures that may read from or write to a variable or memory location outside of the scope of the method or procedure, including an instance variable in an object oriented language.

A computer language has two chief components, syntax and semantics, that provide instructions to a computer on how to process or manipulate data. In many computer languages, the code is a written in a syntax that humans can understand, and then a compiler transforms the code into machine executable binary. The language is the set of rules and instructions that the compiler work from to transform the source code into binary. If the code is not written in the correct syntax, the code won't compile correctly. If the code is written in correct syntax, but the programmer doesn't understand the semantics of the code he or she has written, the code will compile but not perform as expected. Installing a language onto a computer, includes adding instructions to the storage media of the computer that tells the computer how to interpret or compile and execute a program written in that language. These instructions may be integrated into the instructions of the operating system of the computer. In many cases, languages will also include packages or libraries—groups of portable or reusable code that the programmer can utilize without having to "reinvent the wheel". A program conforms to the syntax of a language if it follows the rules of the language, and may be completely and correctly parsed by a compiler-interpreter for the language to produce a program that executes the program represented by the source code of the language. A program is valid if it conforms to the syntax of the language that the program is written in.

Figure 3:
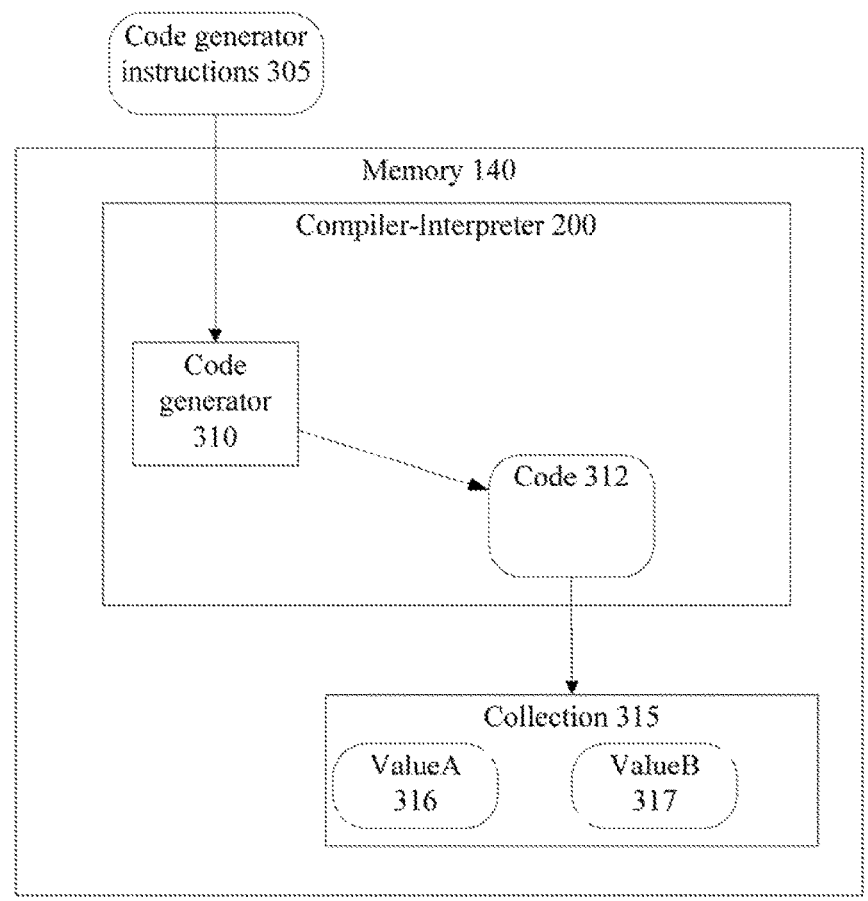
FIG. 3 is a schematic illustration of a code generator generating code to store values in a collection.
Figure 4:
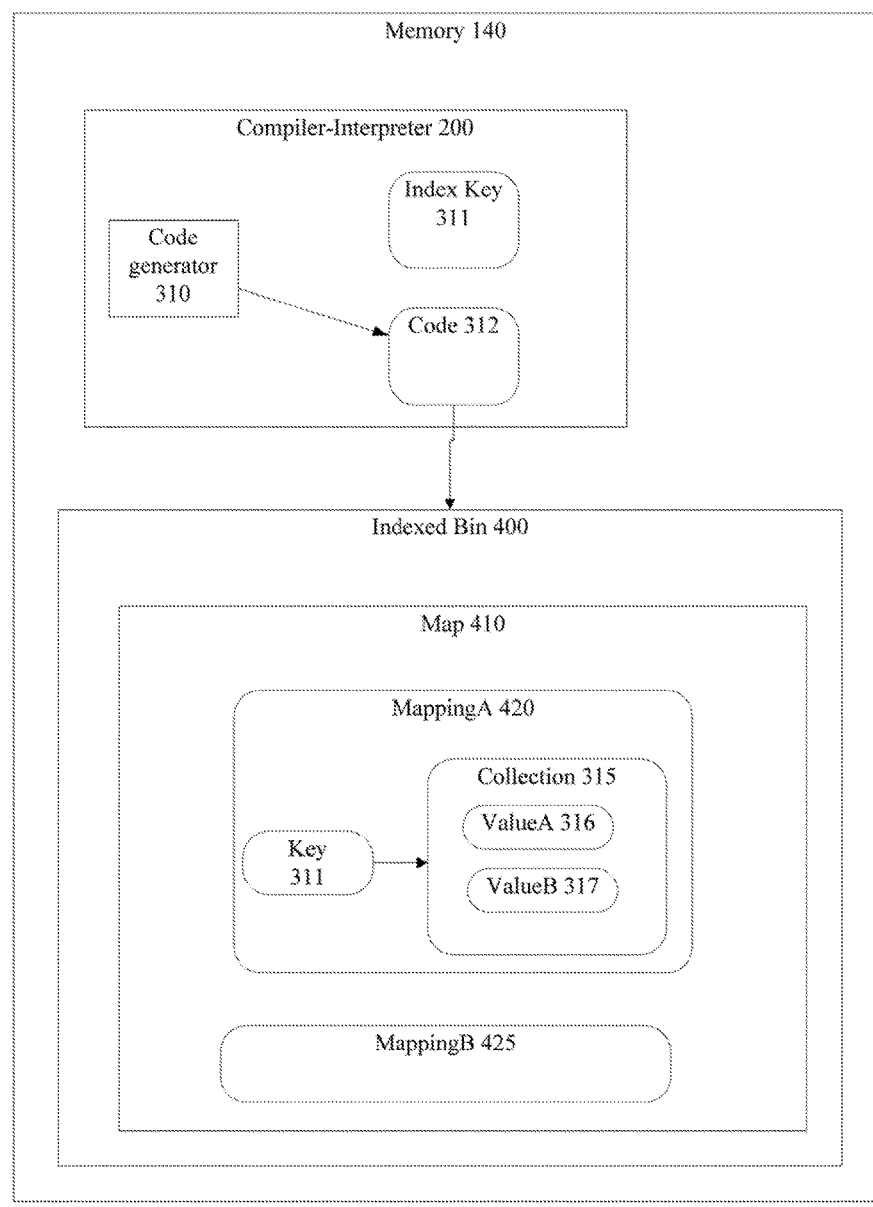
FIG. 4 is a schematic illustration of a code generator generating code to store values in an indexed bin given an index key.

As shown in FIGS. 3 and 4, the compiler-interpreter (200) may comprises a code generator (310) configured to use an index key (311) to generate code (312) that inserts values (316-317) into collections (315) or into indexed bins (400) or buckets given the index key. The specific values are pushed into a collection or into an indexed bin or bucket from multiple different places in the program. The indexed bins (400) is a map (410) comprising one or more mappings (420, 425) from the index key (311) to a collection (315) of one or more values (316-317).

The code generator (312) may be able to receive instructions (305) (e.f. a new value to be written to the collection). More completely, the code generator 310 may be told what sort of code to produce. It may accept a value reference that specifies where the value will be obtained from (i.e. where it will be computed), a destination reference which says where the value should be stored (a collection in the case of FIG. 3, or an indexed collection of collections in FIG. 4), and in the case of FIG. 4, an index reference that says where the index is going to be computed or obtained from. These two or three things together are used to actually generate the code that receives the value and possibly the index key. In general, it is possible to do this both ways: the code generator can generate generic code that can write to any collection, and then a specific collection parameter has to be passed into the generated code so it knows which collection to add the value to, or the collection can be fixed for a specific generated version of code, in which case the collection parameter is passed into the generator.

Inserting a value into a collection, an indexed bin or a bucket may comprise adding a requested value to an existing group, set, multi-set, bag, map or list of values already in a data structure such as a collection, indexed bin or bucket. An indexed bin or bucket may be a data structure that is referenced by a key, index or memory location. Pushing a value into a collection, indexed bin or bucket from multiple locations may involve allowing concurrent writes to the collection, indexed bin or bucket, which may require the addition of synchronization logic or lock-free data structures to prevent conflicting concurrent access to the data structure, or, if subsequent access to the values in the collection, indexed bin or bucket do not care what order the values were collected in, could be enabled by using lock-free (unsynchronized) access to one separate local copy of the data structure for each processor or core, followed by subsequent synchronized merging of the local copies as each processor or core completes its own share of the parallelized work.

Figure 5:
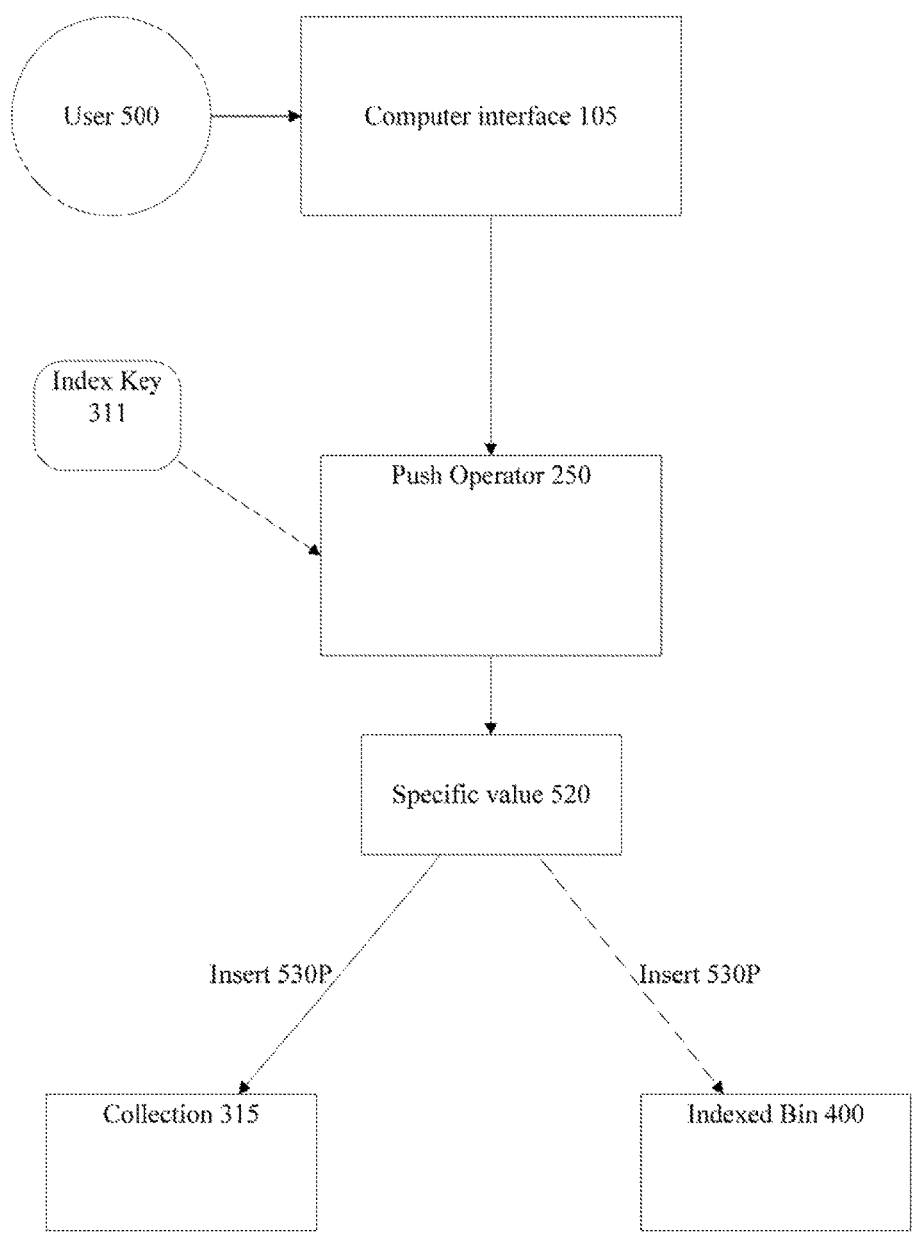
FIG. 5 is a schematic illustration of a push operator configured to store specific values in a collection or indexed bin given an index key.

As shown in FIG. 5, the push operator (250) may be configured to allow a user to receive instructions from a user through a computer interface (104) to insert (530P) a specific value (520) into a collection (315) or into an indexed bin (400) or bucket given an index key (311).

Figure 6:
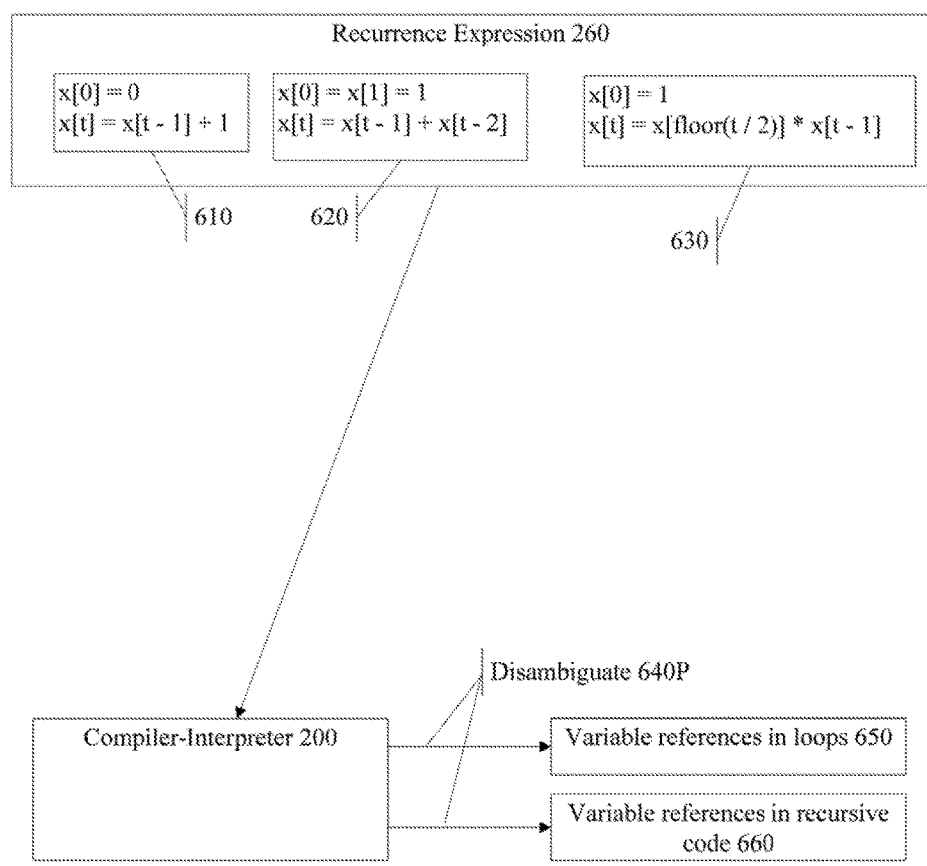
FIG. 6 is a schematic illustration of a compiler-interpreter disambiguating variable references in loops or in recursive code using a recurrence expression.

As shown in FIG. 6, the recurrence relation may comprise a sequence of values using iteration or recursion. In the example illustrated, Value $y=f(x)$, and Value $z=f(x,y)$. Thus each value defined further in the sequence is based on a precomputed value. The compiler-interpreter 200 may be configured to disambiguate 640P variable references in loops 650 or recursive code 660 based on the recurrence expression 260. In some configurations an arc 821 may connect a first node 811 to a second node 812 whenever the expression in the second node is a function of, or accepts as input, the value or collection of values computed by the first node.

A recurrence expression takes the form of a base reference, e.g. x, indexed by a symbolic index or timestamp, e.g. t, combined in a syntactic form, e.g. $x[t]$, $x@t$, $x\_t$, $x_t$ or similar syntactical construction indicating the relationship between x as a reference and t as an index, timestamp or version code. An example of a recurrence expression is $x[t]=x[t-1]*2$, which indicates that the 't'th value is computed by doubling the 't-1'th value. Other examples include $x[t]=x[t-1]+x[t-2]$ and $x[t]=x[t/2]+1$. One or more base cases is typically defined, as with mathematical induction, e.g. $x[0]=1$, and then recursion and/or induction can be used to first compute the recurrence values that depend only on the base case value or values, followed by the recurrence values that depend only on the value or values computed from the base case value or values, and so forth until all computable values have been computed, or until the recursion and/or induction terminates by means of a specified termination criterion being met. Recursion and induction are computationally equivalent, but differ in their syntax and their requirements for ancillary data structures, for example to convert a branching recursion into an iteration, a stack data structure may need to be employed in the iterative version that is implicit in the recursive version, and when converting an iterative algorithm into a recursive algorithm, tail recursion may need to be employed, if possible, to ensure the stack doesn't overflow.

Values or variable references in a recurrence expression may be disambiguated by looking at the symbolic index or timestamp, e.g. given the recurrence expression $x[t]=x[t-1]+x[t-2]$, the compiler-interpreter can determine that the value for x at time t is computed as the sum of the two distinct previous values of x, i.e. the value for x computed in the two previous iterations.

Figure 7:
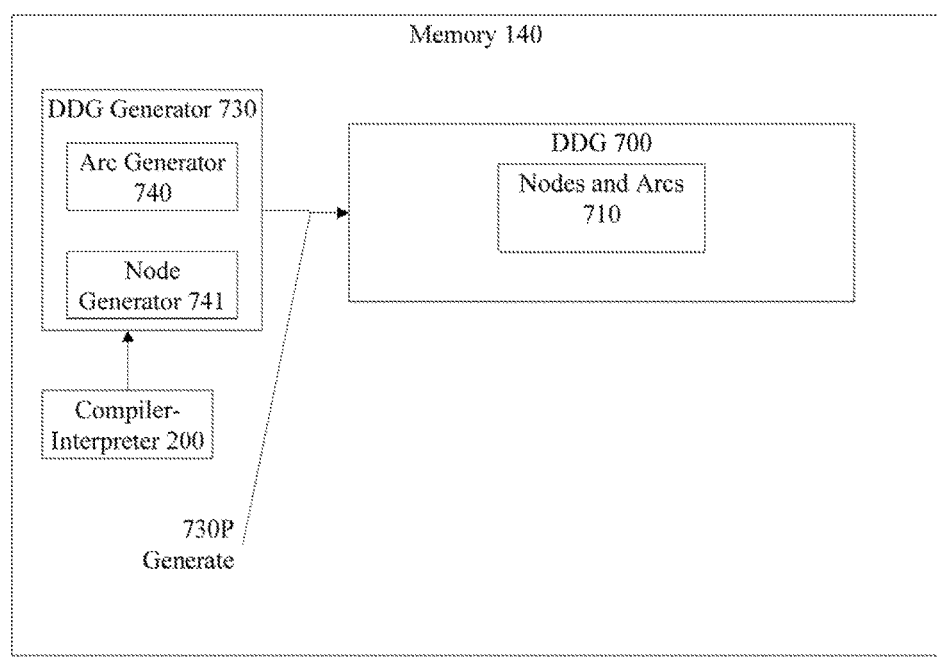
FIG. 7 is a schematic illustration of a Data Dependency Graph (DDG) generator generating a DDG, consisting of nodes and edges.

As shown in FIG. 7, the compiler-interpreter (200) may comprise a DDG generator 730 configured to generate (730P) a data dependency graph (DDG) (700) having structure. FIG. 7 illustrates a DDG 700 comprising an implementation of nodes and arcs (710). The DDG generator 730 may comprise an arc generator 740 connecting a first node to a second node whenever the expression in the second node is a function of, or accepts as input, the value or collection of values computed by the first node. The DDG generator 730 may comprise a node generator 741 for generating the nodes.

A Directed Acyclic Graph or DAG is a graph consisting of nodes and directed edges (also known as arcs, or simply "edges" if it is understood that the edges are directed in a given context, such as when the edge represents a dependency). A directed edge has a first node and a second node, and the identity of the first node and second node are important: for example, when the edge represents a dependency relationship between two nodes, the first node represents the dependency node and the second node represents the dependent node. A DAG is realized as a data structure consisting of objects or structs having addresses, IDs or other identifiers, and connected by edges implemented as pointers, references, queries, streams, channels or node IDs. Edges may or may not themselves have identifiers. A graph is a DAG (i.e. is directed and acyclic) if it has no undirected edges, and if there is no path from a node back to itself when following one or more directed edges from the node. A DAG is a partial ordering or partially ordered set (poset) if the relationship represented by a directed edge must of necessity follow the arrow of time, meaning that in a given context in which nodes are processed in some order, the first node of a directed edge must always be processed before the second node of a directed edge. A partial ordering is only partially constrained in its ordering, since if B and C both depend on A, and D depends on both B and C, then both of the orderings (i) A, B, C, D and (ii) A, C, B, D are consistent with the ordering relationships that require that a dependent node is listed before a dependency node; more generally, B and C can be listed in any order relative to each other, or can be listed together (corresponding with B and C being executed at the same time in a parallel computing model: (iii) A, {B, C}, D. Since it is true by very definition that the edge relationships follow the arrow of time when the edges are dependency relationships (because the value computed by a dependency node in a DAG-structured DDG must have been computed before it can be used as a parameter to the expression corresponding with a dependent node), a DAG-structured DDG is a partial ordering. A compiler-interpreter may be configured to examine the data dependencies of a program to build a DDG, and then to determine if the DDG is DAG-structured. If the DDG is not DAG-structured (i.e. if the DDG has cycles), an error is reported at compiletime, otherwise the program is deemed as valid, and may be subsequently compiled or interpreted.

Figure 8:
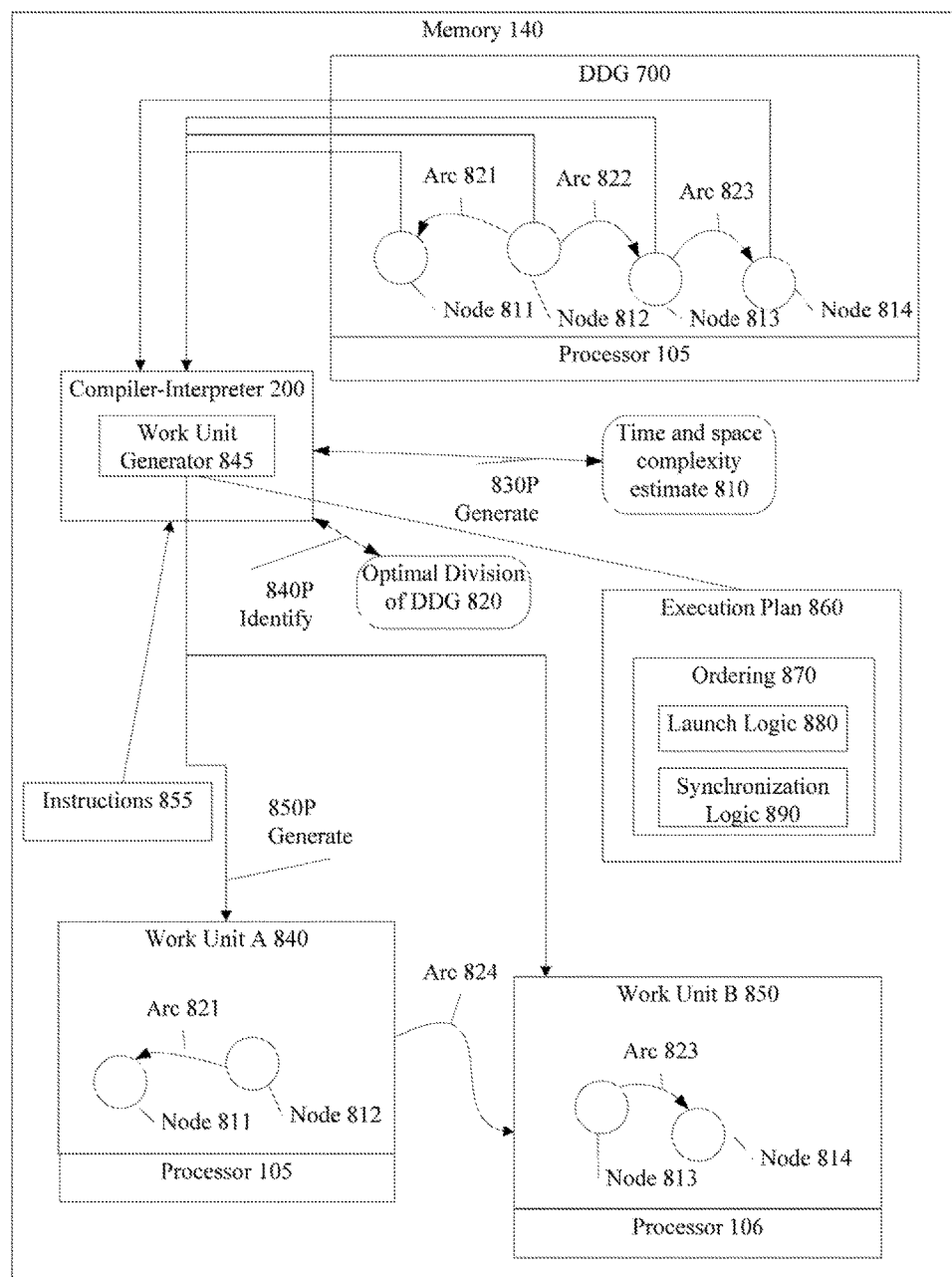
FIG. 8 is a schematic illustration of a compiler-interpreter generating work units that may be executed in parallel, and an execution order for those work units, given the DDG of a program.

As shown in FIG. 8, the compiler-interpreter (200) may comprise a work unit generator (845). The work unit (845) may be configured to generate synchronization logic at the inputs and outputs of each work unit or at a beginning and an end of each node to ensure the partial ordering of the DDG (700) is respected as the work units or nodes are processed or executed. The computer-interpreter may be configured to generate (830P) a time and space complexity estimate (810) of each node in the DDG to identify (840P) an optimal division of the DDG into work units (840 and 850). The compiler-interpreter 200 may then generate (850P) the one or more work units. In the example shown DDG 700 is split into two work units, but more work units are contemplated for other DDG. Also shown are nodes 811-814 and arcs 821-833. Arc 824 connects work unit 840 to work unit 850. In the example shown, the DDG would be executed by a single processor 105, but when split into work units, it can be run by two processors (105 and 106) increases the execution time. Alternatively, the work units could be executed by two different cores of the same processor. The work units may comprise one or more nodes connected by arcs such that an expected total execution time of the program is minimized while respecting constraints on memory and storage available to each processor, wherein the work units are scheduleable to run on one or more processors and have inputs and outputs.

A compiler-interpreter may be configured to build a DDG by creating a graph structure in memory consisting of nodes corresponding to expressions, statements or source code lines in the program, and edges corresponding to dependencies between the nodes. A dependency between two nodes indicates that the expression, statement or line represented by a first node must be computed before the expression, statement or line represented by a second node.

An execution plan is a scheduling of operations that respects the partial ordering inherent in the DDG, but that potentially allows multiple DDG nodes' expressions to be computed in parallel, as long as those nodes do not depend upon each other. For example, in a DDG with nodes A, B, C and D, if B and C depend on A and D depends on B and C, then the execution plan with maximum parallelism would cause A to be executed first, followed by B and C in parallel, followed by D once both B and C had completed. Two valid serial execution plans would be to execute the DDG nodes' expressions in the sequence: (1) A, B, C, D; (2) A, C, B, D. All three of these execution plans observe the partial ordering (a DDG node's expression is never executed before, or concurrently with, the expressions corresponding to the DDG node of any dependency of a given DDG node). The logic required for executing or launching expressions, and for synchronizing the execution of dependencies before dependent nodes (such as in the first of the three execution plans just given, where B and C must both complete before D is executed) vary from architecture to architecture, but may include mutexes, semaphores, monitors, barriers, spin-locks, sleep-waits, work queues and other parallel synchronization logic, primitives and data structures.

Figure 9:
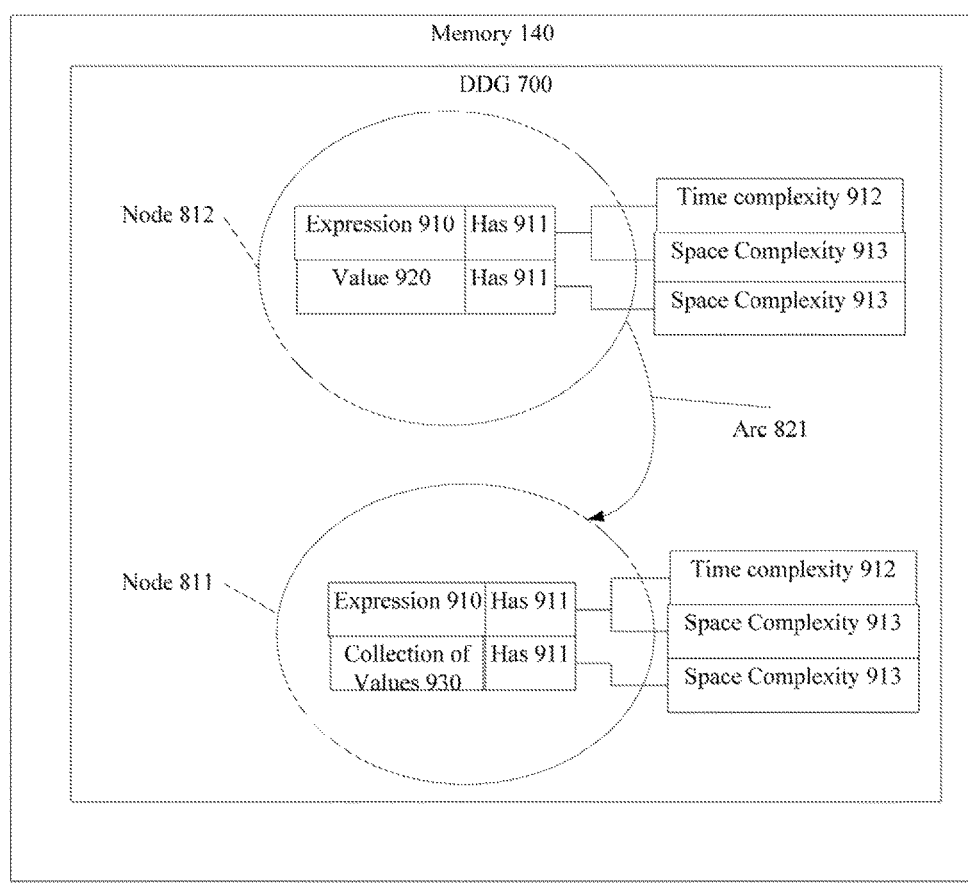
FIG. 9 is a schematic illustration of DDG nodes having an expression part that produces a value or collection of values, the expression part having time and space complexity and the value or collection of values part having time complexity.

In FIG. 9, node 811 is linked with an expression (910) for computing a value (920) given the value computed by data dependencies; and the value (920) computed by the expression. Node 812 is linked with an expression (910) for computing a collection of values (930) given the collection of values (930) computed by data dependencies; and the collection of values (930) computed by the expression. FIG. 9 also shows the compiler-interpreter 200 receiving instructions (855) to instantiate an execution plan (860) comprising a partial ordering of operations to be executed. The plan (860) may comprise launch logic (880) for launching operations in parallel across multiple processors or threads, and/or synchronization logic (890) for synchronizing these operations to conform to the partial ordering. As shown, an expression (910) has (911) both a time complexity (912) and a space complexity (913) in this embodiment.

The time complexity of a node in the DDG specifies how long the expression, statement or line corresponding to the DDG node takes to run as a function of input sizes or input values. The space complexity of a node in the DDG specifies how much space is required to compute the result value of the expression, statement or line, including the space for the result itself. Time and space complexity may use big-Oh, little-Oh or omega notation, may be determined in the form of Bayesian or frequentist statistical distributions, or may use another means of estimation and functional representation. A work unit may embodied as a collection of DDG nodes that are executed together on one processor core. Copies of a work unit may also be scheduled to run on multiple processor cores. Inputs to a DDG node or work unit and outputs from a DDG node or work unit can include collections of values, database query result sets, network streams, file streams, file inputs and outputs, in-memory streams, pipes and other data reference or communications methods. Inputs to a DDG node or work unit can additionally include constant values and literal values. DDG edges between nodes within a work unit can be turned into memory reads and writes, disk reads and writes, database queries and stores, or other local storage accesses, whereas DDG edges between nodes in different work units can additionally be turned into remote procedure calls, network communications, inter-processor bus messages or other communication types. The total execution time of a program is the time taken from when the program is started until all results or outputs have been computed and stored or produced. Memory and storage constraints denote the amount of RAM, magnetic disk, SSD, flash storage, database space or free space in a storage medium that is available to a processor core for holding the intermediate computation and final result for a DDG node or work unit.

Each node in the DDG has two parts: an associated expression (an expression, statement or line in the program source code) and a value or collection of values computed by that expression. The expression takes as inputs zero, one or more than one values or collections of values computed by other expressions, or may receive as an input the result of a memory read, network read, database query, file read, remote procedure call, inter-process communication, event, or other data or communication. The value or collection of values computed by this node is available as an input to other nodes. The expression part of the node has time complexity (and may incur a space complexity overhead due to computing intermediate values), as described above, and the value or collection of values produced by the expression has space complexity, as described above.

Figure 10:
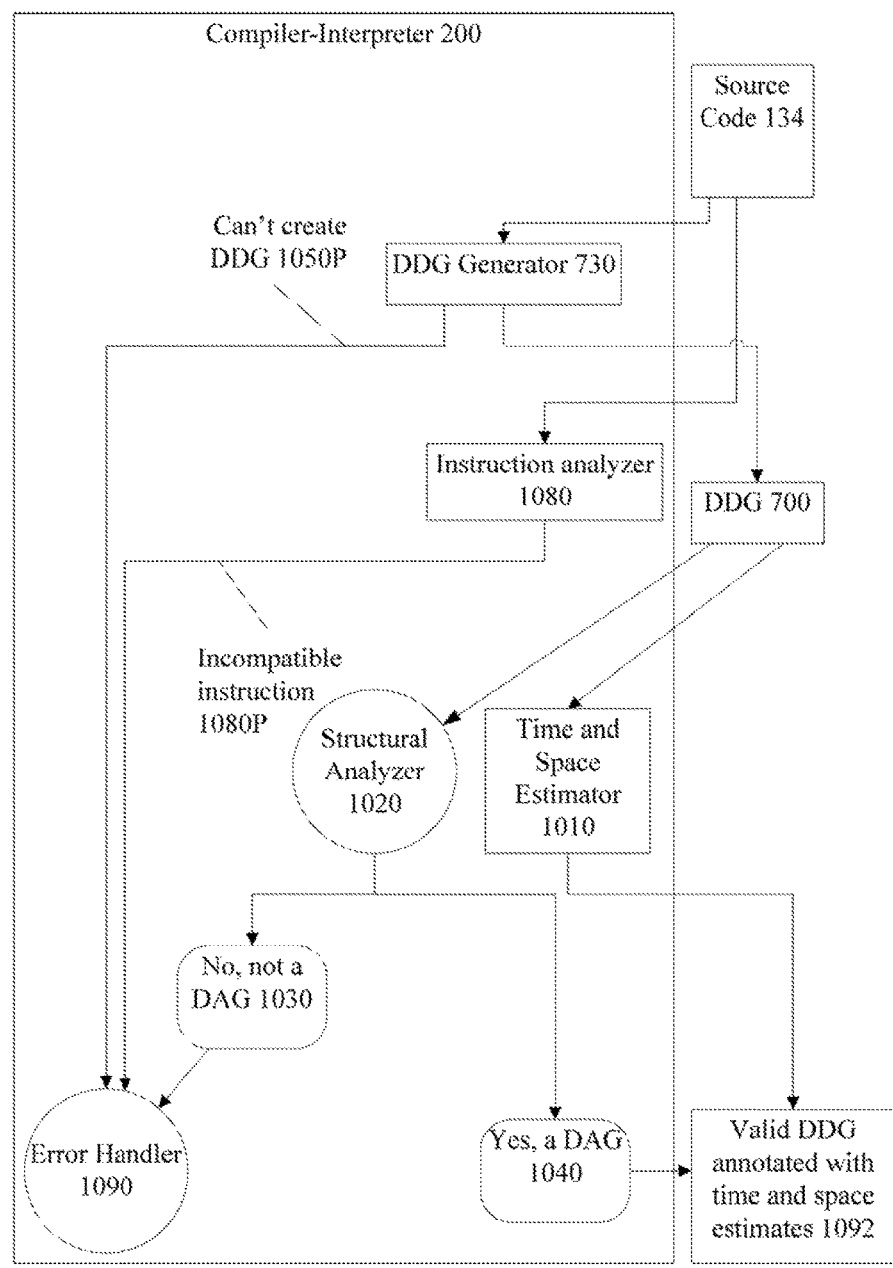
FIG. 10 is a schematic illustration of a compiler-interpreter generating a DDG and verifying its structure is a Directed Acyclic Graph (DAG).

As shown in FIG. 10, the compiler-interpreter may comprise a time and space estimator (1010) configured to estimate time and space complexity requirements to compute the value or collection of values for each node in the DDG as a function of the time and space complexity of the node's data dependencies. The compiler-interpreter may be configured to receive or determine an estimate of an expected time and space complexity of elemental operations and communications in a specified target architecture. The compiler interpreter may comprise a structural analyzer (1020) configured to analyze the structure of the DDG (700) to determine whether DDG has the structure of a Directed Acyclic Graph (DAG) consistent with a partial ordering or partially ordered set. The analyzer (1020) may determine the DDG 700 is a DAG 1030 or is not a DAG 1040. The compiler interpreter may also comprise an error handler 1090 configured to report errors if for example: the DDG generator (730) cannot generate (1050P) a DDG because the DDG is not directly determinable from the source code of the program, the structural analyzer (1020) determines the structure of the DDG is not a DAG, or an instruction analyzer (1080) determines that the program comprises an instruction applying an operator to a value or collection of values of incompatible type (1080P). FIG. 10 shows a valid DDG annotated with time and space elements 1092 as taking inputs from the structural analyzer 1020 and time and space estimator 1010

Once the time and space complexity is known for all dependency nodes of a given DDG node, the time and space complexity may be estimated for the given DDG node by directly substituting the time and space complexity estimates for the dependency nodes in place of the corresponding parameter value or values in the expression, statement or source code line corresponding with the given DDG node, and then simplifying the expression using the standard tools of complexity theory, such as big-Oh analysis, frequentist statistics and Bayesian statistics. Other methods for estimating the time and space complexity of a given DDG node are also possible, including but not limited to substituting the time and space estimates for dependencies into a simplified model of the complexity of the expression corresponding to a DDG node, rather than substituting into the expression itself.

The compiler-interpreter is configured to report an error in several circumstances, including but not limited to the following situations: if the program is invalid according to the syntax of the language, as previously described; if the compiler-interpreter cannot determine the DDG from the program source code, because the origin of a value cannot be determined; if the structure of the DDG is not a DAG; or if the operands to a function have the wrong type.

Figure 11:
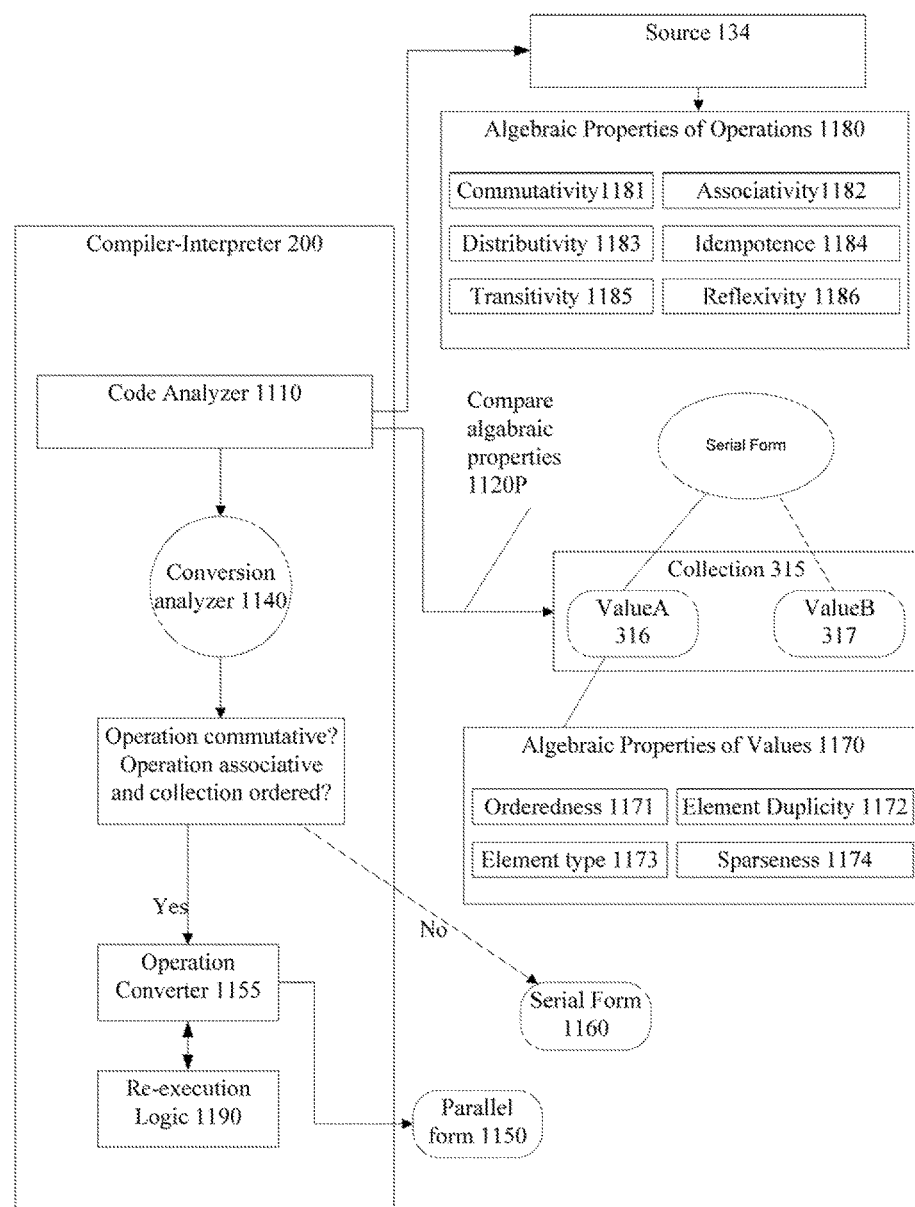
FIG. 11 is a schematic illustration of a compiler-interpreter tracking the algebraic properties of collections and operators, and identifying additional opportunities to parallelize operations.

As shown in FIG. 11, the compiler-interpreter may comprises a code analyzer (1110) configured to identify parallelization in the code (134) opportunities beyond those directly determinable from the partial ordering of the DDG. The code analyzer may be configured to: compare algebraic properties of values or collections of values to algebraic properties of the expressions or computational operations that operate on them: and from that comparison using a conversion analyzer (1140) determine whether it is mathematically valid to convert a serial, iterative expression or operation (1150) into a parallel divide-and-conquer form (1160). The compiler-interpreter may comprise a property tracker (1160) to track algebraic properties of collections of values or instances of computational operations. As shown, the collections of values may have algebraic properties (1170) including: orderedness (1171), element duplicity (1172), element type (1173), or sparseness (1174). The algebraic properties of the expressions or computational operations (1180) include: commutativity (1181), associativity (1182), distributivity (1183), transitivity (1185), reflexivity (1186), and idempotence (1184). The compiler-interpreter may comprise a re-execution logic (1190) configured to generate logic that automatically restarts and re-executes an idempotent computation if the computation is killed or terminated due to a system failure. The re-execution logic may be configured to determine which expressions, computational operations or communications may be safely restarted on failure due to an idempotence property of linked nodes or work units.

Parallelization opportunities that may be directly determined from the structure of the DDG are as given in the A, {B, C}, D example above. These opportunities for executing in parallel the expression, statements or lines corresponding to two or more DDG nodes or work units may be found whenever there is no directed path between any of the DDG nodes or work units. However, other parallelization opportunities may be able to be found that do not depend only on the structure of the DDG. For example, if one node in the DDG performs a serial fold or reduce operation over a collection, that may be able to be turned into a parallel fold or reduce if it is known (or can be proved) that the fold or reduce function is associative and/or commutative. For example, if the collection is a collection of integers [1, 9, 7, 12] and the fold or reduce function is the addition operator which has an identity element of 0, the standard application of left fold or reduce would perform the operations ((((0+1)+2)+3)+4), taking a total of four timesteps if the addition operator takes one timestep, or three timesteps if the first addition with the identity element is avoided. However, because addition is associative, this same sum can be computed as ((1+2)+(3+4)), taking a total of two timesteps if the (1+2) calculation is performed in parallel with the (3+4) calculation. In general, this allows computations to be performed in a balanced binary tree, providing a speedup of up to $N/\log_2(N)$ for N elements. Furthermore, since addition is commutative, we can further relax the constraints on the computation to allow the summation of elements (or the grouping of elements into a balanced binary tree) to occur in any order. In practical terms this means that addition can be used to fold or reduce not just a list of ordered elements, but a set of unordered elements. Relaxing the orderedness constraint can save additional time and space that would normally be spent tracking the order of elements and ensuring that the output order from an operation is the same as the input order. The compiler-interpreter is configured to track the algebraic properties of functions, including but not limited to, for functions of two arguments: associativity, commutativity, transitivity, reflexivity etc.; and for functions of one or more argument: idempotence, etc.; by determining if all elements from which a function is defined or constructed have these properties. Alternatively, for functions of small domain (i.e. function whose cross product of all possible values to all arguments constitutes a small total number of possible input values), the compiler-interpreter is configured to execute a function, substituting all possible values in all possible inputs into the function, then examine the outputs of the function across different inputs to see if a given relation holds. For example, if a and b can both take only the values 1, 2 and 3, the total size of the domain of a+b is 3×3=9, which is not a large number of tests to perform, and associativity can be checked by directly determining if a=b for all possible selections of values for a and b.

The compiler-interpreter may also be configured to track the algebraic properties of collections of values, including but not limited to the type of elements in the collection (including the domain of possible values a value may assume), whether the collection is ordered, whether the values are discrete or continuous, whether the values are sparse or dense, whether duplicated values are allowed in the collection or not.

If a fold or reduce function is commutative, a serial fold or reduce operation can always be transformed into a "divide and conquer" parallel fold or reduce operation by regrouping computations into a binary tree as describe previously. If a function is commutative, then the function is also associative by definition, but the reverse is not necessarily true: for example, string concatenation is associative but not commutative. If a fold or reduce function is associative but not commutative, then it must be applied only to ordered collections, such as lists, otherwise the compiler-interpreter will report an error. If a fold or reduce function is associative but not commutative, and is applied to an ordered collection, the serial fold or reduce operation may be transformed into a "divide and conquer" parallel fold or reduce operation as long as the relative order of elements is preserved. The compiler-interpreter is configured to make these transformations into "divide and conquer" form when such a transformation would result in faster performance (decreasing total runtime) and/or better scalability (making use of more processor nodes), whenever the tracked algebraic properties of functions and collections allow for these transformations to be performed.

If a function is idempotent, then calling it two or more times with the same arguments will have the same effect as calling it once. For example, a function that takes a single argument and multiplies it by zero is idempotent, because multiplying anything by zero two or more times has the same effect as multiplying the same thing by zero just once. This reasoning can be extended to modifying collections of values: adding an element to a set is an idempotent operation, whereas adding an element to a list is not, because even if an element is added to a set N times, there will only be one copy of it in the set, but if an element is added to a list N times, the list will contain N copies of the element after all the add operations have completed. If a function or operation is "strongly idempotent", it may fail at any point due to a transient failure, and a second retry attempt will correctly complete the effect of the function or operation without being impacted by the previous partial completion of the function or operation. As previously described, the compiler-interpreter is configured to track the algebraic property of idempotence for DDG nodes or work units (corresponding to functions, expressions, statements or lines in a program). The compiler-interpreter is furthermore configured to use the idempotence property of a DDG node or work unit, if it is known, to automatically retry known-idempotent operations in the case of transient failures, or to generate error-handling code that is configured to automatically retry known-idempotent operations in the case of transient failures. Strongly idempotent operations are deemed safe to restart after transient failure. Transient failures include memory or disk errors, "resource temporarily unavailable" errors, the killing of a task by a user, a request by a user for a task to migrate, the loss of operation of one or more processing nodes, and the loss of operation of part or all of one or more storage media devices.

Figure 12:
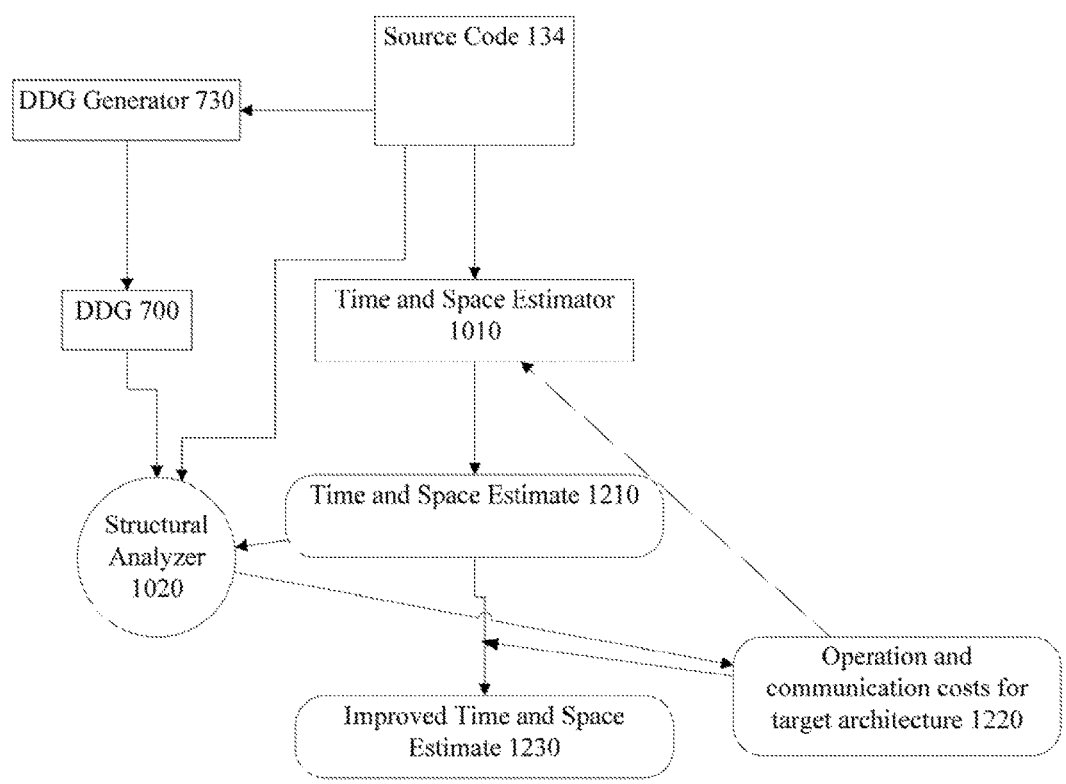
FIG. 12 is a schematic illustration of time and space estimation for source code, and improvement of time and space estimates using the cost of operations and communications in a specific target architecture.

As shown in FIG. 12, the compiler-interpreter may be configured to substitute the estimated time and space complexity for elemental operations and communications in a given target architecture into the time and space complexity estimates for nodes in the DDG to produce a more accurate estimate of time and space complexity for each node in the DDG on the given target architecture. For example, the time and space estimator (1010) may be able to produce an inestime of the time and space (1210). In turn, the structural analyzer (1020) can take that estimate into account when determining the operation and communication costs for target architecture (1220). The time and space estimator (1010) can then substitute the estimate for the time and space complexity into the structure of the DDG (the nodes specifically), to thereby produce an improved time and space estimate (1230).

Figure 13A:
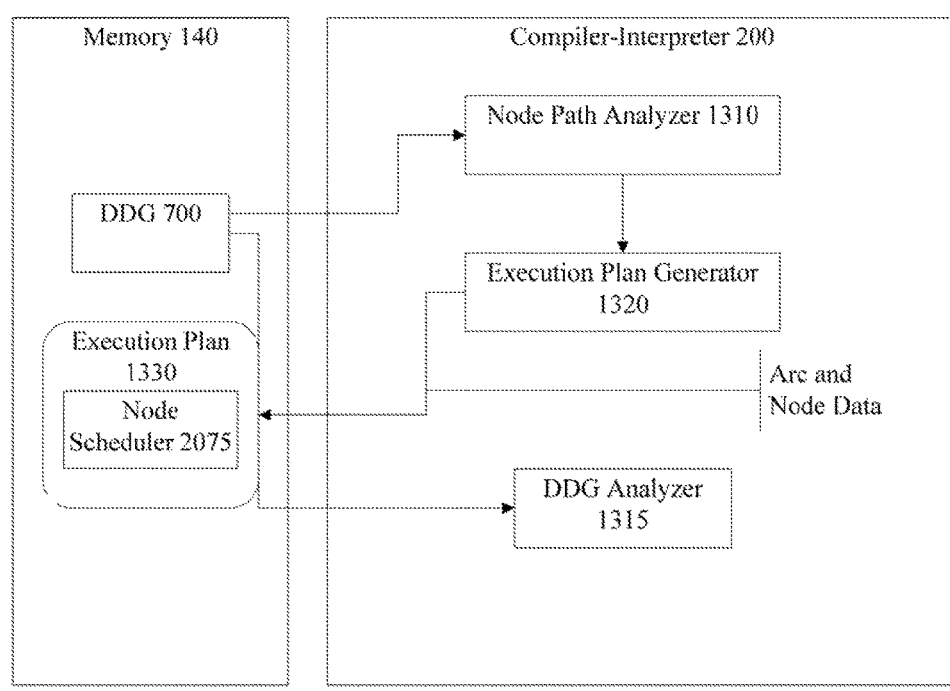
FIG. 13A is a schematic illustration of the compiler-interpreter scheduling expressions for nodes in a DDG to run in parallel when there is no directed path between the nodes

As shown in FIG. 13A, the node path analyzer (1310) is configured to: identify pairs of nodes in the DDG between which there is no directed path having an unbroken series of one or more arcs, and an execution plan generator (1320) configured to produce an execution plan (1330) for the program wherein the expressions linked to these pairs of nodes are scheduled to execute in parallel. The execution plan may comprise a node scheduler (2075) configured to schedule re-computation of any marked nodes.

FIG. 13 also shows that the compiler interpreter 200 comprises: a DDG analyzer (1315) configured to: receive data concerning the arcs connecting a node in the DDG to its dependency nodes and dependent nodes; and generate memory allocation and deallocation logic for the nodes. The Node Path Analyzer 1310 may search for a directed path between all pairs of nodes in the DDG. If there is no directed path between a pair of nodes, then mark the pair as executable in parallel. For example, an All Pairs Shortest Path (APSP) algorithm may be used to determine if any specific node is reachable from any other specific node along any directed path. The structure of the DDG may be examined directly using Breadth First Search or Depth First Search to limit pairwise comparisons to only pairs of nodes that branch out from a common ancestral dependency node.

Figure 13B:
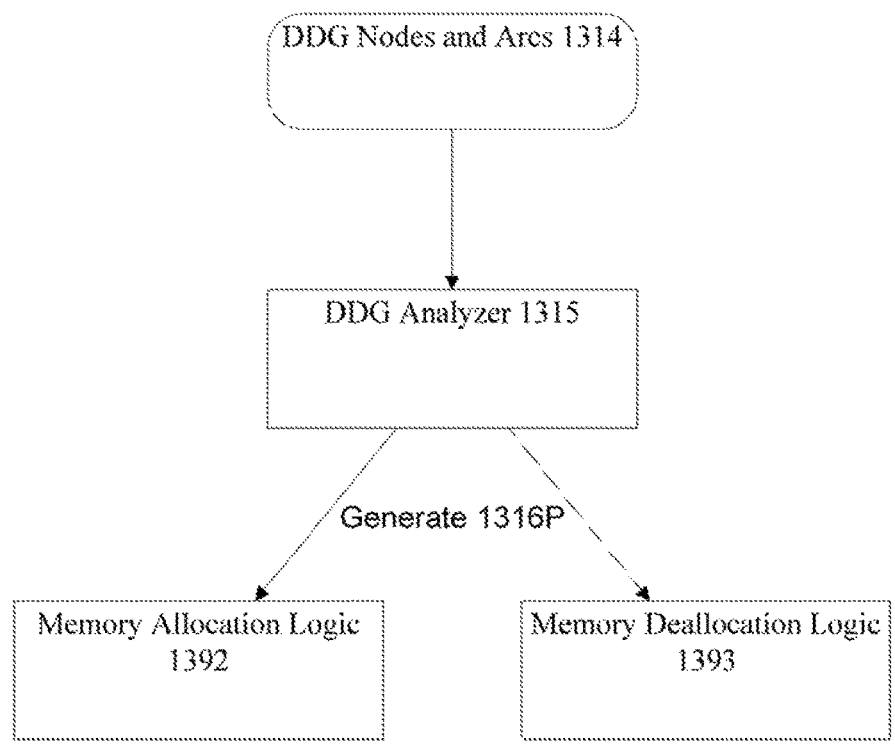
FIG. 13B is a schematic illustration of a DDG analyzer generating memory allocation and deallocation logic to correspond with nodes in a DDG.

As shown in FIG. 13B, a DDG analyzer (1315) may be configured to receive DDG nodes and arcs (1314) data concerning the arcs connecting a node in the DDG to its dependency nodes and dependent nodes; and generate 1316P memory allocation (1391) and deallocation logic (1392) for the nodes. The memory allocation logic is configured to allocate memory for the intermediate values generated during the computation of the expression corresponding to a specific DDG node, and for the final value or collection of values generated by the expression. The memory allocation logic (1391) may be configured to be inserted into the object code such that memory allocation logic executes before the code generated for the expression; or the memory allocation logic may be executed by the compiler-interpreter, an interpreter or a runtime environment before the expression is executed. The memory deallocation logic (1392) may be configured: to free memory for the intermediate values generated during the computation of the expression corresponding to a specific DDG node once the expression has been executed, and to free memory for the final value or collection of values generated by the expression once the final value or collection of values is no longer needed, wherein the memory allocation logic is: inserted into the object code such that it executes after the code generated for each dependent node of the specific DDG node has read the dependent node's dependencies; or executed by the compiler-interpreter, an interpreter or a runtime environment after reading the dependencies for all dependent nodes of the specific DDG node.

Time and space complexity estimates for DDG nodes may be computed in an architecture-agnostic manner, in which each elemental operation or communication type has a symbolic (but unknown) cost. To specialize these time and space complexity estimates for a specific target architecture, the compiler-interpreter is configured to substitute the actual time and space costs of each elemental operation or communication type, in seconds and bytes respectively, into the time and space complexity estimate formulas, producing formulas with fewer unknowns. Specifically, the remaining unknown variables in the time and space complexity estimates for a node will be data sizes and data values of input data values or dependencies, and/or time and space complexity estimates of dependencies. Different target architectures (e.g. multicore CPUs vs. a cluster of networked machines) will have different elemental operation and communication costs, and will therefore result in different specializations of the time and space complexity estimates. This may result in a different parallelization strategy for different target architectures, even given the same program source, when these time and space complexity estimates are used to divide the DDG into work units for scheduling on processor nodes.

A DDG may consist of some nodes that have no dependencies. These are values or collections that are not a function of other values or collections. Examples of such nodes include but are not limited to constant or literal values, constant or literal collections, database tables, lookup tables, static data structures, database tables, database query result sets, files, streams, channels and sockets. As for DDG nodes that do have dependencies, the compiler-interpreter is configured to receive or estimate time and space complexities for DDG nodes that do not have dependencies. For example, the programmer may pass the compiler-interpreter an estimate of the size of a file to be received over a network connection, or for a local file, the compiler-interpreter can request the file size from the operating system.

In addition to generating code for caching or memoization, the compiler-interpreter is furthermore configured to generate synchronization logic that waits for the output values from all required dependency nodes of a given node in the DDG to be computed before commencing computation on the given node; to allocate memory to store the value or collection of values to be computed by a given DDG node as it is about to be computed; to deallocate memory for the value or collection of values computed by a given DDG node once all dependent nodes have read from or received the value or collection of values computed by a given DDG node; and to restart or retry the computation of a DDG node's expression upon transient failure of the computation represented by the node.

The source code or logical structure of two programs, or two versions of a program, may be compared to find the minimal subset of lines, expressions or characters that differ between the two programs, in a process widely known as "diff" or "diffing". Diffing can be used when a programmer has edited a program to find the things that the programmer changed before and after the edit operation. The compiler-interpreter and the editor or IDE for the programming language is configured to support diffing different versions of a program before and after a user has made changes.

When a change is detected between two versions of a program, the compiler-interpreter is configured to compile just those parts of the program that have changed. The object code corresponding to the older version of the program may then be patched to replace the object code that corresponds with the code that the user changed with the new code compiled from just those parts of the program that have changed. The compiler-interpreter may also be configured to perform this diff operation on the object code, after compiling, rather than the source code. The reason for performing this diff is to be able to detect changes to the program structure, so that the DDG corresponding to the source or object code may be examined in order to determine which cached or memoized values may be re-used, so that program execution may be restarted as close as possible to the point where the change was made by the user, in order to enable functional reactive programming. Combined with IDE support for visualizing data as it is computed by the program, this ability enables the compiler-interpreter and the IDE to be configured to quickly give feedback to the user as to the effect of each change made by the user.

The compiler-interpreter may be configured to "pre-evaluate" or "partially evaluate" code when the code is examined by the compiler-interpreter, by interpreting, executing, or compiling and executing code that does not depend upon inputs that are not available at the time the compiler-interpreter examines the program. In other words, parts of the program that do not depend on external inputs may be pre-run by the compiler-interpreter, and the results of pre-evaluating those parts of the program may be cached or memoized and stored with the object code or AST as constant values or look up tables (LUTs) for reuse at runtime without re-evaluating or re-executing those parts of the program from which these values were generated. The benefit of pre-evaluating parts of a program include improved speed at runtime, and tradeoffs include larger object code and longer compilation times. The user may choose to trade off the amount of time to spend partially evaluating or pre-computing code at compiletime and the amount of overhead for cached or memoized values against the desired possibility for the compiler-interpreter to speed up the program at runtime by reusing cached or memoized values that were pre-computed.

Figure 14:
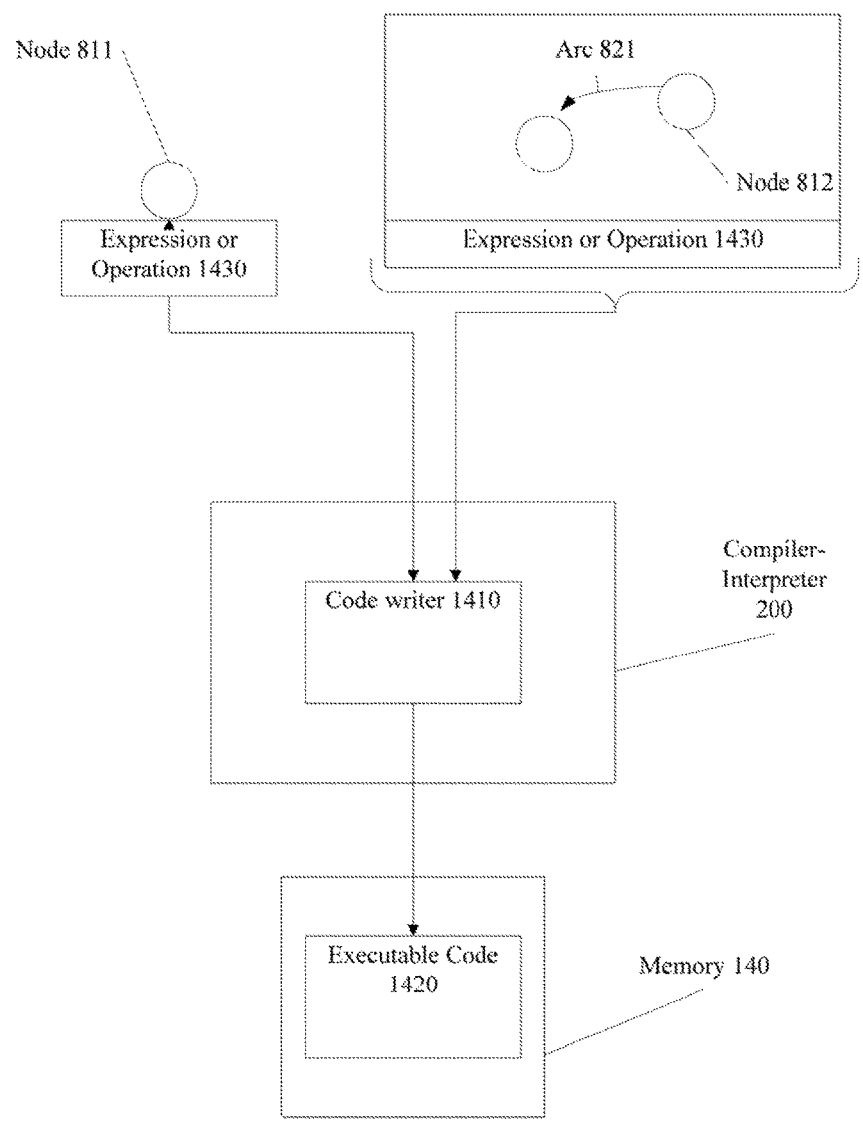
FIG. 14 is a schematic illustration of DDG node expressions and work units consisting of groups of DDG nodes being compiled into executable code.

As shown in FIG. 14, the compiler-interpreter may comprise a code writer (1410) configured to generate executable code (1420) from the expression or computational operation (1430) linked to each node or work unit in the DDG.

Each DDG node or work unit corresponds with one or more expressions, statements or lines of code in the program. The compiler-interpreter is configured to first parse a program to produce an Abstract Syntax Tree (AST) or other intermediate representation, then use this intermediate representation to produce object code for the program, using either a bytecode, bitcode, binary code or machine code representation of the instructions to be executed, or a representation in another programming language (through cross-compilation), or in the form of a specification or configuration of logic gates that implement the logic of the program. The object code is configured to be executed, interpreted or further compiled by an interpreter, bytecode interpreter, runtime environment, virtual machine, virtual processor, processor, processor core, CPU, GPU, FPGA, ASIC, compiler, cross-compiler or other software-based or hardware-based system that is configured to accept object code in the format generated by the compiler-interpreter. The compiler-interpreter may also be configured to execute or interpret the program directly, with or without producing an AST, and without producing object code for the program.

The compiler-interpreter may be configured to: generate code from a data dependency represented by each arc in the DDG, wherein the compiler-interpreter is configured to: read from memory; write to memory; read from a database; read from a file; write to a database; write to a file; receive data from another processor over a communications channel; or send data to another processor over a communications channel. Each directed edge or arc in the DDG represents a data dependency, which is a reference to a value or collection of values (the dependency value) that is depended upon to compute another value or collection of values (the dependent value). The specific means of retrieving or receiving the dependency value to compute the dependent value, or the specific means of sending the dependency value to the processor node that will compute the dependent value, depends upon how and where the dependency value is stored, and how and where the dependent value is to be computed. The compiler-interpreter is configured to handle reading the dependency value from a number of different possible storage options, including but not limited to: from memory, from a database, from a file, or over a communications channel. The compiler-interpreter is also configured to handle writing the dependent value to a number of different possible storage options once it is computed, including but not limited to: to memory, to a database, to a file, or over a communications channel.

Figure 15:
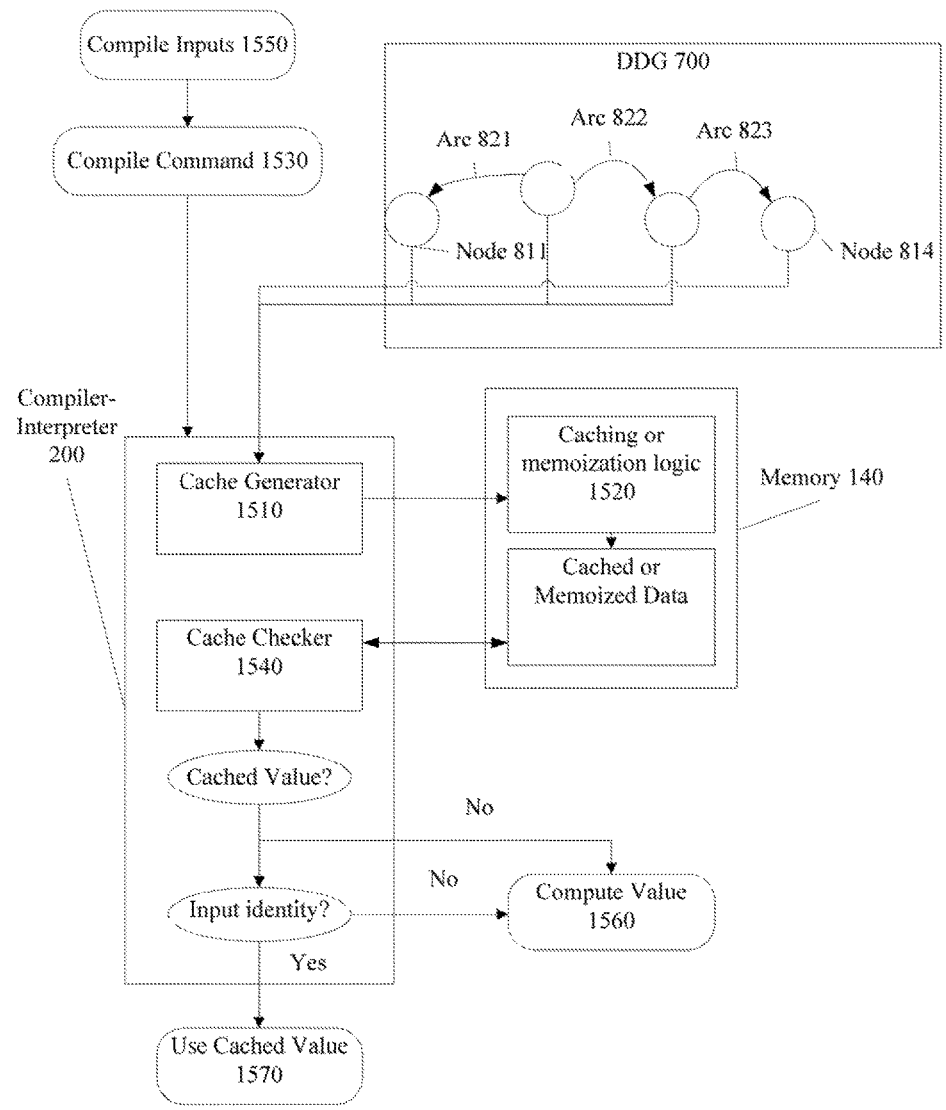
FIGS. 15 and 16 are a schematic illustrations of the generation and use of cached or memoized values to reduce duplicated computation.

As shown in FIG. 15, the compiler-interpreter may comprise a cache generator (1510) configured to generate disableable memoization or caching logic (1520) for each node in the DDG. The caching logic may be used by the compiler-interpreter to generated cached or memoized data for a given set of inputs. When the compiler-interpreter received a compile or interpret command 1530 having inputs (can be user submitted or determined by connected data), the cache checker (1540) may check for cached value having the same inputs. If the cache checker (1540) finds a cached value with the same inputs in memory, it will instruct the compiler-interpreter 200 to use the cached value (1570). If not, the cache checker (1540) may instruct the compiler-interpreter 200 to compute value (1560).

The value or values computed by each node in the DDG or by each work unit may be cached or memoized, by storing a mapping between a set of inputs to the DDG node or work unit and the output value or set of values computed by the DDG node or work unit. When the same DDG node or work unit is called with the same input values, the mapping can be checked to see if the output value or values have already been computed and cached or memoized for these input values, and if so, the cached or memoized values can be used as the output immediately, rather than re-computing the output of the DDG node or work unit. The compiler-interpreter is configured to produce object code from each DDG node or work unit, or to interpret or execute the DDG or work unit directly. The compiler-interpreter may also be configured to generate memoization or caching logic when it generates an intermediate representation or object code for a DDG node or work unit. This memoization or caching logic may be enabled or disabled by the user, depending on whether an intermediate value needs to be cached or not, in order to enable functional reactive programming, partial evaluation, reuse of intermediate values across multiple runs of a program or between multiple users running the same program, or "omniscient debugging" of the program, wherein a programmer can easily backtrack from a point that an error was reported to the cause of the error, using the memoized or cached values to trace the program execution backwards or forwards through time.

FIG. 15 illustrates that the compiler-interpreter adds or executes memory allocation or logic before code that is generated or executed in each DDG node, to allocate results for what the DDG node's expression is about to execute. The compiler-interpreter adds or executes memory de-allocation logic at the beginning of code for the dependent nodes of a node that might need freeing before those dependent nodes' code is executed—it is the dependent nodes, because it is only when all dependent nodes have read a value from a shared dependency node that the shared dependency node can be freed.

Figure 16:
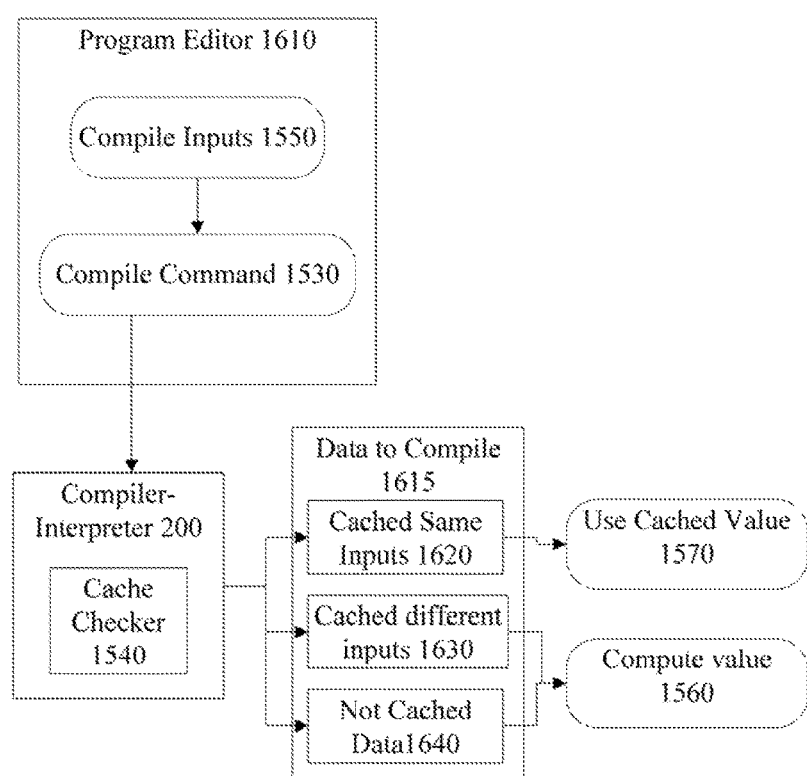

As shown in FIG. 16, the processor (105) may create an instance of a program editor (1610) that a user compiler-interpreter may send the compile command (1530). The cache checker 1540 may determine the data to compile 1615. This data may include data having the same inputs that was already cached 1620 by the caching logic (1520, FIG. 15), cached values with different inputs (1630), or data that has not been cached (1640). The compiler-interpreter 200 may be programmed to use the cached values 1570 for the cached same inputs (1620), and compute new data (1560) for the cached different inputs (1630) or not cached data (1640).

Figure 17:
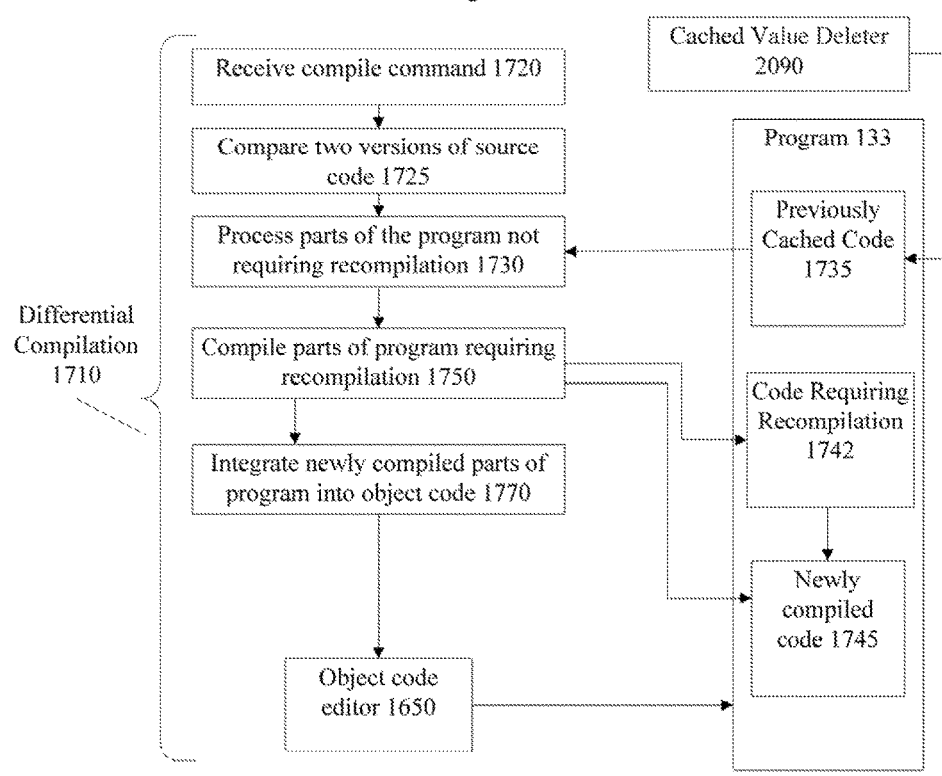
FIG. 17 is a schematic illustration of the use of differential compilation and object code editing used to implement functional reactive programming.
Figure 18:
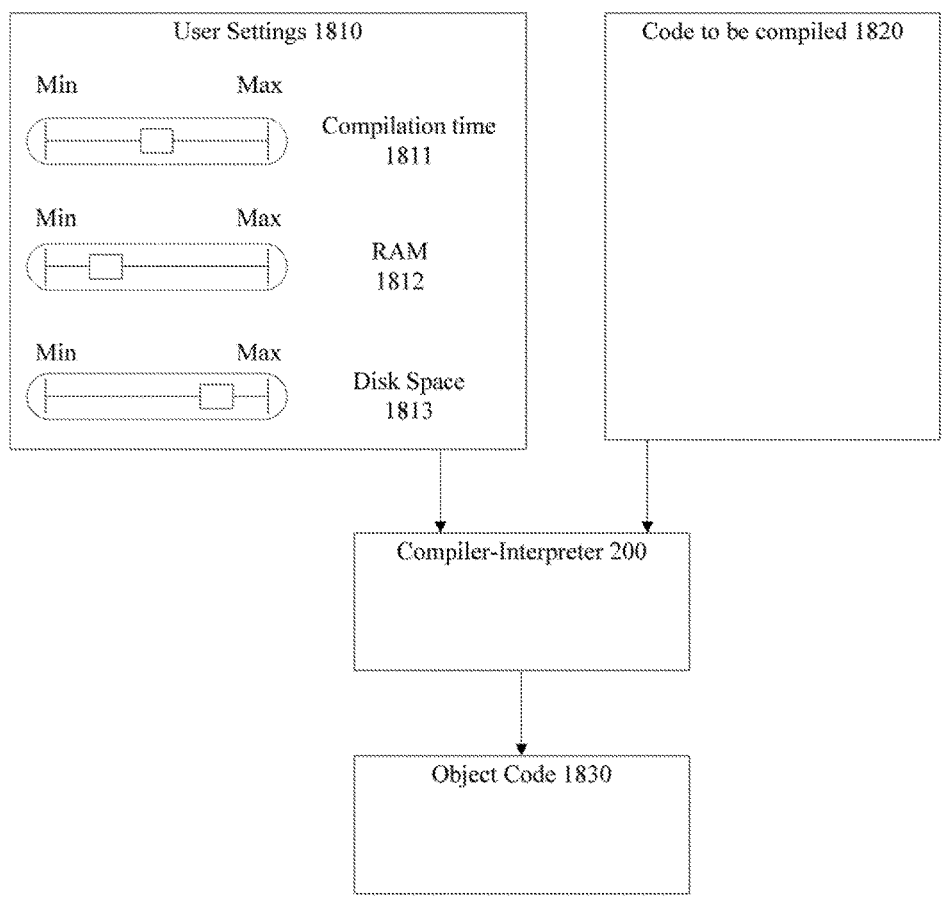
FIG. 18 is a schematic illustration of the compiler-interpreter being configured to accept user settings to tune its tradeoff between memory usage and time at compiletime vs. at runtime by pre-computing or partially evaluating parts of the program and caching the result.

As shown in FIG. 17, the compiler-interpreter may be configured to perform differential compilation by generating differential object code corresponding to parts of the program that have changed between two versions of a program's source code (1710). The program or object code 133 may comprise previously cached code (1735) and code requiring recompilation (1742). After a successful differential compilation, the code requiring recompilation (1742) can be transformed into newly compiled and cached code (1745). An exemplary process of differential complication may include:

receive a compile command (1720);
compare two versions of a program's source code (1725) to determine differences between the two programs (1725);
process parts of the program not requiring recomplication (1730). This may include:
   determining changed values not requiring recompilation; interpreting and executing the program directly from source code form that does not depend upon external inputs;
   interpreting or executing, then caching or memoizing, any parts of the program that do not depend upon external inputs; and incorporating cached or memoized values into generated object code as constant or lookup table (LUT) form;
compile parts of program requiring complication (1750); and
integrate newly compiled values into object code (1770) using the object code editor (1650).

A push operator consists of a value v and a destination reference x optionally indexed by a key k. Example syntaxes that could be used to link v and x could include, but are not limited to v−>x, x<−v, x.add(v) and x.push(v), or with an index key k, could include, but are not limited to v−>x[k], v−>x_k, x[k]<−v, x_k<−v, x[k].add(v) and x[k].push(v). A syntax that is configured to prevent the compiler-interpreter from reading values before the compiler-interpreter has computed the values is a syntax whose semantics are specifically defined to require a compiler-interpreter for the syntax to be configured to determine the DDG of a program, to ensure that the DDG is DAG-structured (i.e. that there are no cycles), and to ensure that the program operations corresponding to the DDG nodes are executed in an order that is consistent with the partial ordering represented by the DAG structure of the DDG, such that a given DDG node's dependency nodes are computed before the given DDG node itself.

A compiler-interpreter may be configured to compile source code to intermediate representation or object code, or to interpret the source code of a program and execute it directly, or to compile intermediate representation to object code, or to execute object code. A separate runtime environment may be configured to execute object code without needing the support of a full compiler-interpreter.

The ability to read the current value of a variable or memory location allows the code executing in one processor node P to read a value that was possibly modified by another processor node Q at a point in time unknown to P, meaning that P cannot in general know the origin of any value it reads in a storage location accessible to Q or any other processor, and can lead to race conditions among other problems. Destructively overwriting may be equivalent in its end effect to enabling readers of the variable or memory location to read the current value of the variable or memory location. Allowing readers of a variable or memory location to read the variable or memory location at any point in time, ignoring the partial ordering of a DAG-structured DDG, and in particular allowing a reader to read from a variable or memory location before the desired value in the variable or memory location has been computed and stored, causes race conditions and data corruption due to reading from uninitialized memory. Excluding operators that read the current value of a variable or memory location, or that allow the destructive overwriting of values, or that allow readers to read values before they have been computed, removes this source of indeterminism, eliminating the problems caused by these operators.

FIG. 19 illustrates a compiler-interpreter (200) configured to receive user settings (1810) specifying compilation time (1811), RAM (1812), and Disk Space (1813). The compiler-interpreter (200) can load the code to be compiled (1820), and using the user settings (1810) generate new object code (1830). The compiler-interpreter may be configured to read user-provided settings that specify how much overhead, in terms of compilation time, RAM, disk space or additional space that may be taken up in the generated object code, for evaluating portions of a program that do not depend on external inputs, and for storing the interpreted, executed or pre-computed instructions directly from source code form during compilation in order to trade off the size of generated object code and the amount of time spent by the compiler-interpreter in interpreting or executing code against total expected execution time of the generated object code.

Figure 19A:
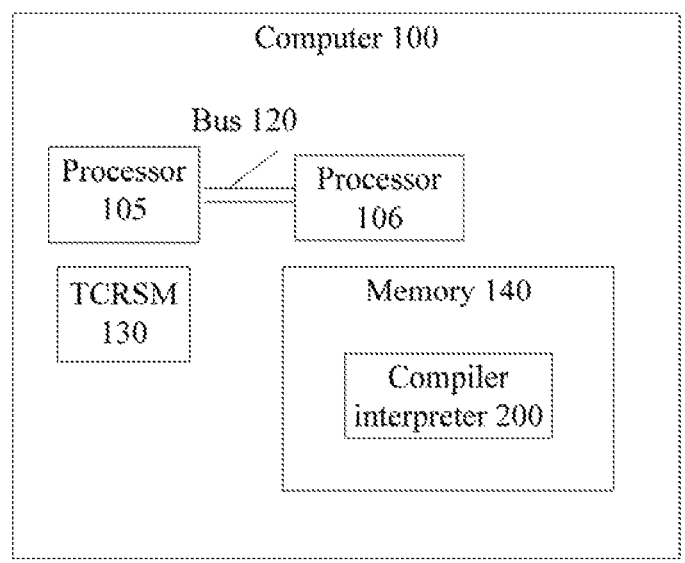
FIG. 19A is a schematic illustration of a computer consisting of a processor and attached memory.
Figure 19B:
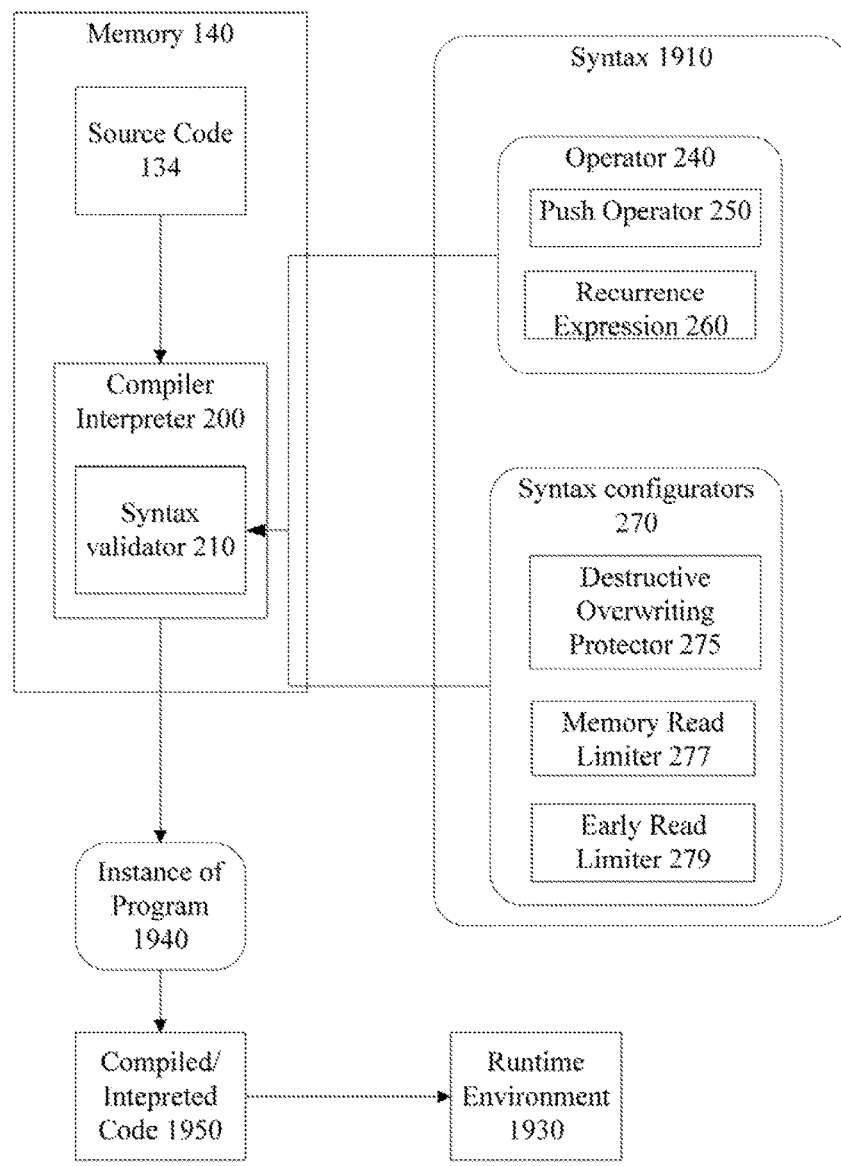
FIG. 19B is a schematic illustration of a programming language's syntax configured to include a push operator or recurrence expression, and limited to disallow destructive overwriting of values, or reading the current value of a variable, or attempting to read a value before it has been computed.

As shown in FIGS. 19A and 19B, a computer is shown comprising a processor; tangible computer readable storage media connected to the processor, and a communications bus or network interface for connecting the processor to one or more additional processors. The storage media may comprise instructions to cause the processor to execute: a syntax validator (1920) configured to require a language to conform to a syntax (1910). The storage media may comprise instructions to cause the processor to execute a compiler-interpreter (200) configured to compile or interpret source programmed in the language having the syntax that has been validated by the syntax validator (1920) into a program. The storage media may comprise instructions to cause the processor to execute a runtime environment (1930) configured to execute object code (1950) produced by the compiler-interpreter to produce an instance of the program (1940). The syntax (1910) may comprise operators (260) including a push operator (250) and a recurrence expression (260). The syntax (1910) may comprise configuration parameters including: a memory read limiter configured to prevent reading a current value of a variable or memory location, distributive overwriting protection configured to prevent destructively overwriting a current value of a variable or memory location, and early read limiter configured to prevent reading from a location where a value is to be stored before an intended value is stored at that location.

In some configurations, compiler-interpreter may be configured to:

apply the syntax of the language to source code of a program written in the language to validate the program; and interpret and execute the program or generate object code from the program that may be executed by a runtime environment, The syntax may include one or more operators selected from the group consisting of: a push operator and a recurrence expression.

The syntax may exclude operators selected from the group consisting of: reading the current value of a variable or memory location, destructively overwriting a current value of a variable or memory location, and reading from the location where a value is to be stored before an intended value is stored at that location.

The language may be executed by the compiler-interpreter or by the compiler-interpreter to produce object code which is executed by the runtime environment.

Figure 20:
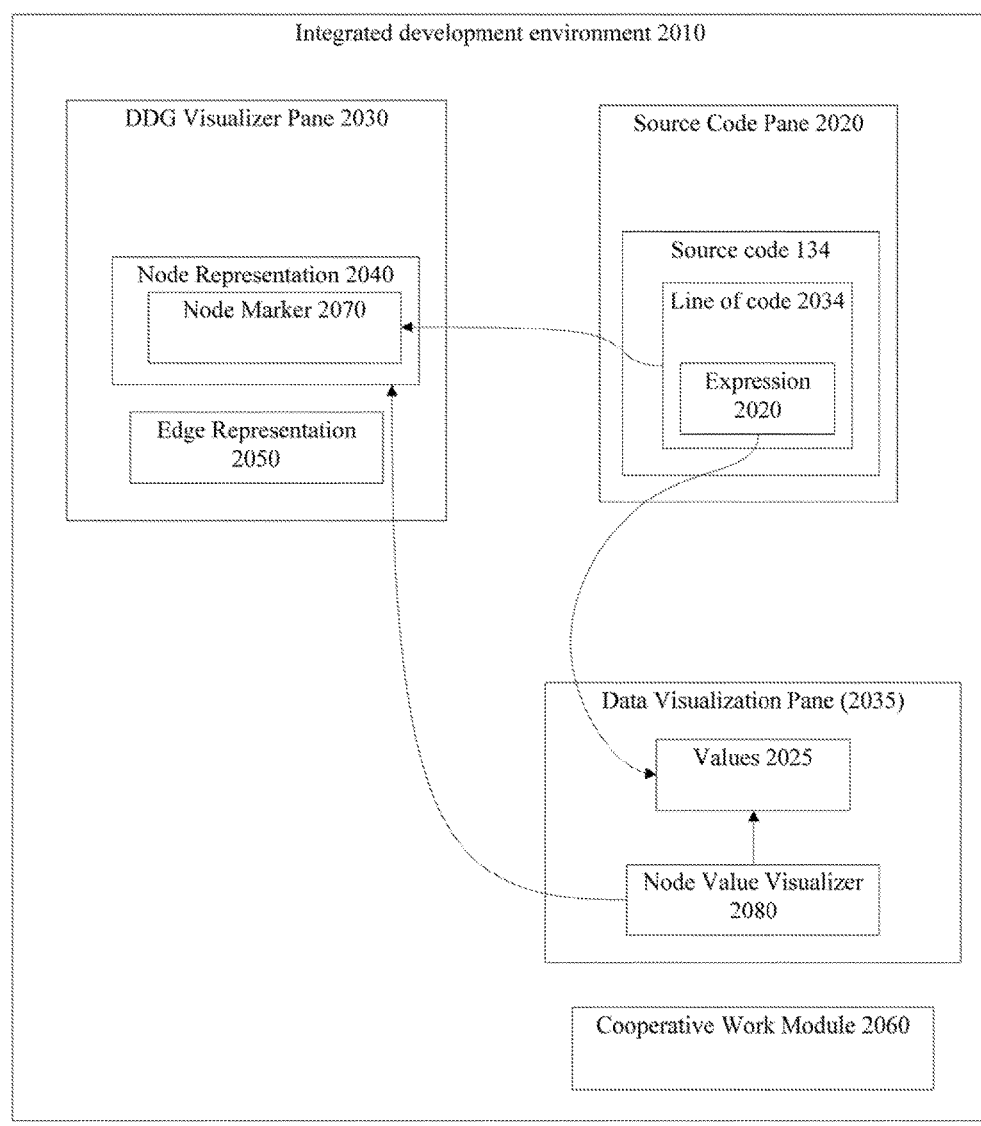
FIG. 20 is a schematic illustration of an Integrated Development Environment (IDE) illustrating a DDG visualizer pane, a source code pane, and a value pane.

As shown in FIGS. 1, 2, and 20, the storage media (130) may comprises instructions to cause the processor to execute an integrated development environment (2010) comprising: a source code pane, and a DDG visualizer pane. The source code pane (2020) may comprise source code (134); the source code may comprise a plurality of source code lines (2034); the source code lines may comprise one or more expressions (2020). The data visualization pane (2035) may be configured to display computable value or collection of values (2025) of the source code lines and expressions. The DDG visualizer pane (2030) may be configured to: display one or more node representations (2040), each to correspond with one or more source code lines or expressions in the source code, and edge representations connecting pairs of node representations to indicate data dependencies between the source code lines or expressions corresponding with the node representations; display an edge representation (2050) if the DDG visualizer pane is displaying at least one pair of node representations comprising a dependent node representation and a dependency node representation having the property that the source code line or expression represented by the dependent node representation has a data dependency on the source code line or expression represented by the dependency node representation.

One benefit of showing the DDG visualizer pane next to the source code pane in the IDE is (i) to keep text-based source code editing as the primary means of developing code, while graphically augmenting the text-based view with a graphical display of the data dependency graph, so that it is easy to see relationships between lines of text or expressions in a program; (ii) to make it easy to see the structure of dataflow within the program; (iii) to enable "omniscient debugging" by allowing a programmer to step forwards or backwards through time as a program runs, or after a breakpoint or error condition is reached, but allowing these steps to occur directly along data dependencies, rather than requiring the user to single-step through each operation that a program took: once a programmer has identified a problematic value generated by the program, they can immediately see where that value came from and how it was computed, then how the values it depends on were computed, and so on back to the origin of the problem.

The IDE may be configured to include an integrated compiler-interpreter, such that code can be compiled, interpreted and executed in the IDE, as it is being edited or in a separate run/execute step. The IDE may be configured to track the mapping between lines or expressions in a program and values or collections of values computed by those lines or expressions, including when those values or collections of values are cached or memoized, or when they are stored on the stack, in the heap, in a file or in a database or similar storage mechanism.

Continuing to refer to FIGS. 1, 2, and 20, the integrated development environment 2010 may be configured to compute or cause to be computed the computable value or collection of values for each source code line or expression. The integrated development environment 2010 may comprise a data visualization pane (2035) to display a representation of a computed value or set of values for a specific node representation selectable by a user in the DDG visualizer pane, wherein the data visualization pane is configured to provide a user-configurable display type comprising a tabular textual view or a graphical visualization of data. The integrated development environment may comprise: a node marker (2070) configured to mark DDG nodes corresponding to changed source code lines; the node marker also configured to mark the downstream transitive closure of marked DDG nodes. The integrated development environment may comprise a node value visualizer (2080) configured to display output data based on the linked code segment; and display the output data in a program editor window or a pop-up dialog. The integrated development environment may comprise a cached or memoized value deleter (2090) configured to delete cached or memoized values when there are no remaining references to cached or memoized values.

In addition to the text editor pane and DDG visualizer pane, the IDE may also support a visualizer pane or popup frame that is shown when the user clicks on an expression in the text editor pane or a node representation in the DDG visualizer pane. This visualizer pane or popup is configured to render a graphical representation of the value or collection of values computed by the expression, statement or source code line represented by the DDG node representation. The visualizer pane is furthermore configured to check the type of the expression, statement or line represented by the DDG node representation to determine which types of visualizations are appropriate for the specific DDG node, for example if the values computed by the node are pairs of floating point values, then the visualizer pane is configured to offer the option of displaying the data as a 2D scatterplot. The visualizer pane is also configured to display a string representation of values, or a tabulated representation of collections of values. The vizualizer pane is typically used during debugging, or after a program has run, to display the memoized or intermediate values computed by the program, and to visualize the final output of the program.

The DDG visualizer pane contains DDG node representations connected by DDG directed edge representations (arc representations). The node representations typically correspond with a single DDG node in the data dependency graph of the program that is being edited in the text editor pane; however, it is possible to display one node representation for a group of DDG nodes. In the case of one node representation representing a group of DDG nodes, all the incoming or outgoing DDG edges to or from any of the DDG nodes in the group will be displayed with edge representations drawn as incoming or outgoing (respectively) to the single node representation that represents the group. In other words, several DDG nodes may be "collapsed down" into a single node representation for simplification of the display, but the edge representations stay connected to the collapsed node representation. This is useful if a single line of source code produces several DDG nodes in the data dependency graph, but there is room in the DDG visualizer pane to show only one node representation for that source code line. It is also useful for "code folding", e.g. for summarizing an entire loop body, function or other block as a single node. The DDG vizualizer pane may choose to show only a subset of the entire DDG graph at one time, for example the specific node representation corresponding to the line that the user is currently editing in the source code editor pane, the edge representations connected to that specific node representation, and node representations for all nodes adjacent to the specific node representation along connected edge representations. Since source code is typically edited in a Roman font, which reads left-to-right then top-to-bottom, the DDG visualizer pane will typically be displayed to one side of the source code editor pane, and node representations in the DDG vizualizer pane will typically be drawn next to, and at the same vertical position as, the expression, statement, source code line or block that they correspond to; furthermore, if the programming language does not allow forward references in the source, this will cause all edge representations to point in the same direction (downwards, if the arrow representation follows the dataflow direction, or upwards, if following the mathematical convention of drawing the arrowhead for a dependency arc at the dependency end of the arc, not the dependent end of the arc). Nevertheless, other configurations are possible, such as displaying the DDG visualizer pane in a separate window, or on a separate monitor, or displaying the DDG visualizer pane above or below the source code editor pane. The DDG could also be drawn horizontally rather than vertically, such that nodes further to the right or left correspond to nodes further down in a program's source code. The important and salient point to the existence of the DDG visualizer pane is to allow the user to visually see the structure of data dependencies in the program, and to see the correlation between the source code and the structure of the data dependency graph of a program.

The node representation generator is a system designed to determine how to render a DDG node or nodes, and the edge representation generator is a system designed to render a DDG edge or edges. These generators change their rendering depending on: how many DDG nodes need to be drawn grouped together into each node representation due to code folding, space available in the DDG visualizer pane, which line of text the user is editing in the code editor pane, whether the visualizer pane is configured to display the whole DDG or just the DDG node corresponding to the edit point in the source pane and adjacent edge and node representations (as described above), and other language-dependent or data-dependent factors that affect the visualization of the DDG and the associated cached or memoized values computed for nodes in the DDG, in order to appropriately display meaningful information to the user about the structure of the program and the values computed by it.

A value deleter may be configured to delete cached or memoized values when they are no longer needed, either when requested by the user, or for garbage collection purposes to respect constraints on the maximum amount of space that may be used by cached or memoized values, or when a program has been changed by a user such that cached or memoized values that were previously produced are no longer useful or relevant because they were produced by an older (and now non-existent) version of the program. The value deleter may be configured to support deleting cached or memoized values in any medium that the compiler-interpreter is configured to create cached or memoized values in, including in RAM, flash, magnetic storage, a file, a database, or other storage mechanism.

Figure 21:
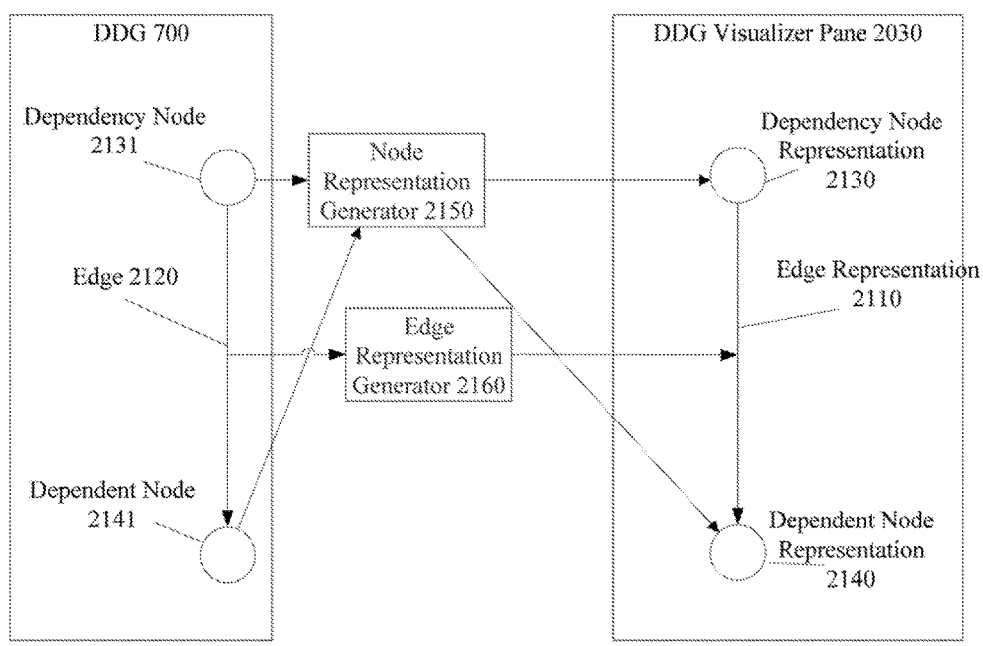
FIG. 21 is a schematic illustration of a node representation generator generating node representations in the DDG visualizer pane, and an edge representation generator generating edge representations in the DDG visualizer pane.

Referring to FIG. 21, a DAG (700) and a DDG Visualizer pane (2030) is shown. The DAG (700) has a dependency node (2131), and edge (2110), and a dependent node (2141). The node representation generator (2150) can create representations of the node (2130) and (2140). The edge representation generator (2160) can create edge representation (2110) of the edge (2120). The DDG visualizer pane (700) may be configured to display the edge representation in the form of an arrow having: a direction logically connecting a first point to the dependent node representation, and a second point to the dependency node representation; wherein logically connecting the first point or the second point of an edge representation to a node representation visually indicates that the first or second point is associated with the node representation. The DDG visualizer pane (700) may be configured to: visually identify the dependency node and dependent node with an arrowhead (2120) or visual marker; or require the dependency node to be displayed at a higher vertical position than the dependent node. The integrated development environment may be configured to display the DDG visualizer pane adjacent to the source code pane.

Edge representations are often as arrows with arrowheads or some other visual indicator of edge direction. However, if the programming language does not allow forward references (i.e. always requires definitions of a value to be listed earlier in the program than the value is used), then the arrowhead could optionally be omitted, since the arrows will always point in one conventional direction (upwards or downwards) as described above.

A node marker implements an algorithm to determine the downstream transitive closure of a marked DDG node or a group of marked DDG nodes. This algorithm may be implemented as follows. (After this implementation of the algorithm completes, all nodes in the downstream transitive closure of an initially-marked node or group of nodes are also marked.) This particular algorithm is a depth-first search, following dependency edges from dependency to dependent node, and only visiting nodes once, marking them once they are visited.

```
Initialize a new empty queue q
For all initially marked DDG nodes n
    For all dependent nodes d of n (i.e. nodes d with n as a dependency):
        Add d to q
While q is not empty:
    Remove the head of q and store it in h.
    If h is not marked:
        Mark h
        For all dependent nodes d of h (i.e. nodes d with h as a
        dependency):
            Add d to the tail of q
```

Once the downstream transitive closure has been obtained, the marked nodes in this transitive closure may be scheduled for re-computing in DAG dependency order using a work queue or other scheduling mechanism. Typically the scheduler for marked nodes will be a variant of the scheduler used to run the entire program, modified to execute only marked nodes where possible, re-using cached or memoized values instead of re-executing un-marked nodes (unless there is no cached or memoized value or collection of values available for an un-marked node, in which case that node may also need to be re-computed too).

Still referring to FIG. 21, the integrated development environment may comprise: a node representation generator (2150) configured to generate and render the dependent node representation and the dependency node representation in the DDG visualizer pane for source code lines or expressions in the program source code; and an edge representation generator (2160) configured to generate and render the edge representation linking the dependent node representation and the dependency node representation if the source code line or expression corresponding to the dependent node representation has a data dependency on the source code line or expression corresponding to the dependency node representation. The integrated development environment may comprise at least one component selected from the list consisting of a compiler-interpreter, compiler, an interpreter, a runtime environment, a debugger, and a data inspector.

The IDE may be configured to include the functionality of the compiler-interpreter, or may only assist in code editing and data visualization, communicating with the compiler-interpreter to determine the structure of the DDG and to compile or interpret code. The compiler-interpreter may optionally be split into a separate compiler and interpreter, or may be implemented as a compiler without interpreting capabilities, or an interpreter without compiling capabilities. The compiler-interpreter may have the capability of running or executing code itself, or a separate runtime environment may be created or employed for running object code compiled by the compiler-interpreter or compiler. A debugger for a may be built into the compiler-interpreter, compiler, or interpreter for debugging a program as it runs or after it has run, in particular configured with the capability of displaying to the user cached or memoized values, and internal values computed as the program runs. The debugger may be built into an IDE for the language or may be a standalone program. The ability of the debugger to display values to the user that have been computed by the program may be built into the debugger or an IDE, or may be made available in a separate data inspector program.

Figure 22:
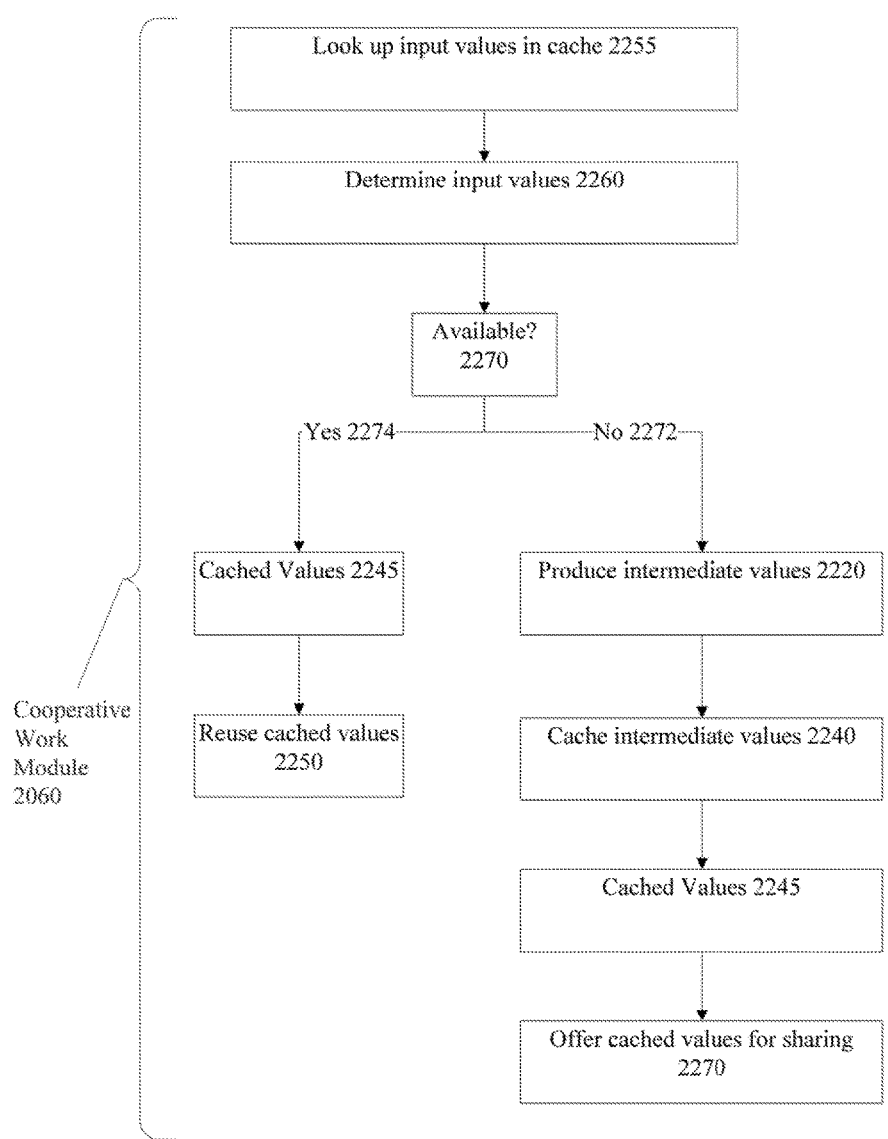
FIG. 22 is a schematic illustration of intermediate values being computed by a program and cached for reuse on subsequent runs of the program, or for reuse when the program is run by other users in a collaborative work environment.

Cached or memoized values may be reused across runs of the same piece of code when called with the same parameters. A collaborative work module may be configured to allow multiple users to share cached or memoized values on the same computer or across a network whenever they are calling the same piece of code with the same parameters. To enable this sharing, both the code and its parameters are versioned, using timestamping, version codes or hashcodes (collectively, "version codes"). The compiler-interpreter, IDE or runtime environment may consult a shared database or table that maps these version codes to cached or memoized values. If the combination of a version code computed from the parameters to a piece of code and the version code produced from the code itself match an entry in the database, the cached or memoized values are returned directly, without the user needing to re-run the code. Referring to FIG. 22, the cooperative work module (2060) may be configured to: produce an intermediate value or set of values by executing the expression with associated inputs (230); cache or memoize the intermediate value or set of values by storing the value or set of values in tangible computer readable storage media (2240); reuse the cached or memoized value or set of values instead of re-executing the expression with the same input values if the expression is executed with the same associated inputs, thereby preventing duplication of computational work (2250); and determine the input values are the same by timestamping, using version codes, or calculating hashcodes (2260). The cooperative work module may be configured to offer one or more instances of the integrated development environment the set of cached or memoized intermediate values for sharing and reuse during collaborative programming (2270).

As shown, the cooperative work module (2060) would look up input values in cache (2255), and determine input value (2260). The cooperative work module (2060) would determine whether the cached values were available (2270) for these input values. If not (2272), the cooperative work module 2060 would produce intermediate values (2206), cache intermediate values (2240), cached values (2245), and offer cached values for sharing (2270). If yes, the cached values 2245 would obtained and reused (2250).

Node representations in the DDG visualizer pane may be selected with the mouse and dragged upwards or downwards (where the orientation of the DDG graph is vertical, to coincide with the vertical orientation of the scroll direction of the source code editor pane), assuming that the dragged DDG node representation corresponds to an entire line or block in the program. Dragging a DDG node representation will cause the corresponding line or block to move upwards or downwards to the source code position corresponding with the end of the drag event, if the final position is a valid place to move the corresponding line or block to. If the programming language does not allow forward references, all DDG edge representations will point in the same direction (e.g. downwards if the arrow direction indicates the dataflow direction, as discussed above). A node representation may therefore be dragged upwards or downwards just short of the position at which a connected edge representation would change direction, as this would create a forward reference. Therefore, a node representation may be dragged as far up as the vertical position of the line below the lowest dependency node of the dragged node, or as far down as the vertical position of the line above the highest dependent node of the dragged node. Lines or blocks may also be reordered with the keyboard rather than the mouse, with the same effect and limits as using the mouse.

When a source code line or block is moved upwards, the lines between the old and new position of the moved line or block move down, and when a source code line or block is move downwards, lines between the old and new position of the moved line or block move upwards. The downstream transitive closure of a DDG node may be the set of all nodes reachable from the DDG node, following dependency edges only in the direction from dependency to dependent node.

Figure 23:
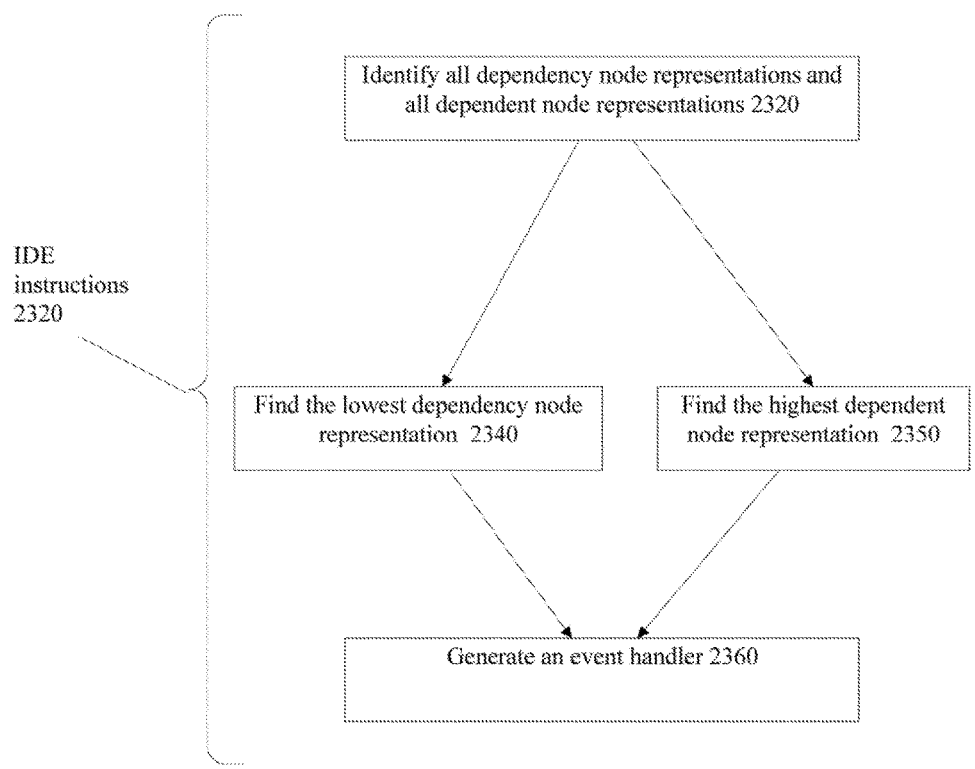
FIG. 23 is a schematic illustration of an IDE determine the highest and lowest possible drag positions for a node representation, and setting up an event handler to allow the node representation to be dragged within this range of positions.

Referring to FIG. 23, the integrated development environment may comprise IDE instructions (2320) for causing the integrated development environment to: for a specific node representation, identify (230) all dependency node representations and all dependent node representations connected to the specific node representation via an edge representation, forming a set of dependency node representations and a set of dependent node representations; the set of dependency node representations having a lowest dependency node representation; the set of dependent node representations having a highest dependent node representation. The integrated development environment may comprise IDE instructions (2320) for causing the integrated development environment to: find the lowest dependency node representation (2340) by identifying a vertical position among the dependency node representations having the lowest visual height among the set of dependency node representations. The integrated development environment may comprise IDE instructions (2320) for causing the integrated development environment to: find the highest dependent node representation (2350) by identifying a vertical position among the dependent node representations having the highest visual height among the set of dependent node representations. The integrated development environment may comprise IDE instructions (2320) for causing the integrated development environment to: generate an event handler (2360) chosen from the list consisting of: an event handler to track drag actions initiated with a pointing device, identifying a specific dragged node representation using a position associated with the pointing device; and an event handler to track move actions initiated with a keyboard, identifying a specific moved node representation by identifying the corresponding source code line or expression being edited in the source code editor pane.

Figure 24:
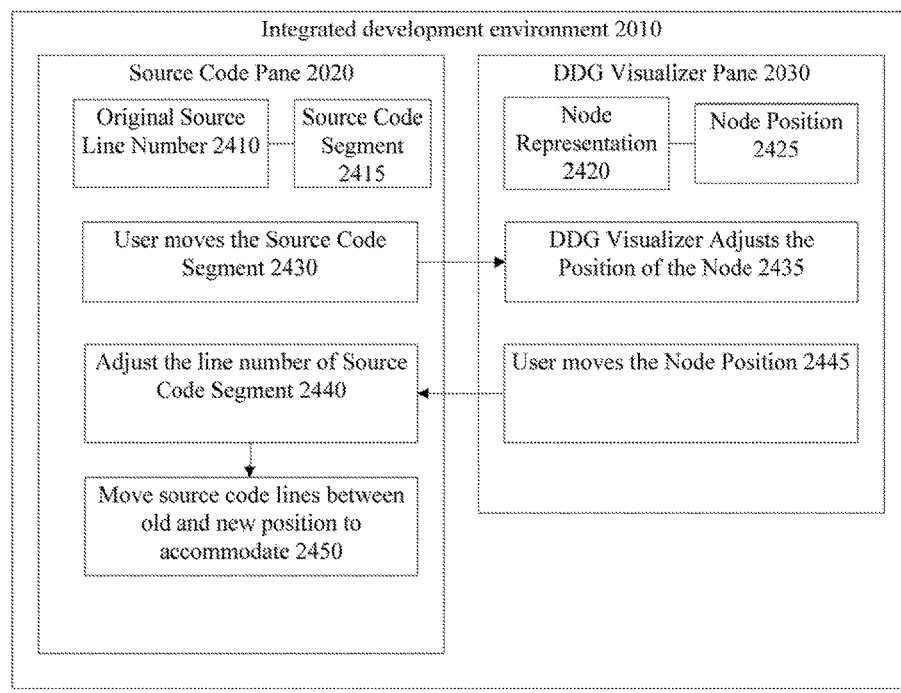
FIG. 24 is a schematic illustration of the IDE being configured such that the user can drag source code lines, causing the corresponding node in the DDG visualizer pane to move accordingly, or such that the user can drag nodes in the DDG visualizer pane, causing the corresponding source code line in the source code editor pane to move accordingly.

As shown in FIG. 24, the integrated development environment 2010 may be configured to: move a source code line or expression from an original source code line number to a new source code line number, in relation to a drag or movement from an original vertical position to a new vertical position of the dragged or moved node representation; and move the source code lines between the original and new source code line number higher or lower in source code number to accommodate the move of the moved source code line. The source code lines may have a vertical position; the node representations may have a vertical position; wherein the integrated development environment is configured to set the vertical position of the node representation to align with the vertical position of the corresponding source code line or expression. The integrated development environment may be configured to move the dragged or moved node representation as far upwards as the vertical position immediately below the lowest dependency node representation, or as far downwards as the vertical position immediately above the highest dependent node representation. The integrated development environment may be configured to move the dragged or moved node representation upwards or downwards to a new vertical position such that the dragged or moved node remains visually below its dependency node representations, and visually above its dependent node representations. As shown, the original source line number (2410) of the source code segment (2145) in the source code pane (2020) has a corresponding node representation (2420) and node position (2425) in the DDG Visualizer Pane (2030). If the user moves the source code segment (2430), the DDG visualizer pane can track the movement and adjust the positions of the node (2435). If the user moves the node position (2445) the source pane (2020) can update the line number of the source code segment (2440). Also, the source code pane (2020) can move the source code lines between old and new position to accommodate (2450).

Figure 25:
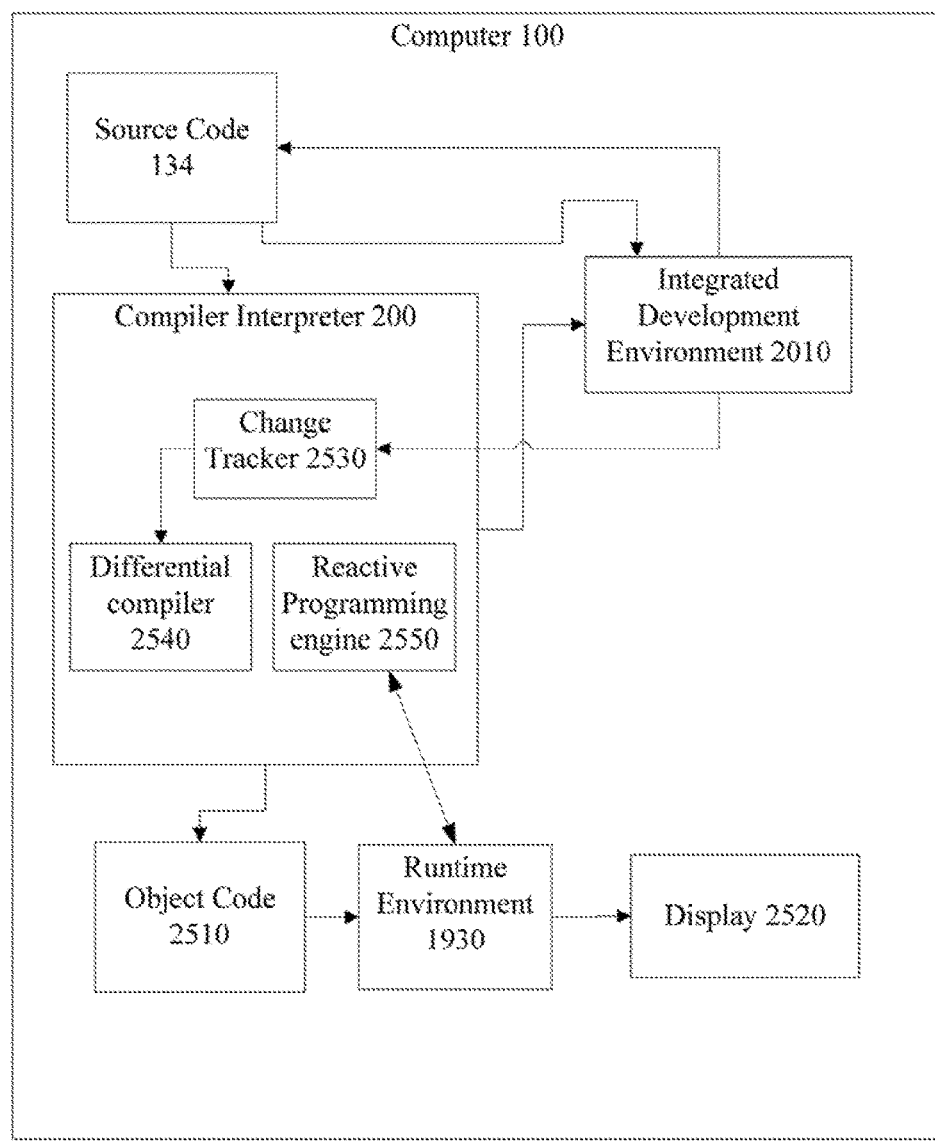
FIG. 25 is a schematic illustration of the compiler-interpreter and IDE configured to work together to provide a user interface and functional reactive programming experience to a user.

Referring to FIG. 25, the integrated development environment (2010) may be configured to perform differential compilation when a program is modified, such that the modified parts of the program are interpreted or compiled and executed, and such that the modified parts of the program are enabled to reuse cached or memoized values computed by data dependencies so that they may resume execution immediately, enabling reactive programming. The integrated development environment (2010) may be configured to: receive data from the compiler-interpreter (200); and display (2520) program output including intermediate and final values; and the source code pane of the integrate development environment (2010) may be configured to allow a user to edit the source code in the source code pane. The compiler-interpreter may be configured to perform reactive programming as the source code in the source code pane is edited. The compiler-interpreter may comprise a change tracker (2530) configured to: monitor changes in the source code; instruct the compiler-interpreter to perform a differential compilation of the source if the change tracker determines there has been a change in the source code of the program; and determine downstream transitive closure of dependent nodes for the DDG nodes that correspond to changes in the source code. The compiler-interpreter (200) may comprise a differential compiler for performing differential compilation and a reactive programming engine (2550) for performing reactive programming. The differential compiler (2540) configured to perform differential compilation when a program is modified, such that modified parts of the program are interpreted or compiled and executed, and such that the modified parts of the program are enabled to reuse cached or memoized values computed by data dependencies so that they may resume execution immediately, enabling reactive programming, for sharing and reuse during collaborative programming.

Figure 26:
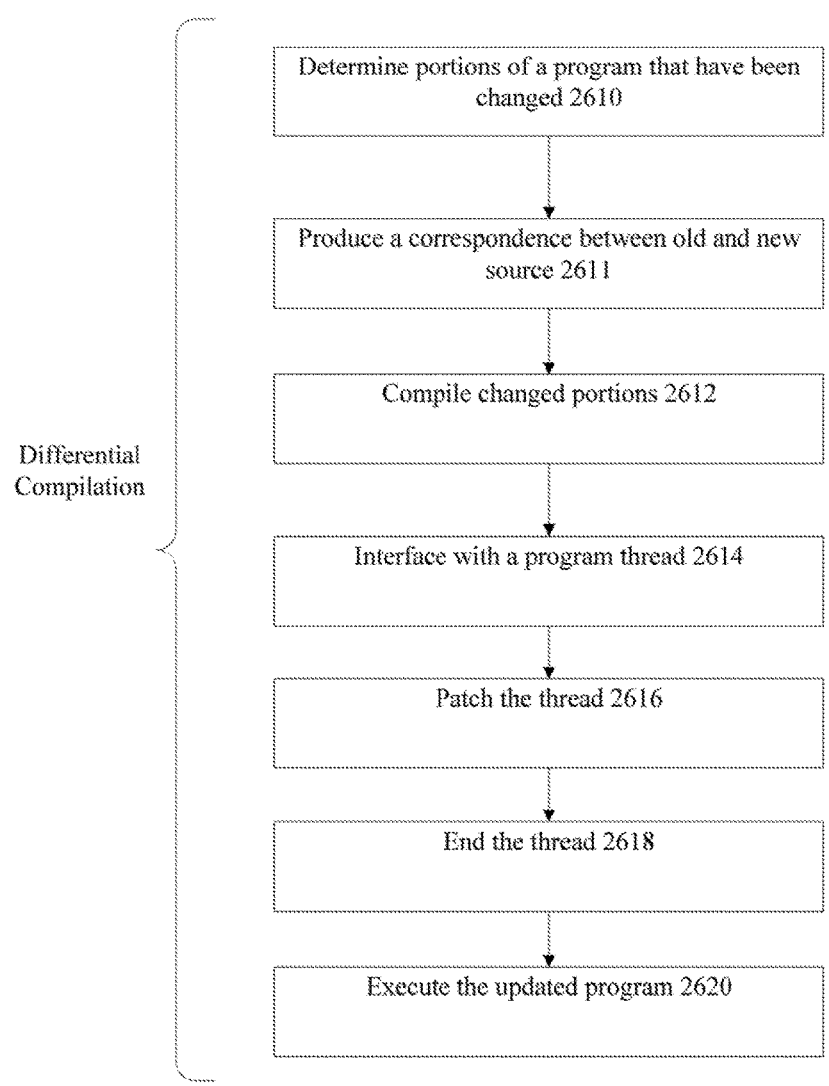
FIG. 26 is a schematic illustration of the process of differential compilation.

FIG. 26 illustrates an exemplary process flow for performing differential compilation. Exemplary process steps may include: determining portions of a program that have been changed by performing a source code or dependency graph structure comparison (2610); producing a correspondence between an old source code version and a new source code version (2611); compiling only the changed portions to create newly compiled code (2612); interfacing with a thread of the program by using a debugging API or communication channel by modifying the contents of the storage media to replace old code with the newly compiled code (2614); patching the thread with the newly compiled code to generate an updated program (2618); ending the thread (2618); and executing the updated program (2620).

The compiler-interpreter may be configured to interface with a running thread of a program through operating system interfaces, through a debugging API, by means of an IPC or RPC mechanism, over shared memory, through a hardware register, through an interrupt, or over a network communication channel. The compiler-interpreter may be configured to patch a thread by direct code manipulation, by calling a debugger API, or by giving instructions to a runtime environment to patch code or reload a changed version of a class or piece of code. The compiler-interpreter may be configured to end a thread and start an updated program at a specific position through operating system interfaces or a debugging API.

Figure 27:
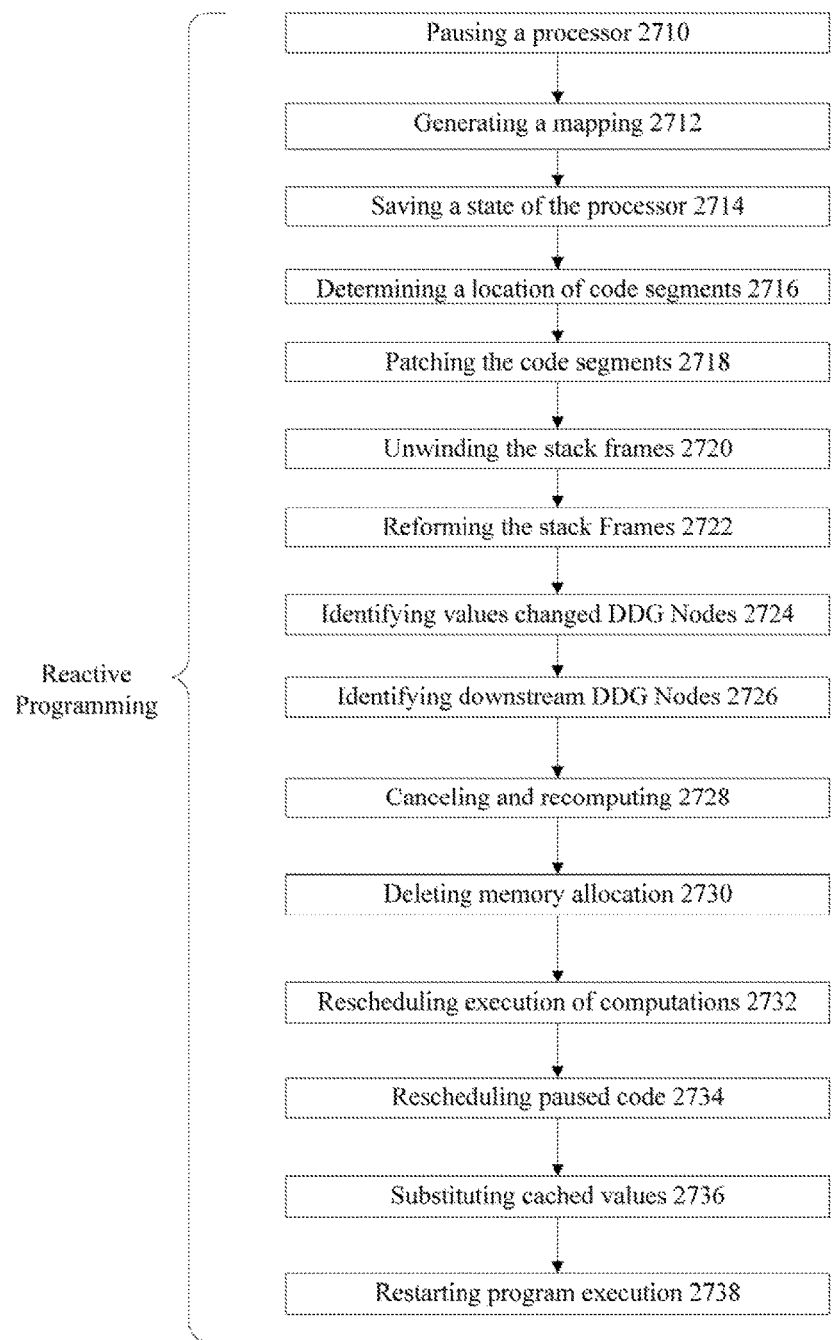
FIG. 27 is a schematic illustration of the steps involved in implementing functional reactive programming using a DDG-based programming language.

FIG. 27 illustrates an exemplary process of reactive programming. The process may comprise: pausing a processor executing code of a program (2710); generating mapping between compiled code and source code (2712); saving a state of the processor and program when the processor was paused (2714); determining a location of code segments in the program by using the generated mapping to look up the position in the compiled code for each changed source code segment (2716); patching the code segments with newly compiled segments to form a new code structure, by removing compiled code segments corresponding to each removed source code segment, and adding compiled code segments for each added source code segment (2718); unwinding stack frames of the program, by finding which source code element or compiled code element corresponded to each stack frame's execution offset when the processor was paused, using the generated mapping between compiled code and source code (2720); re-forming the stack frames using the new code structure, by finding a source code element or compiled code element in the changed version of the program corresponding to the execution offset of each stack frame, reporting an error if such a correspondence cannot be found (2722); identifying values of DDG Nodes that have been marked as changed (2724); identifying values of DDG nodes in a downstream transitive closure of the marked node (2726); canceling and recomputing the identified nodes and determining updated values (2728): deleting memory allocation corresponding to any canceled values (2730); rescheduling execution of any computations that produced the canceled values (2732); rescheduling execution of code that was running when the processor was paused (2734); substituting any cached or memoized values corresponding to code that is scheduled to be executed (2736), so that the code and its inputs match code and inputs that produced previously cached or memoized values; and restarting program execution from the rescheduled computations (2738).

The compiler-interpreter may be configured to enable functional reactive programming by responding to code changes made by the user as follows: when code is changed while the program is running or after it has terminated, the compiler-interpreter determines the difference between the old code and the new code, either looking at the source, or at intermediate code, or at compiled code, then it patches the old version of the program to transform it into the new version, or replaces the old version with the new version. The compiler-interpreter may be configured to compare the old version and the new version of the code, in particular the difference between the DDG structure of the old version and the new version, and then marks DDG nodes corresponding to the differences and the downstream transitive closure of DDG nodes corresponding to the differences, and then scheduling all marked nodes to be re-computed in DAG dependency order (if they have already been computed), discarding any values already computed by these marked nodes. During re-computation, memoized or cached values are used wherever possible. The effect of this configuration of the compiler-interpreter is to recompute the minimal possible subset of values computed by the program in the event of a change to the program by the programmer. Combined with use of the data vizualizer pane in the IDE, this can provide near-instant feedback to the user about the effect of code changes they are making on values computed by the part of the program they are editing, reducing the latency of writing, running and debugging code to close to nothing.

Figure 28:
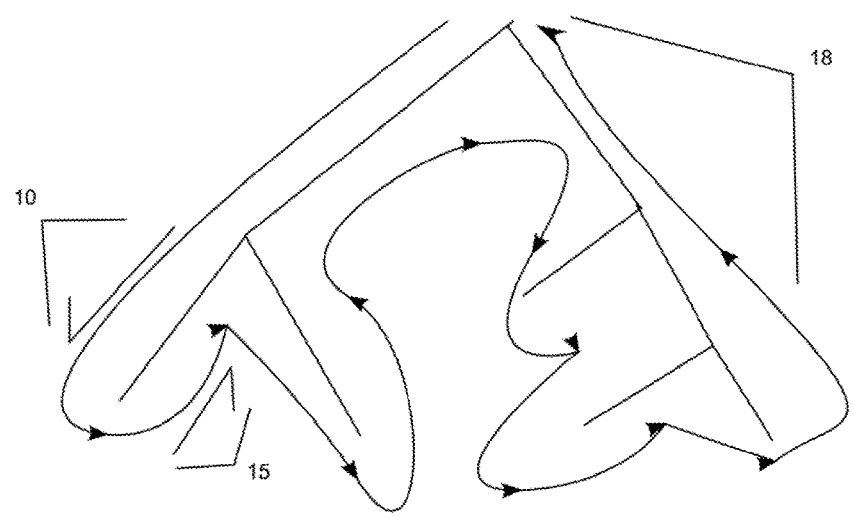
FIG. 28 is a schematic illustration of how pure functional programming languages pass values down a call tree as parameters, and receive values back up the call tree as return values.

FIG. 28 shows a functional programming module 5. Element 10 illustrates parameter values, element 15 illustrates return values, and element 18 illustrative a recursive call tree.

Figure 29:
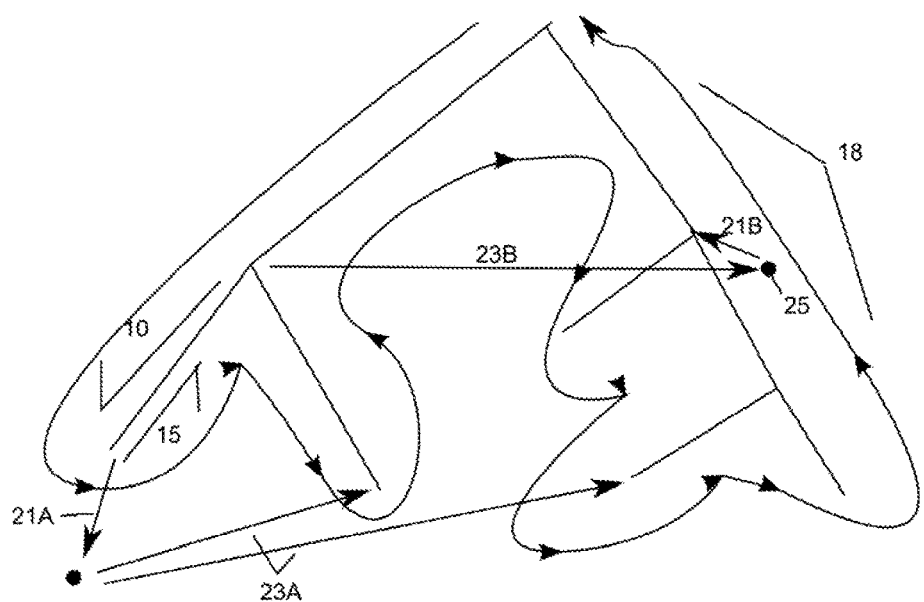
FIG. 29 is a schematic illustration of how imperative programming languages can write to and read from external state not included in the parameters passed to a method.

FIG. 29 shows an imperative programming module 6. Element 20 illustrates parameter modules, element 25 illustrates return values, and element 28 illustrates an external state. A first write function 21A, second write function 21B, first read function 23A, and second read function 23B are shown. Element 25 shows an external state.

Figure 30:
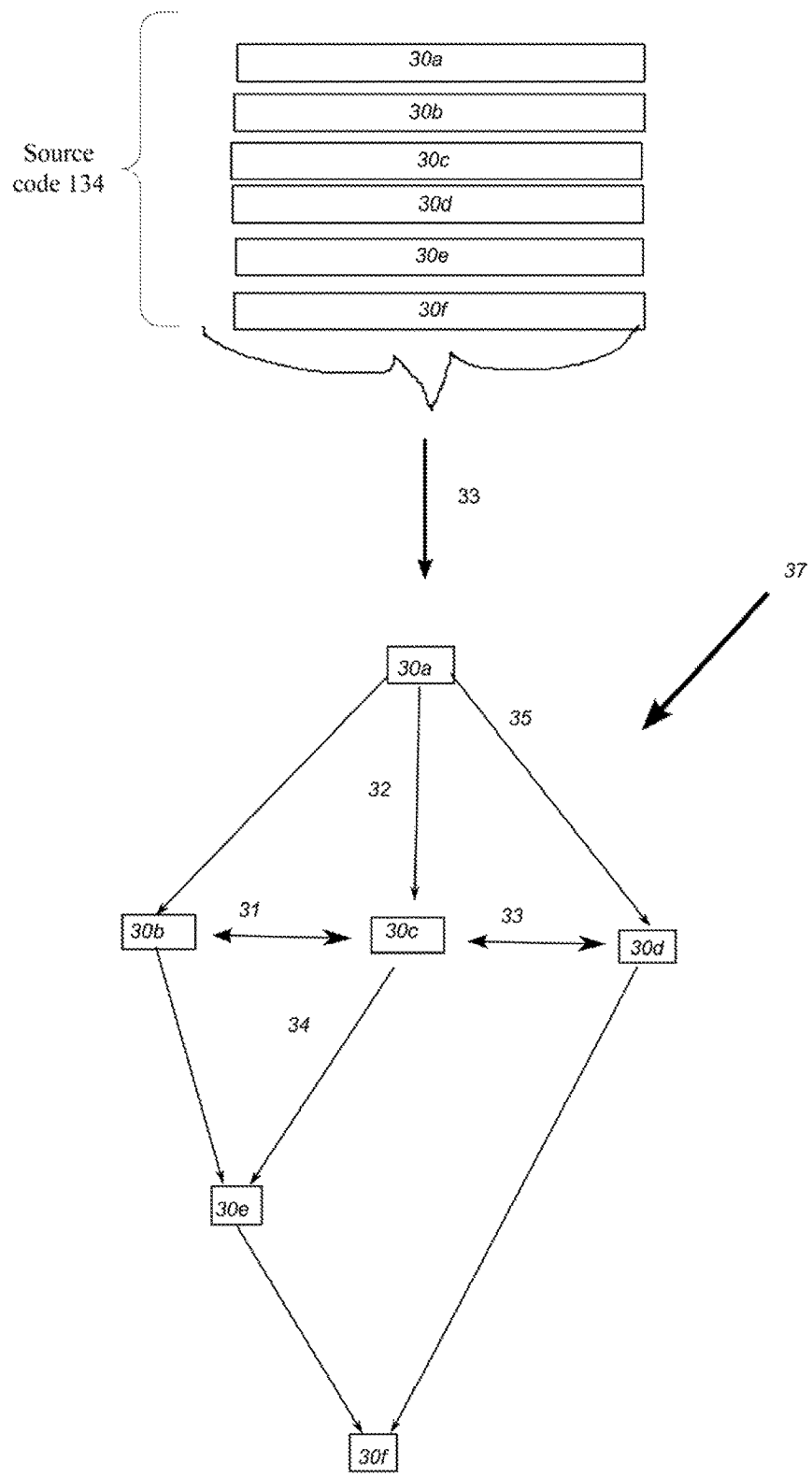
FIG. 30 is a schematic illustration of how a compiler-interpreter builds a DAG-structured DDG from a program's lines, different to how functional and imperative languages work; this figure also indicates opportunities for parallelization in the program DAG.

FIG. 30 illustrates a lattice-based programming module. As shown, Function 30a=File("x.csv"), function 30b=f(30a), function 30c=g(30a), function 30e=h(30b, 30c), function 30d=p(30a), and function 30f=q(30e, 30d). 30a. CSV is a file type (comma separated value) is a basic way of storing data in a text document readable by most spreadsheet interpreters (e.g. Excel). Thus function 30a is equal to whatever data is in X.csv. 30b. f(30a) means apply so random function f(x) on the value of 30a. Thus this yields in this example f("X.csv") f(x) could be any function such as X-5 or it could be a series of complicated functions to transform the values in X.csv. 30c is very similar to 30b, except the function is g(x). f and g may be the same or different functions. Same applies for 30d, it's p(30a). 30e and 30f are compound functions. In simpler notation, 30e=h (x,y). After a compile 33 operation, elements 30a, 30b, 30c, 30d, 30e, and 30f are transformed into graph 37. Symbolically, elements 30a, 30b, 30c, 30d, 30e, and 30f may be written as a, b, c, d, e, and f respectively. In graph 37, process 31=f( ), process 32=g( ), process 33=q( ), process 34=h( ), and process 35=p( ). Processes 31 and 33 may be executed in parallel.

FIG. 30 illustrates a DAG having a partial ordering. Elements X, Y, Z are arcs. In this graph, arrows shown lower in the figure occur after arrows shown higher in the figure. As shown in the graph, a value (element 30b, 30c, etc.) is be produced before the value can be read by a reader X. The software language may comprise a rule repository comprising rules that can be stored on the computer readable media. For example, a first rule RI may require writers to be scheduled to run before any and all readers of any value or collection. Stated differently, a value must be produced before it can be read.

Figure 31:
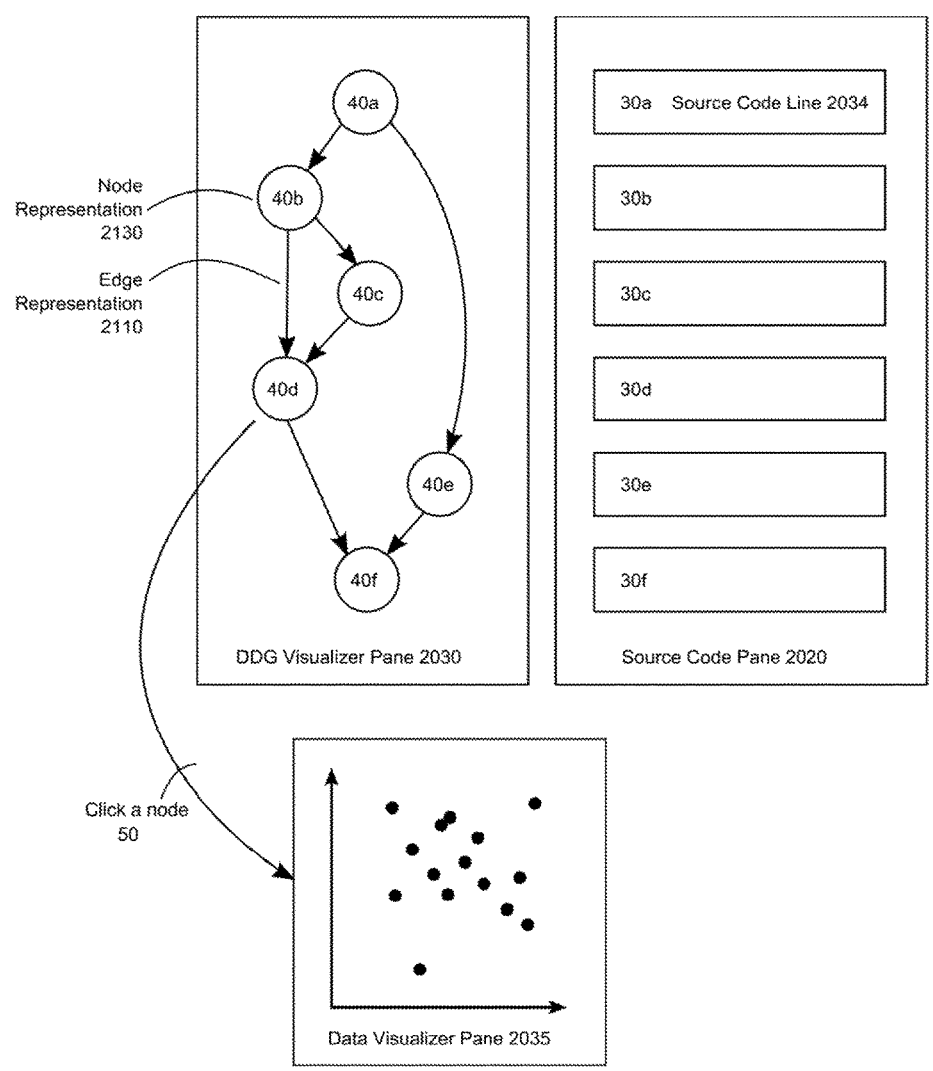
FIGS. 31 and 32 are schematic illustrations of how a DDG node representation may be dragged up as high as the lowest upstream dependency node and as low as the highest downstream dependent node.

FIG. 31 illustrates an IDE showing a DDG visualizer pane 2030 and a source code pane 2020. 30a-30f are source code lines 2034. AG pane 42 and a Source code pane 41. Clicking 50 on a node will cause the data visualizer pane 2035 to appear. This is a pluggable visualization of data as it flows through that node (scatterplot, bar graph, spreadsheet view, etc.) Node representation 2130 is pointing to 40b, and 40A, 40c, 40d, 40e, 40f are other node representations. Edge representation 2110 is also shown.

Figure 32:
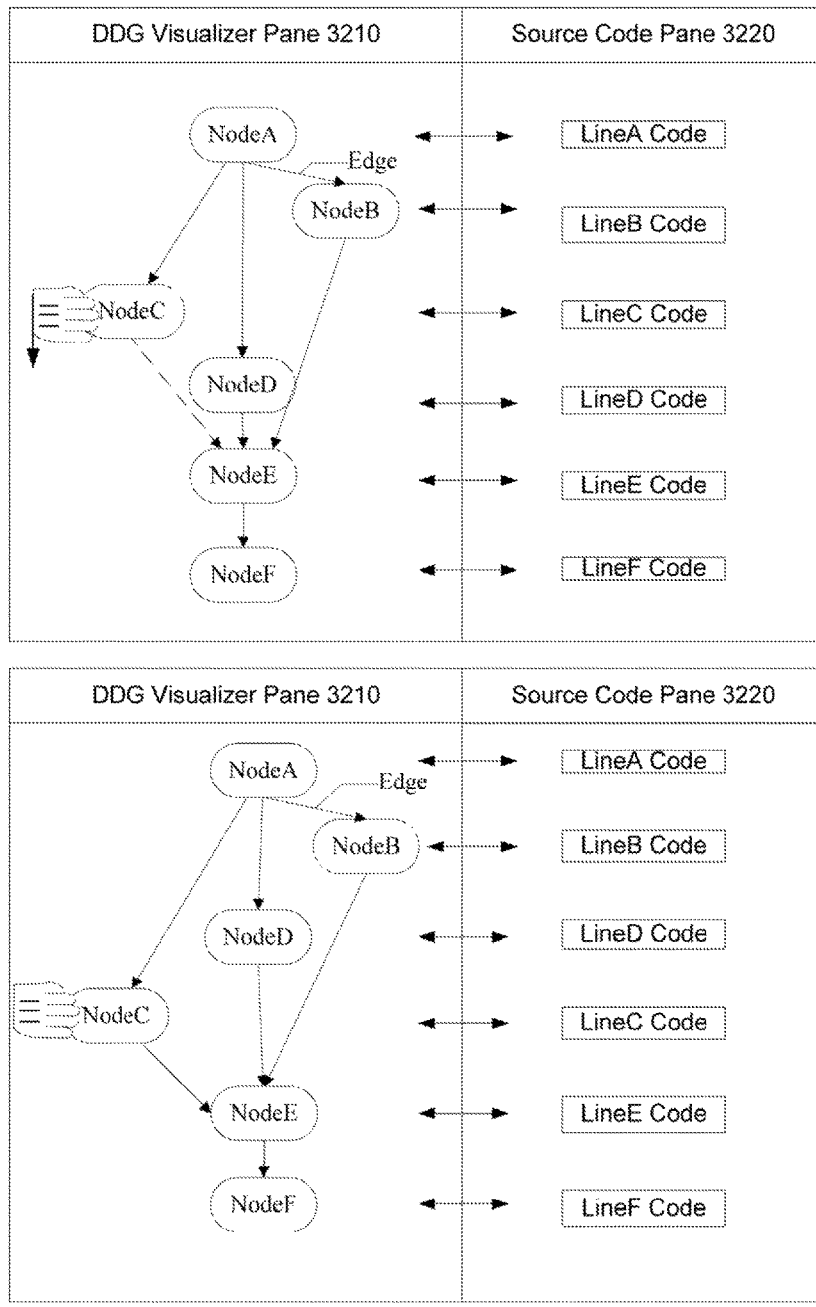

FIG. 32 shows a DDG Visualizer Pane and a Source Code Pane 3220. Each Node (NodesA-F) has a corresponding line of code. The hand shown on the left in the DDG visualizer pane is illustrating of mouse click and drag operation. Dragging Node C below NodeD, causes the Source Pane 3220 to adjust the vertical distribution of LineD and LineC to stay in line with the updated node position.

Systems and Methods

This patent describes systems and methods for parallelization of program code, interactive data visualization and graphically-augmented code editing, including systems and methods for constructing, editing, compiling and executing parallel programs, systems and methods for determining the data dependency graph (DDG) of a program, systems and methods for determining whether the DDG of a program is a Directed Acyclic Graph (DAG), and systems and methods for visualizing the DDG of programs and the values computed by expressions in a program.

MapReduce is a common method for parallel computing today. The most common implementation of MapReduce is Hadoop. Map and Reduce are concepts from functional programming, so MapReduce maps well to the functional paradigm. Functional programming languages are by definition implicitly parallel. However, it is difficult for many programmers who are used to the imperative paradigm to be productive in pure functional programming languages. Also, the functional paradigm is not generally efficient for building MapReduce pipelines of the form commonly found in big data pipelines today, because pure functional code is not able to write values into locations (pushing or scattering values), it is only able to read values from locations (pulling or gathering values), i.e. computing values that may be read by other code. For example, to compute a histogram of values, a parallel imperative system with N processors would divide the list of values into N sub-lists, then would cause each processor to push values one at a time from their corresponding sub-list into the appropriate buckets, locking the bucket for exclusive write access during the write operation, optionally using thread-local storage and a local copy of the histogram to defer locking until the end of the operation. A pure functional implementation would either need to loop through the list of values once on a single processor, producing the output histogram based on values in the list as expected but not in a parallelizable way, or it would need to assign a subset of buckets to each of N processors, then each processor would need to separately iterate through the input list to populate the buckets, which leads to a duplication in the work of iterating through the input list, albeit while eliminating the need for locking.

In contrast, imperative languages are not implicitly parallel, because they are not inherently parallelization-safe: it is easy to create programs with race conditions and deadlocks in an imperative language. Code written in an imperative language by nature has side effects and value aliasing, due to the ability to store values in variables or at memory locations, so in the general case it is difficult to look at the source of a program and statically determine, when a value is to be read, exactly where that value would have been computed before that point in the program is reached. Therefore, it is difficult to determine the precise DAG of data dependencies of a program written in an imperative language until the program is actually run and it has been observed (by careful logging) where each value has been computed, and which previously-computed values were used to compute each subsequent value.

The functional and imperative programming language paradigms as typically defined are both Turing complete, and are therefore in the abstract sense computationally equivalent to each other: a Turing-complete programming language is a programming language that is able to simulate any other programming language or programmable system; it is a "fully capable" programming language, not fundamentally restricted in the computations it can perform compared to other programming languages. All Turing-complete languages can be used to implement the same algorithms, even though the specific mechanisms that can be employed to compute a specific result may differ significantly between different Turing-complete programming languages. However, when comparing functional and imperative paradigms from a more pragmatic point of view, and generalizing across all languages attributed to each paradigm, the imperative programming paradigm is a strict superset of the pure functional programming paradigm, since it is possible to program in "pure functional style" using a subset of the features of most modern imperative programming languages.

A DAG is a convenient representation of a set of computing operations to be parallelized. There are many reasons that building a DAG of operations is better described by a language designed for the purpose than by making library calls in a traditional general-purpose programming language in the functional or imperative paradigm:

1. A language implementation allows for static analysis and optimization of the parallel computing plan, by enforcing in the design of the programming language's syntax and semantics that the data dependency graph of every valid program must be statically determinable, so that the compiler may statically verify if the data dependency graph is a DAG, and so that the compiler is able to directly examine the DAG to look for opportunities for parallelization.

2. A language implementation allows the system unlimited scope in deciding how fine-grained or coarse-grained to make the parallel computing plan, by enabling the system to introspect within methods or functions, and not just parallelize at the granularity of functions, but at the level of granularity of individual operators within expressions. This enables the compiler to properly trade off between load balancing (keeping all processing resources busy whenever possible) and the overhead of task allocation, synchronization and communication (making sure that the task divisions are not so small that these overheads dominate, causing a loss in performance).

3. A language implementation allows the compiler to automatically produce the data dependency DAG from a program source, rather than requiring the programmer to think about and manually construct the DAG structure.

4. The compiler may report an error if the program contains any parallel-unsafe code, by checking if the data dependency graph is a pure DAG.

5. The compiler is free to automatically decide on an execution plan for any valid DAG structure without the programmer having to worry about the details of how their code is to be parallelized, by finding an optimal way of "slicing" the DAG into sub-DAGs, each of which can be executed on a separate processing node, maximizing the amount of work done on each node while minimizing communication between the nodes while respecting the partial ordering enforced by the DAG.

6. The programmer does not need to worry about whether an edge in the DAG (i.e. a reference in the program source) should be translated into a memory reference, a database lookup, or a network communication, freeing the compiler to choose any such lookup or communication method to obtain a referenced value or collection of values with a goal to minimize runtime by considering data locality, architectural topology, storage method latency etc.

7. The amount of boilerplate code in the program devoted to manually constructing a DAG is reduced to zero (because the DAG is automatically constructed, rather than being constructed using library calls).

In contrast with parallel computing libraries, declarative languages designed for building computational DAGs like Apache Pig's language Pig Latin are typically designed as replacements for SQL, i.e. they are declarative languages used to define execution plans for a series of MapReduce operations, and typically include built-in keywords for performing common operations such as filtering, sorting, joining, and transforming data elements in basic ways, but they are not typically designed to be general-purpose programming languages or to build the internal logic of nontrivial Map or Reduce operations, only to declare what Map or Reduce operations should be connected together in what ways. Instead, they typically include the ability to call out to User-Defined Functions (UDFs) so that mapper and reducer functions may be defined in languages such as Java, Python or Javascript for cases where more complex processing is required.

Lattice-Based Programming Language Paradigm

We introduce a new paradigm for building parallel computing DAGs, which we will refer to as "lattice-based programming" or the "lattice-based programming language paradigm". This paradigm benefits from being implemented as a language, not a library, automatically parallelizes a programmer's code with very little effort or thought on the part of the programmer while preserving parallelization safety, and can be implemented in a way that feels natural to programmers of imperative languages, not requiring programmers to stick to pure functional idioms or to have to learn a new, radically different language or programming style. In particular, lattice-based languages maintain the "push/scatter" capability of imperative languages and the ability to perform looping. We term this class of languages "lattice-based" because every valid program in a lattice-based language is DAG-structured, and a DAG of computing operations, connected to a virtual upper node representing initial inputs and a virtual lower node representing final outputs, forms a mathematical lattice after unused values are pruned away.

Lattice-based languages may be a strict subset of imperative languages (requiring a precise restriction in syntax and semantics relative to the imperative paradigm, as described below, to obtain the largest strict subset of an imperative language that is automatically parallelizable or implicitly parallel). Lattice-based languages may also be a strict superset of pure functional languages (adding, relative to the pure functional paradigm, the ability to push or scatter values to locations or to perform looping). In lattice-based languages, the DDG of a program is statically determinable, and in all valid programs the data dependency graph is a DAG.

The equivalence between automatic parallelizability and the data dependency graph of the program being statically determinable can be illustrated as follows: it is necessary to know the data dependency graph at compiletime if the compiler is to reason about which values can be computed in parallel, so that a parallel execution plan can be computed. To compute a parallel execution plan, it is sufficient to know the data dependency graph at compiletime, since the data dependency graph by very definition gives a partial ordering of execution. Any valid execution plan that respects that partial ordering, including a maximally parallel plan, will compute the correct result. Thus the source code of any valid lattice-based program is the data dependency graph of the program, and the compiler is free to parallelize the code.

The precise minimal necessary and sufficient restriction that must be placed on the imperative paradigm to create the lattice-based paradigm, or features or mechanisms that must be added to the functional paradigm to create the lattice-based paradigm, are collectively refer to as the Lattice Paradigm Syntactic Constraint (LPSC). In the case of restricting the imperative paradigm, the LPSC involves enforcing one or more of the following constraints:
1. The removal from the imperative paradigm of the ability to depend upon specific values at runtime whose identity or origin cannot be determined at compiletime.
2. The removal from the imperative paradigm of the ability to read the current value of a variable. (It is only when the current value of a variable is read that it can be known which specific previously-computed value is being referred to, since the value could have been changed at some unknown prior point or points in time by the current thread or some other thread before it is read.)
3. The removal from the imperative paradigm of the ability to irreversibly overwrite one value with another. (The ability of imperative languages to overwrite values makes it impossible in the general case to determine the data dependency DAG without actually running the code.)
4. The scheduling of all readers of a value or collection of values so that they will run after the value or values have been produced by the writers that produced them, such that any value or collection of values computed by the program has either one writer and zero readers, or zero writers and one or more readers, and such that the readers cannot read the value or collection of values until they have been computed and/or written by the writer. The language must enforce this constraint statically (at compile-time) using appropriate syntactic or semantic constraint mechanisms. The runtime may also include dynamic support for scheduling of readers downstream of writers, enabling a data dependency DAG to be built at runtime, and data-driven computations to be scheduled in parallel where possible while respecting the partial ordering of data dependencies in the DAG.

In the case of the pure functional paradigm, in which a program expression is only able to refer to immutable values, the LPSC is enforced by adding one or more of the following syntactic and semantic mechanisms to a language:
1. A mechanism for reading the value of a variable at a specific timestamp, where a timestamp could be a literal timestamp, an iteration index or a recursion frame reference. The timestamp could be concrete (corresponding with a wallclock timestamp) or abstract/algebraic (manipulated as a symbol e.g. t, and reasoned about relative to other relative symbol timestamps using some simple non-identity function of the symbol, e.g. t−1). This yields the ability for the language to implement iteration (an imperative feature that is not generally supported by pure functional languages, due to their hard immutability constraints on values). This can be implemented syntactically using subscripts (e.g. $x_1$), array index-like references (e.g. x[t]), or some other method that refers to a specific variable version (e.g. x@t). For example, a reference to a variable x that can change across loop iterations, where a variable that increments in each loop iteration is i, could define the value of x produced in the current iteration as a function of the value computed in the previous iteration using a syntax like x[i]x[i−1]*2, indicating (using mathematical notation) $x_i=2x_{i-1}$. By specifying "timestamps" or version indices, it is always clear which specific immutable value of the variable is being referred to by any given expression. Note that one or more base cases may need to be specified, for example if i runs from 0 to n−1 during n iterations of the loop, then the programmer will need to define x[−1]=1 or similar as "sentinel value" or, or x[0]=1 as a base case for induction, so that the first value x[0] and subsequent values x[1] . . . x[n−1] are able to be computed.
2. A mechanism for referring to and reading the set of all values a variable will ever take on. This causes the type system of the language to constrain the variable to be a collection of values. This feature allows a "variable" to be a "receiver" of data items from multiple origins, or alternatively, allows multiple DAG nodes to send (push or scatter) data items to a given single collection. This allows a language to support the "push" or "scatter" feature of the imperative paradigm, allowing for the creation of a coalescent push-based DAG structure, for example pushing values into specific histogram bins based on a bin key. This feature could be implemented by a "push operator" (e.g. "−>", used in the form val−>hist[key], or "<−", used in the form hist[key]<−val) or could be implemented in the semantics of the assignment operator in cases where the same histogram bin may be written to multiple times or from multiple places in the program (e.g. x<−3; x<−5). The type system may constrain the type of hist[key] to be a collection of values where appropriate rather than a single value. Operations that try to read from a collection downstream in the DAG will need to be of the appropriate type to deal with collections, not values, due to the type. If those operations are of the fold or reduce type, either the reducer function will need to be associative and commutative (allowing the collection to be unordered), or the collection will need to have an order enforced (e.g. a sort order).

By adding to the functional programming paradigm the ability to loop in imperative style while distinguishing between values produced in each loop iteration and push values to locations, lattice-based languages are able to remain implicitly parallel but gain the practical usefulness and usability of imperative languages.

Properties and Capabilities of Lattice-Based Programming Languages

The data dependency graph of every valid program in a lattice-based language can be statically determined, and the compiler can verify that the data dependency graph is a DAG or lattice (if a program's data dependency graph does not pass this validation step, the compiler will refuse to compile the program).

Being able to statically verify that a program's data dependency graph is a DAG or lattice gives rise to several important properties:

1. Automatic Parallelization:

Any execution orderings, including parallel execution plans, that respect the partial ordering of the DAG are valid, creating opportunities for parallelization. Parallel code may be generated, or parallel execution plans may be followed, across a wide range of potential parallel computing platform targets, including operating system or virtual machine threads/processes running on one or multiple cores on a shared memory machine, a GPU, networked clusters of processors or GPUs, Javascript threads/WebWorkers, FPGAs or custom ASICs produced programmatically via a hardware design language like Verilog or VHDL.

2. Static Analysis of Big-Oh Time and Space Complexity:

each node in the lattice represents a function or expression and a value or collection of values produced by that function or expression. Assuming we have a big-Oh space estimate for all upstream data dependencies in the DAG (i.e. a function that gives a bound or estimate for the number and size of the value or set of values produced at each node), then it is possible in most cases to derive a big-Oh space estimate for the amount of data produced by the function or expression at the current node. For example, if there is one upstream data dependency of a given node and it has space complexity O(N), and if the given node is applying an O(m)-time map function to each element in the collection to produce its own collection of the same size, then the time complexity of the given node is O(mN) and the space complexity of the generated collection is O(N). Thus, by induction given the estimated datasizes of inputs as base cases, we can produce a big-Oh time and space estimate for each node in a program lattice. This allows the compiler to substitute a set of constants representing the time and space cost of elemental computational operations, data lookups and inter-node communications for a specific architecture into the big-Oh time and space expressions for each node in a program, such that the estimates are more accurate for that architecture. The parallelization algorithm in the compiler may optimize overall runtime for the target architecture by creating a parallelization plan for the architecture after substituting in these constants. For example, the time cost (latency) of communicating over an ethernet link is very high compared to communicating via a shared memory mechanism or inter-core bus, so if computing nodes are connected via an ethernet network, the parallelizer should try harder to divide up the program DAG into sub-DAGs that can run on each node in such a way that the maximum amount of computation is performed per node and the minimum amount of data possible is sent over the network link. The compiler can find probable bottlenecks and performance hotspots before the program is run, and alert the programmer about these as possible optimization targets, and can estimate total runtime and per-node space requirements for a program, given a chosen parallelization strategy.

3. Automatic Memory Management:

With the data dependency DAG known at compiletime, the compiler can determine the precise origin of upstream values or parameters depended upon by a node, so the compiler can generate precise reference counting logic at the entry and exit points of the code representing each node in the DAG. When a value or collection of values at a given node is about to be computed, the generated code will allocate the memory for it. When all downstream nodes have read from that value or collection, it can be immediately freed. This frees the programmer from the error-prone task of manually allocating and freeing memory. (Generally, "freeing memory" here refers to releasing allocated RAM back to the system heap when no longer needed—RAM is typically at shorter supply than persistent storage. However, the ability to clean up intermediate values automatically via reference counting also extends to deleting temporary database tables, removing temporary files, etc. after those values have been consumed.) There is no need for a garbage collector, because the refcounting logic that is automatically inserted by the compiler is precise. The generated code can also require significantly less memory at runtime than in even a garbage collected system, because in a garbage collected system, when a large collection is created and used early in a long-running stack frame, but then not used by anything later in the lifetime of the stack frame, it continues to be referenced by the stack frame and therefore cannot be freed by the garbage collector until the stack frame exits. The programmer can manually insert lines setting the reference to null after its last usage, but this is a dangerous practice as other programmers may not notice the line setting the reference to null when the code is modified at a later date; also, having to manually drop references defeats the purpose of having a garbage collector. In a lattice-based programming language, the compiler (whether targeting a garbage-collected platform or not) can safely and automatically drop references immediately after last usage, freeing up memory and eliminating the need for the programmer to do this. Note that the system may choose to, or may be configured to, keep memory allocations (or write the contents of allocated RAM out to persistent storage) even after the last reference to a memory allocation is dropped, for the purposes of memoization. Reasons for choosing to memoize include optimizing code that is called frequently with the same parameters by producing a lookup table that maps from inputs to outputs, enabling "reactive programming style" where only downstream data dependencies are recomputed when a programmer changes a line, and as an aid in debugging, by keeping a snapshot of data that has flowed through or been processed by part of a program.

4. Memoization:

A DAG of computing operations can be thought of as a function mapping from the cross-product of all possible inputs of the uppermost nodes in the DAG (the domain) to the cross-product of all possible values computed by the lowermost nodes in the DAG (the codomain or range). Assuming that all the values in the domain are known (e.g. uppermost nodes contain literal constants, or can take an enumeration or known set of values of finite size) and assuming the size of the domain is tractably small, the set of possible domain values can be fed through the DAG by the compiler to produce the set of possible range values, then the entire DAG can be replaced by a lookup table of some sort that potentially incurs O(1) or constant-time lookup even if the cost of pre-computing the DAG was higher. This allows the computations in the DAG to be cached or compiletime-"memoized" by the compiler, slowing down compilation but speeding up runtime execution, potentially at the cost of extra space in the generated program binary (or requiring the binary to load or lookup the cached values from associated tables or databases). In effect, this collapses the DAG down to one node that implements a table lookup based on values received as inputs along incoming dependency edges, and producing a set of values as the output of the table lookup that correspond with values presented to the outgoing dependency edges, to be sent to or read by downstream dependencies. This process of memoization can be applied to any sub-DAG (connected subgraph) of a larger DAG or lattice, so the compiler is free to choose what regions of a program to pre-compute to speed up runtime performance, according to the compilation time/runtime/space tradeoff chosen by the programmer. Note that a particularly interesting application of memoization is in a collaborative code-editing environment, such as the IDE described below: the compute cluster can share memoization across multiple developers of a shared codebase, so that even if they are working on different branches of a program's source, the memoized values computed by any shared source code don't have to be recomputed more than once.

5. Partial Evaluation:

If not all values depended upon by a DAG are constant and therefore known at compiletime (i.e. if not all uppermost nodes or upstream dependencies are constant values or dependent upon fixed inputs, e.g. dependent upon a specific version of a specific file), then the memoization of a DAG can be partial: all sub-DAGs of a DAG that only depend upon constant values can be memoized and collapsed down into single nodes, leaving a DAG that depends on the non-constant inputs with as simple a computational structure as possible. This is a process of partially evaluating the program, or specializing the program given the fixed constants or fixed inputs.

6. Reactive Programming and Other IDE Features:

The compile-time availability of the data dependency graph of a program enables a number of powerful features in an Integrated Development Environment (IDE) that understands the DAG structure of the language. For example, the IDE may implement Reactive Programming, wherein if a programmer changes a line of code, only the data dependencies downstream of the changed line are recomputed (the upstream values are cached or memoized, so do not need to be recomputed). This allows the IDE to be continually running the code as the programmer is changing it, which, combined with visualization capabilities, fuses code editing with realtime data visualization. Building Reactive Programming into the IDE for a lattice-based programming language is described in more detail below.

7. Integrated Testing Framework:

As mentioned above, any sub-DAG of a program lattice can be memoized and turned into a table lookup that maps from the cross product of inputs to the cross product of outputs, and the sub-DAG can be replaced by a single node that represents the operation of looking up the memoized value to determine the correct output(s) given those inputs. It is possible to set up a testing framework for a lattice-based language that allows the programmer to specify input-output pairs for any sub-DAG in the program, and every time the program is compiled, the testing framework feeds the inputs into the chosen sub-DAG and compares the computed outputs to the expected outputs specified by the programmer. The compiler will report an error if any of the tests fail.

Integrated Development Environment (IDE) for Lattice-Based Languages

A lattice-based programming language can be used from a plain text editor and a commandline compiler, but the compile-time availability of the data dependency DAG of a program enables a visual editor or Integrated Development Environment (IDE) to add some particularly powerful features that help the programmer in developing a program:

1. Augmentation of Program Source with Data Dependency DAG:

The program source view, a text-based view, can be augmented to show the data dependency DAG in the margin. Typically in an implementation of a lattice-based programming language, one statement in a program will produce one value or one collection of values, which corresponds at some level of granularity with a node in a DAG. (Expressions or terms within a statement could also be treated as finer-grained DAG nodes for purposes of parallelization, but for visual display, the IDE may choose to display one DAG node per statement or line.) In the margin of the text editor, these nodes are drawn connected with dependency graph arrows that can either point backwards towards data dependencies, or perhaps more intuitively, point forward from a dependency node to the node for the expression that depends upon that dependency. With the source view augmented in this way, it is easy for the programmer to quickly locate data dependencies in the program source—they can simply follow the arrows.

2. Code Reordering:

With the DAG-augmented source view, it is possible to reorder lines in the program by simply grabbing the node corresponding to a line with the mouse and dragging it upwards to any position below the lowest upstream data dependency or downwards to any position above the highest downstream data dependency (assuming that the language requires dependencies to be listed higher in the source than the things that depend on them; this constraint is not actually required once the data dependency DAG is known: the lines could technically be in any order, although this would be confusing to programmers). This capability makes it easy to rearrange code in a more "tactile" way. (This also illustrates that the serial ordering of program lines in programming languages is largely artificial: the programmer is in effect running a topological sort of data dependencies in their head to put lines in one of many possible orders that compute dependencies before the things they depend upon 3. Adding Data Visualization to Augmented Source View:

The DAG-augmented source view in the IDE can support the user clicking on a DAG node to pop up a visualization of data computed by the node (for batch-style computations) or passing through the node (for streaming-style computations). This visualization can be switchable or pluggable; for example, for a collection of tuples consisting of a pair of floating point values, the visualization could be switched between a spreadsheet-like view and a 2D scatterplot, or any one of a number of other relevant chart types. The type system of the language, and any information about the set of all possible values that may be assumed by a node in the DAG (the domain of the node) can be used to determine which visualizations are valid and relevant for displaying the data type of the node. The rendering of data into a 2D or 3D visualization can be implemented in the programming language itself, and thereby the rendering can happen in parallel using the same runtime system.

4. Partial Compilation:

Given precise knowledge of the data dependency DAG, as a program is changed, it becomes significantly easier to determine what parts of a program are affected by the change. This makes it possible in many cases for the compiler to recompile only the parts of a program that have changed, and to splice the resulting code in place of the old discarded code.

5. Reactive Programming:

Once memoization and partial compilation are in place, it becomes possible to implement the Reactive Programming model on top of the IDE, wherein as a programmer changes code in a program, the IDE finds the downstream transitive closure of the changed lines, and only recomputes the values of the DAG nodes corresponding to the changed line and its downstream dependencies. Memoization is used to avoid recomputing the values at nodes upstream of any nodes in the transitive closure. This means that as a programmer changes a line of code, the code execution can restart immediately at the changed line. Combined with IDE support for data visualization, the programmer can directly, and in many cases instantly, observe the local and downstream effects of changes they are making to the code. This fuses code editing with data manipulation and visualization, reducing the latency of the write-run-debug cycle to effectively zero. This has the potential of dramatically improving programmer productivity and dramatically reducing program error rates, because the effect of any errors should be immediately visible in the DAG node visualizations as code is being written or modified.

Comparison of Lattice-Based Programming to Other Programming Models

Over the past several decades, many attempts have been made to produce a visual programming language that allows the programmer to build a program by drawing the program structure as a graph or flowchart of some form. LabView is a particularly famous example of this paradigm, and allows a programmer to construct a program in the form of a circuit diagram or process diagram.

In theory, it should be significantly simpler to program graphically rather than textually, because the human visual system has the highest bandwidth, the most powerful feature perception capabilities across many different feature types (color, shape, size, orientation, texture, intensity, movement etc.), and the strongest connection to higher-order cognitive processing of all our senses. Traditional programming, using text, requires information to be filtered and preprocessed through our "reading comprehension" brain centers before handoff of the information to the cognitive processing centers that reason about the program being written. Nevertheless, it has been discovered that humans find it particularly hard to understand programs in flowchart form. For this reason, in the described IDE, the primary mode of editing the program is textual, and the graphical display of the program is merely provided as a powerful auxiliary means of understanding the program structure and its effect on data, as opposed to as the primary means of editing the program.

Prior graphical programming languages also suffer from their similarity to the flowcharting paradigm in their use and interpretation of program graphs. It is well-known that flowcharting, where an edge can be added between any two nodes, in particular creating cycles, leads to spaghetti code. This is precisely why the GOTO and GOSUB keywords, common in languages in the 1960s to the 1980s, were considered harmful[1] and have not been included in more modern languages: the programmer was free (using these keywords) to construct an arbitrary control flow graph in the program source. Flowcharting was popularized for many decades last century as a way to visualize and plan out process flow, but its usage died out in the 1990s as it came to be understood that this paradigm produced designs that were too spaghetti-like to be clearly understood for any non-trivial problem.

[1] Go To Statement Considered Harmful, Edsger Dijkstra, Communications of the ACM, March 1968

A newer paradigm for graphical programming, dataflow programming, as well as a specific type of dataflow programming known as Flow-Based Programming (FBP), differs from the lattice-based programming paradigm. A wide range of techniques may be referred to as dataflow programming or FBP, but in general, a dataflow programming language describes a series of operators connected by channels along which data can flow. In particular, the graph of a dataflow program indicates the structure of the computing system, but lattice-based programming describes the structure of the data computed by the system. A dataflow system typically describes graph edges as communication channels, whereas a lattice-based system describes edges as data dependencies, which may be converted into database lookups, memory references or communication channels at the discretion of the compiler in order to achieve optimality goals. A dataflow system may be used to build a system that contains dataflow loops, where data can potentially flow around the same loop multiple times, whereas loops in lattice-based programming are simply algebraic constructs (recurrence relations) that correspond with a nested DAG pattern being unfolded a number of times until loop termination. In dataflow programming, if the loops are unrolled by tracing the data passing through the program, the graph of the trace can be different from the dataflow graph set up by the programmer, whereas in lattice-based programming, the program itself is the dataflow graph. Parallel dataflow languages need to address the issue of the scheduling and coordination of multiple data items potentially reaching the same processing node at the same time, whereas lattice-based programming languages are concerned with scheduling computations in such a way that the execution plan respects the partial ordering of data dependencies of the program.

Prior work has described systems for allowing a programmer to work with a code while observing in realtime the effect of the code changes on program output and/or values passing through or being computed by a program. However, in contrast to the IDE described for lattice-based programming, these systems do not include a graphical representation of the data dependency graph of the program, and do not therefore link visualization of data flowing through or being computed by a program to the program structure. They also do not describe methods for visualizing collections of values, such as visualizing 2-dimensional floating point tuples as a scatterplot. They do not address memoization, partial evaluation or reactive programming. They are not based on an implicitly parallel language, and the program editing paradigms were not designed for the purposes of visualizing massive datasets as the program is edited.

Depending on whether or not the downstream DAG nodes that read from the collection need to have all values present before computing a result from the collection (for example, if the downstream node is a reduce operation that requires the values in the collection to be processed in sorted order before applying the reducer), then readers attempting to read from the collection, downstream in the DAG, may block until the last value has been written to the collection and the collection is finalized. In this way, all computing operations upstream and downstream of the DAG may be properly sequenced. The language may choose to always block downstream reading until a collection is finalized, or it may track the algebraic properties of downstream computations, for example if a downstream reducer is known to be associative and commutative, then the order of the collection does not matter, so there is no need to block, and values can be sent downstream for continued computation as they arrive.

A MapReduce operation may also include a combine step, where the programmer attaches a copy of the reducer to each mapper, performing partial reduction within each mapper thread or node, potentially dramatically reducing the amount of data that needs to be shuffled and sent over the network to the reducers. Note that in using a combiner, the programmer is asserting that the reduce function is associative and commutative (otherwise partial reduction would not be possible). There is no MapReduce system in prior art where the algebraic properties of reducer functions are automatically determined to (i) decide if adding a combiner will produce correct output, or (ii) to automatically add a combiner to a MapReduce operation.

Current CPS and SSA system do not provide suggestions or teaching on how to optimally map that paradigm onto programming language syntax (form) or semantics (meaning) to give guarantees about parallelizability.

The computer may be configured such that it stores data and instructions in different or separate memory locations or structures. E.g. data may be stored in an external server comprising a database, and instructions may be copied into volatile memory from a local hard drive in the computer.

Some of the features of the instructions help ensure that all writing may be scheduled to run before any reading (e.g. there should only ever be one writer and no readers, or zero writers and any number of readers of a given value, and the compiler should ensure that no value can be read before it is written). A read write controller syntactically guarantees that only readers or writers exist at a specific time. This guarantee makes it possible to guarantee that a data dependency graph can be reasoned about at compile time. Syntactically guaranteeing makes it possible for the compiler to determine if the data dependency graph is a DAG or not. The listed sub-clauses are a means of accomplishing this end goal, but this is not necessarily an exhaustive list of sub-clauses.

A timestamp may be a local timestamp or version number. For example: the time stamp may be a purely algebraic or symbolic version number that the compiler may reason about, using some abstract symbol or formula, referring to the current loop index or some previous or next index, as opposed to a specific numbered version. Pushing or scattering may comprise pushing or scattering a set of values into one or more collections, possibly according to a key associated with each value. Reducing the collections may reduce a collection of values into a single value by applying a reduce or fold function to the elements of the collection. An example of a fold function includes automatically converting the fold function into a parallel fold function if the function is known to be commutative and/or associative. A push operation may require the resulting collection to be unordered, so that elements can be processed in an indeterminate order. Folding or reducing does not require the collections to be unordered. If the collections are in an unknown order, some configurations may require the fold or reduce function be configured to handle values in an indeterminate order and still generate the same result, so the fold or reduce function must be commutative. For a push or scatter operation, the compiler may be configured to generate the appropriate communication and/or synchronization logic automatically so that different parallel computing units (e.g. processors, cores) may concurrently push values into collections with matching keys. The appropriate communication may include memory references or network communication. The synchronization logic may be accomplished using locking, some lock-free data structure, or by each computing element creating its own set of buckets that contain the values it individually produces, followed by a single locking merge step at the end to merge all the individual bucket instances together for each unique key, in order to reduce intermediate lock contention.

A node visualizer may be configured to allow the data produced by the line or expression corresponding to a given node to be visualized using some graphical or textual data visualization method appropriate for the data type of the node. The node visualizer may interface with the storage media to cache values or collections of values produced at each node. This step of caching may allow performing partial recomputation of subsets of a program's DAG based on previously-computed values. The node visualizer may trigger a partial recompile of a subset of a program's DAG. The node visualizer may trigger a partial re-compile of a program's cached values that lie at or downstream from changed lines or expressions in the program. The node visualizer may find the nodes in the program DAG that lie downstream of the node corresponding to the changed line or expression. The node visualizer may provide an interface for the user to edit a program's source code and have the result value or collection for each changed line or expression recomputed immediately (i.e. the result value for the line or expression (and visualized as a "node") is recomputed by the processor and displayed in the lattice visualization), followed by updating the accompanying visualization for the corresponding node in the program DAG, and beginning a recompute of any downstream data dependencies in the DAG, enabling realtime fusion of programming, program execution and data visualization by means of partial evaluation, using the mechanisms described above.

Programming Language Constraints to Allow Automatic Parallelization.

A computer comprising a processor and tangible computer readable storage media is disclosed. The storage media may comprise a programming language.

A computer comprising an exemplary programming language stored on computer readable media may have ten exemplary functions of the language are shown (F1-F10), but languages generally have hundreds if not thousands of functions.) Function F1 is a function to read the current value of a variable (ReadCurrentVal). Figure X+1, shows the same language but with F1 replaced with G.

Starting with our exemplary language, that contains all the other standard functions F2-F10, except instead of having F1 (the ability to read the current value of a variable), the modified language has G. G has several functions. G1 provides a function for the programmer to read the only value that a variable will ever take on (e.g. immutability) (ReadConstantVal). Adding this ability allows pure functional programming methods to be employed. If a programmer declares Y1 as a constant and assigns it the value of 5, the programmer could use G1 to read the value of Y1. At this point, we have a computer programming language stored on computer readable media comprising a plurality of functions, not comprising ReadCurrentVal or any equivalents, but comprising ReadConstantVal).

If we add the ability to read the value of a variable at a specific timestamp (ReadConstantVal@TimeStamp) (e.g. recurrence relations), we are restoring the ability to create looping constructs in the language, because the current or next value of loop variables can be set as functions of previous or current loop variable values respectively, e.g. $x'=x+1$, or $x[t]=x[t-1]+1$.

Finally if we add in the ability to read the set of all values that a variable will ever take on (e.g. push/scatter) (G3 ReadAllVals), we are left with a language that has the ability to push or scatter values into unordered collections, e.g. to push values into bins based on some key, e.g. 1->counts [key]. These collections may then be reduced to produce a single value (G4 Reduce). How is this done, if the variable can have different values at different times? This feature (ReadAllVals or Reduce?) directly enables a large subset of imperative-style programming. A writer would be required to complete its writing and the collection must be finalized before any readers begin to read.

The type system must constrain the type of any collections that are recipients of push operations to be unordered, and any fold or reduce operations applied to those collections must assume the collections are unordered (and therefore the function being applied to reduce the collection must be commutative). The scatter operation also directly supports, and may be mapped onto, MapReduce-style computation, since it is equivalent to the shuffle step in MapReduce.

Thus the instructions stored in the computer of Figure X+1 include F2-F10, and instructions: fixed variable reading G1, time based variable reading G2, push/scatter reading G3, single value reduction G4, a fold operation G5, and a map function G6.

The partial ordering is a lattice if all inputs and constant values are connected to an "input state" least upper bound and all outputs are connected to an "output state" greatest lower bound.

In prior art systems that create DAGs, some of these system would create a DAG that had race conditions and/or deadlocks. The software language X and/or computer X running the software language may be configured so that the possibility of race conditions and deadlocks are eliminated. The definition of the properties of a DAG may provide for this elimination.

When invoking the compiler to compile source code, the compiler is free to parallelize the code in any manner consistent with the partial ordering of operations in the data dependency graph. Examples of manners consistent with the partial ordering of operations in the data dependency graph include running in parallel any two nodes that do not have a directed path between them, as well as pipelining operations that are connected by a directed path.

The method also helps ensure that the compiler can generate reference counting code automatically. The method therefore ensures that the programmer does not need to manually allocate or free memory. There is no need for garbage collection (e.g. a routine that frees memory by . . . ). Memory is allocated (allocated by what?) for a node's "bottom half" (what is a bottom half and top half?) (the value or collection of values) once all its dependencies have been computed and are available, and memory for the node is freed once all the downstream dependencies have read from this node. This eliminates the possibility of many memory-related programmer errors, e.g. segmentation faults, dangling pointers, etc.

Computational Model and Method of Parallelization

Each node in a program lattice may comprise a "top half", an expression, and a "bottom half", a value or collection of values FIG. 30. Nodes may be connected to other nodes with arcs or dependency edges. Dependency edges specifically represent data dependencies, although they may be turned into lookup operations or data communications by the compiler.

Define Big-Oh Time and Space Complexity

The Big-Oh time complexity of the top half of the node and the Big-Oh space complexity of the bottom half of the node may be estimated as a function of input data sizes and values. A Big Oh Generator may be used to create a Big Oh Profile comprising time and space complexity.

The compiler may have several backends targeting different parallelization architectures, with a Big-Oh cost profile for each elemental computation, synchronization type, lookup operation and communication. Profiles may be used to choose between different parallelization strategies for a given target architecture. Thus the compiler may compile the code and parallelize the code (e.g. form a different binary depending on the executing computer configuration) differently depending on the target architecture e.g. the hardware of the computer targeted to execute the code. Examples of target architectures that should be supportable with this system include, but are not limited to, pthreads for shared memory multicore machines, CUDA or similar for GPU computation, Hadoop or MapReduce for cluster computing, Javascript WebWorker threads for parallelization in the browser, and Verilog/VHDL for compiling straight to FPGA hardware.

A slicer will take a program lattice and a Big-Oh profile for the target architecture, and will produce a parallelization plan, effectively splitting the lattice into sub-lattices that will run on each node. Edges within a node's sub-lattice will be turned into data lookups, edges between two nodes' sub-lattices will be turned into communications.

The compiler may make optimization tradeoffs either at compile-time, or may emit code that can switch between different algorithms at runtime based on input data sizes or data values.

The compiler may be configured to choose between not just alternative parallelization strategies (including serial vs. parallel implementations), but also different equivalent data structures with different per-operation Big-Oh complexity profiles (e.g. a linked list vs. an ArrayList). This choice may employed by use of a parallelization optimizer that contains a rule engine to make this decision.

The slicer may also be used to produce optimal client/server code (what does optimal mean here?), by automatically determining which code should run in the client and which code should run in the server in order to move computation as close as possible to the data it depends upon, and to minimize network communication. The slicer effectively chooses an API boundary (what's an API boundary and why is it relevant?) and generates the API and all RPC code automatically.

Any sub-lattice may be thought of as a morphism (from category theory), effectively a mapping from a domain to a range. Function evaluations and map lookups may be treated the same way. The compiler should track, wherever possible, the domain and range of each morphism and sub-morphism within the program.

Morphisms may be completely or partially evaluated if values are available statically, and/or if the size of any morphism's domain is small. This allows some of the burden of running the code to be offloaded from the runtime to the compiler, so that the compiler produces "lookup tables", effectively collapsing down a morphism like an accordion into a flat map lookup. Examples of this offloading (an offloaded and nonoffloaded example) and how it performed and how the resulting output is different will be helpful. The user can "turn a knob" to tradeoff between runtime efficiency and the size of the generated binary/the time required to compile it.

Iteration is an unfolding of multiple copies of a morphism until termination, with the next values of loop iteration variables in the range of one copy of the morphism connected to the current value of the corresponding loop iteration variables in the domain of the next copy of the morphism. Recursion is the nesting or morphisms inside morphisms, expanding until termination.

As well as tracking the domains and ranges of morphisms, and the orderedness of collections, the compiler should track the algebraic properties of functions (associativity, commutativity, idempotence etc., but not limited to these properties).

The algebraic property tracker allows the compiler to know when it safely has the freedom to split and reorder operations.

The compiler may be configured to track associativity and/or commutativity by either partially evaluating the function across all domain values if its domain is small and its runtime is not large, or by expanding and canceling like terms in f(f(a, b), c)==f(a, f(b, c)) and f(x, y)==f(y, x) respectively (relying on the known associative and commutative properties of built-in functions as base cases for recursion). It is probably uncomputable in the general case to check associativity and commutativity, but these two methods should suffice for a large range of possible functions.

Tracking the algebraic properties of functions is particularly useful in the case of constructing reducers or performing fold operations, because (1) the result of a push or scatter operation (as described previously) can only be reduced by a commutative function, and (2) the compiler may render the inherently serial reduce operation into an inherently parallel divide-and-conquer parallel fold operation if the function is associative.

Once the compiler runs a reducer analysis module to determine whether a reducer is associative, or commutative, and can therefore be implemented as a parallel fold, the compiler can automatically turn the reducer into a partial reducer and/or implement mapper-reducer fusion.

Partial reducers: Any given reducer can be split across as many computational nodes as desired (with their partial results combined at the end). And any one of those given partial reducers can handle partial reduction of an arbitrary number of keys. This solves the long-standing problem of properly load-balancing MapReduce jobs when the distribution of number of values across the reducer keyspace is non-uniform.

ii) Mapper-reducer fusion: may move these partial reducers into the same node as the mappers as shown in figure X using a local HashMap or similar for O(1) in-memory lookup, eliminating the shuffle step for all but the partially-reduced values from each of the partial reducers, dramatically eliminating how much data must be sent over the network. Illustration would be helpful. This eliminates a major bottleneck in MapReduce. It is pointless sending the output of the mappers over the network when, in many cases, a large number of key-value pairs will be very simply collapsed down into a single key-value pair by the reducer. With mapper-reducer fusion, using partial reducers, only one key-value pair per partial reducer is sent over the network to the final reducer, as opposed to in many cases billions of mapper outputs per key.

Tracking idempotence will yield provable guarantees on fault tolerance, because it will be possible to determine what code can be restarted from scratch with no deleterious effect.

Realtime Collaborative IDE and Data Visualization Workbench for the Described Language Building big data pipelines in exploratory or prototyping mode is a painstaking process, since often every time the code needs to be tweaked, the entire data pipeline needs to be left to run for another week. It may be difficult to analyze internal values computed within a big data pipeline. The internal values usually need to be "tapped off" by adding temporary code to the program to output a set of values to a file, which is then manually examined by the programmer to try to debug the program. The serial ordering of lines in a program's source code is largely artificial, requiring the programmer to "perform a topological sort in their head of the data dependencies in the program" (the programmer has to compute values higher up in a scope that will be used further down in the scope, but there is usually some freedom to reorder lines with no effect on the output of the program). Graphical and dataflow/flow-based programming languages have tried many different visual programming paradigms, none of which have achieved wide traction, because it is harder for the human brain to comprehend a program in graphical form than in textual form, in spite of the vastly powerful and visually-oriented capabilities of the visual cortex.

Additional Configurations

A computer comprising of one or more machines, each machine comprising of one or more processors, each processor comprising of one or more operating system processes or threads, hardware threads or execution units. The computer may comprise memory attached to one or more of the processors, including either volatile and/or permanent storage, embodied as, but not limited to RAM, SSDs, hard drives, files, databases, or networked data sources. The computer may comprise a communications bus or network interface attached to each processor, allowing for inter-thread, inter-processor and/or inter-machine communication, allowing for the transmitting of data and synchronization for the purposes of maintaining a specific ordering of computations. The computer may have (as a result of special programming in the memory providing instructions to the processors) the ability to accept program code and data, parameters or settings (collectively, "inputs"), potentially from outside the computer system via a network link or attached storage, the ability to run or execute program code to process the inputs, and to allow the program to produce output or outputs, potentially sending this output or these outputs outside of the computer system.

The computer may be configured to implement an instance of a compiler-interpreter that follows a programming language having a syntax: in which all the standard facilities of a functional programming language are present, and many of the standard facilities of an imperative programming language, but in which, relative to an imperative language, the constraints of the syntax eliminate one or more of the following: i. the ability to read the current value of a variable under normal circumstances, ii. the ability to write over and erase a still-visible old value at a memory location, and iii the ability to read from memory before the desired value is available at that memory location, by contractually guaranteeing that read operations will always be executed by the runtime after any write operations or calculations that are needed to produce the values to be read. The syntax may also be structured such that relative to a functional language, a "push operation" is added, which allows the user to insert a specific value into a collection, potentially from multiple different places in the program, or into an indexed bin or bucket (defined as a single collection in an indexed map from keys to collections) given an index key. Moreover the syntax may support a notation for specifying recurrence relations, allowing for looping constructs in the language without introducing value aliasing (i.e. allowing for the definition of a syntactical notation for looping without violating 2.i, 2.ii or 2.iii), The compiler-interpreter may configured such that it accepts a programming language of the above syntax, and builds a Data Dependency Graph (DDG), with nodes representing computed values or collections of values and arcs representing the referencing of those values or collections of values by dependent expressions. The compiler-interpreter may configured such that it is able to enforce the syntactic constraints of the language, including type system constraints, to ensure that the program is valid, in particular reporting an error if the DDG is not directly determinable from the source, or if the structure of the DDG is not a Directed Acyclic Graph (DAG), or if a non-commutative fold or reduce function is being applied to an unordered collection. The compiler-interpreter may configured such that it is able to use the expected cost of elemental operations (computations or communications) for a given target architecture to estimate the time complexity of the computation used to produce each node in the DDG in terms of the space complexity of its dependencies, as well as the space complexity of the result of that computation, and the time complexity required to reference the value or collection of values at one node from another node. The compiler-interpreter may configured such that it examines the structure of the DDG to find opportunities for parallelization where there is no directed path between two nodes, and examines the estimated time and space complexity of each node in the DDG to find an optimal division of the DDG into work units which may be scheduled to run on one or more processors to minimize expected total runtime while respecting constraints on the amount of memory attached to each processor. The compiler-interpreter may configured such that it is able to generate synchronization logic at the beginning and end of each work unit to ensure that the partial ordering of the DDG is respected as the work units are processed. The compiler-interpreter may configured such that it is able to generate memory allocation and deallocation logic at the beginning and end of each work unit to ensure that memory is automatically allocated before it is needed and deallocated once the last dependency has read from the value or collection of values stored in a given memory allocation. The compiler-interpreter may configured such that it tracks the algebraic properties of collections, such as orderedness, duplicity of elements, and sparseness, and functions, such as commutativity, associativity and idempotence, and is able to examine the algebraic properties of collections and the algebraic properties of functions applied to them to find parallelization opportunities beyond those directly determinable from the partial ordering of the DDG, for example turning a fold or reduce operation with an associative and/or commutative operator function into a parallel fold operation if the orderedness of the collection allows for a divide-and-conquer application of the operator. The compiler-interpreter may configured such that it is able to generate memoization or caching logic for each node in the DDG as needed so that the runtime environment may cache intermediate values produced by the program, and so that the GUI can support partial evaluation and reactive programming. The compiler-interpreter may configured such that it is able to generate Intermediate Representation (IR), byte-code or machine code (collectively, "object code") for the computations, synchronization logic and memory allocation/deallocation logic of each work unit. The compiler-interpreter may configured such that it is able to generate object code for just the parts of a program that have changed when a program is partially but not wholly changed ("differential compilation"). The compiler-interpreter may configured such that it is able to pre-compute and cache, memoize or produce a lookup table from any parts of a program that do not depend upon external inputs ("partial evaluation"), to include pre-computed values in the object code, and to constrain the size increase of the object code and the amount of computation time spent in pre-computation by the compiler according to settings that may be specified by the programmer.

The computer may configured to implement an instance of a runtime environment, wherein the runtime environment is configured to accept object code and inputs, and interpret, further compile or run (collectively "execute") object code on the target architecture. The computer may configured to implement an instance of a runtime environment, wherein the runtime environment is configured to monitor the execution of object code, allowing for the interaction with the code of a debugging environment, permitting the user or a program to inspect the running state of a program including any memoized values cached by the object code, allowing for the program to be paused and resumed, potentially in response to logical conditions, and allowing the enabling/disabling of memoization logic generated by the compiler. The computer may configured to implement an instance of a runtime environment, wherein the runtime environment is configured to "hot-swap" portions of object code by pausing the execution of a program and replacing part of the object code with a piece of compiled replacement code before resuming execution, and which is able to find from the structure of the DD (using the "downstream transitive closure" mathematical operator) all values that may have changed and therefore need re-computing as a result of the changed object code ("dirty values"), and restarting any computations that previously produced values that are now marked as dirty (wherein this whole process is termed "reactive programming").

The computer may configured to implement an instance of a program editor (or IDE) configured to present to a user a code-editing window ("the source panel") in which the user edits the program source. The computer may configured to implement an instance of a program editor (or IDE) configured to present next to a graphical display of the DDG ("the DDG panel"), in which a graph node is displayed at the same vertical position as each complete expression in the source panel, representing the value or collection of values generated by the complete expression, and in which arcs (directed edges) are shown connecting pairs of nodes if the value or collection of values computed by the expression corresponding to one node is a dependency of the expression corresponding to the other node. The computer may configured to implement an instance of a program editor (or IDE) configured to allow the user to drag a node in the DDG upwards as far as just below the lowest dependency or downwards as far as just above the highest dependent, resulting in the moving of the expression corresponding to the node upwards or downwards in the program source. The computer may configured to implement an instance of a program editor (or IDE) configured to integrate with the compiler and runtime environment, to compile and execute code in the background while the programmer continues to edit the code, and/or when the programmer explicitly initiates a save, compile or run/execute operation. The computer may configured to implement an instance of a program editor (or IDE) configured to provide inputs to the program, so that when the program is compiled and executed, potentially as the program is being edited, the programmer may view the intermediate and final values computed by the program. The computer may configured to implement an instance of a program editor (or IDE) configured to allow the user to select (click on or otherwise interact with or employ) one or more nodes in the DDG panel to display, in the same program editor window, in a pop-up dialog or in a different window, a visualization of the data computed by the expression or expressions corresponding to the selected node or nodes. The computer may configured to implement an instance of a program editor (or IDE) configured to provide compiler's support for differential compilation and the runtime's support for reactive programming to offer reactive programming to the programmer as the program is being edited in the program editor, such that as the programmer makes changes to the program, leaving the program in a new valid state, the new version of the program is differentially compiled, the downstream transitive closure of the code changes is found, any already-computed nodes in the downstream transitive closure of the DDG are marked as dirty, any ongoing execution to produce values in the dirty nodes is aborted, and the dirty nodes are scheduled to be re-computed. The computer may configured to implement an instance of a program editor (or IDE) configured to provide support for revision control for any or all of source code, object code, data, memoized/cached values and partially-evaluated code, using hashing and dependency tracking for reference counting so that revisions can be deleted when they have no remaining references to them. The computer may configured to implement an instance of a program editor (or IDE) configured to: provide support for networked collaborative editing by multiple users, including optional sharing of cached or memoized intermediate values, enabling sharing of the computational workload in a collaborative reactive programming environment while reducing duplication of computation and storage of the cached intermediate values.

It is hereby claimed:

1. A computer (100) comprising a processor (105); the processor comprising one or more cores (110 and 111) capable of executing instructions; non-transitory tangible computer readable storage media (130) connected to the processor (105); and a communications bus (120) or network interface for connecting the processor (105) to one or more additional processors (106); wherein the storage media comprises instructions to cause the processor (105) to execute (200P) in memory (140) a compiler-interpreter (200) for a language (151) stored in a language storage device (150), said language (151) conforming to a syntax (152); the compiler-interpreter (200) comprising: a syntax validator (210) configured to apply the syntax (152) of the language (151) to source code (134) of a program (133) written in the language (151) to validate (205P) the program (133); the syntax (152) including one or more operators (240) selected from the group consisting of: a push operator (250) and a recurrence expression (260); wherein the syntax (152) has syntax configurators (270) set to prevent destructively overwriting a current value of a variable or memory location.

2. The computer of claim 1, wherein the language is a functional programming language comprising functional programming language operators.

3. The computer of claim 1, wherein the language is an imperative programming language comprising restrictions on certain imperative programming language operators.

4. The computer of claim 1, wherein the compiler-interpreter (200) comprises a code generator (310) configured to use an index key (311) to generate code (312) that inserts values (316-317) into collections (315) or into indexed bins (400) or buckets.

5. The compiler-interpreter of claim 4, wherein specific values are pushed into a collection or into an indexed bin or bucket from multiple different places in the program.

6. The compiler-interpreter of claim 4, wherein the collection (315) comprises one or more values, and wherein the indexed bin or bucket is a map (410) comprising one or more mappings from a key (311) to a value (316) or to a collection (315) of values.

7. The storage media of claim 1, wherein the push operator (250) is configured to receive instructions from a user through a computer interface (105) to insert (530P) a specific value (520) into a collection (315) or into an indexed bin (400) or bucket given an index key (311).

8. The storage media of claim 1, wherein the recurrence expression (260) is a syntactic form that defines a sequence of values (610, 620, 630) using iteration or recursion, and wherein each further value of the sequence is defined as a function of values computed earlier in the iteration or recursion.

9. The storage media of claim 1, wherein the compiler-interpreter is configured to disambiguate (640P) values or variable references in loops (650) or recursive code (660) based on the recurrence expression (260).

10. The storage media of claim 1, wherein the compiler-interpreter comprises a DDG generator (730) configured to generate (730P) a data dependency graph (DDG) (700) having structure, the DDG comprising an implementation of nodes and arcs (710).

11. The storage media of claim 9, wherein the compiler-interpreter comprises a work unit generator (845) configured to generate work units, the compiler interpreter configured to generate a time and space complexity estimate of each node in the DDG to identify an optimal division of the DDG into work units comprising one or more nodes connected by arcs such that an expected total execution time of the program is minimized while respecting constraints on memory and storage available to each processor, wherein the work units are schedulable to run on one or more processors and have inputs and outputs.

12. The storage media of claim 9, wherein each node is linked with: an expression (910) for computing a value (920) or collection of values given the value or collection of values computed by data dependencies; and the value (920) or collection of values (930) computed by the expression.

13. The storage media of claim 11, further comprising instruction to instantiate an execution plan (860) comprising a partial ordering of operations to be executed, including launch logic (880) for launching operations in parallel across multiple processors or threads, and synchronization logic (890) for synchronizing these operations to conform to the partial ordering.

14. The storage media of claim 11, wherein the compiler-interpreter comprises a time and space estimator (1010) configured to estimate time and space complexity requirements to compute the value or collection of values for each node in the DDG as a function of the time and space complexity of the node's data dependencies.

15. The storage media of claim 9, wherein the compiler-interpreter may comprise a structural analyzer (1020) configured to analyze the structure of the DDG (700) to determine whether DDG has the structure of a Directed Acyclic Graph (DAG) consistent with a partial ordering or partially ordered set.

16. The storage media of claim 15, wherein the DDG generator 730 comprises an arc generator 740 connecting a first node to a second node whenever the expression in the second node is a function of, or accepts as input, the value or collection of values computed by the first node.

17. The storage media of claim 15, wherein the DDG comprises a first and second node; wherein the first node is a data dependency, the second node is a dependent node; and the dependent node requires the value or collection of values produced by the expression in the data dependency to compute its own value or collection of values.

18. The storage media of claim 15, wherein the compiler-interpreter comprises a code analyzer (1110) configured to identify parallelization in the code (134) opportunities beyond those directly determinable from the partial ordering of the DDG; said code analyzer configured to: compare algebraic properties of values or collections of values to algebraic properties of expressions or computational operations that operate on them; and from that comparison using a conversion analyzer (1140) determine whether it is mathematically valid to convert a serial, iterative expression or operation (1150) into a parallel divide-and-conquer form (1160).

19. The storage media of claim 18, wherein the compiler-interpreter comprises a property tracker (1160) to track algebraic properties of collections of values.

20. The storage media of claim 19, wherein collections of values have algebraic properties (1170) selected from the group consisting of: orderedness (1171), element duplicity (1172), element type (1173), and sparseness (1174).

21. The storage media of claim 18, wherein the compiler-interpreter comprises an error handler 1090 configured to report an error if: the DDG generator cannot generate (1050P) a DDG because the DDG is not directly determinable from the source code of the program, the structural analyzer (1020) determines the structure of the DDG is not a DAG, or an instruction analyzer (1080) determines that the program comprises an instruction applying an operator to a value or collection of values of incompatible type (1080P).

22. The storage media of claim 21, wherein the compiler-interpreter comprises an operator converter (1155) configured to transform a serial fold or reduce operation on a collection into a parallel "divide-and-conquer" reduce operation if conversion analyzer (1140) determines:
  a. the reduce operation is commutative, or
  b. the reduce operation is associative but not commutative and the collection is ordered.

23. The storage media of claim 18, wherein the expressions or computational operations have algebraic properties selected from the group consisting of: commutativity, associativity, distributivity, and idempotence.

24. The storage media of claim 15, wherein the compiler-interpreter is configured to receive an estimate of an expected time and space complexity of elemental operations and communications in a specified target architecture.

25. The storage media of claim 24, wherein the compiler-interpreter is configured to substitute the estimated time and space complexity for elemental operations and communications in a given target architecture into the time and space complexity estimates for nodes in the DDG to produce a more accurate estimate of time and space complexity for each node in the DDG on the given target architecture.

26. The storage media of claim 9, wherein the compiler-interpreter is configured to generate logic that automatically restarts and re-executes an idempotent computation if the computation is killed or terminated due to a system failure.

27. The storage media of claim 26, wherein the compiler-interpreter comprising a node path analyzer (1310) configured to: identify pairs of nodes in the DDG between which there is no directed path having an unbroken series of one or more arcs, and an execution plan generator (1320) configured to produce an execution plan (1330) for the program wherein the expressions linked to these pairs of nodes are scheduled to execute in parallel.

28. The storage media of claim 11, wherein the work unit generator (845) is configured to generate synchronization logic at the inputs and outputs of each work unit or at a beginning and an end of each node to ensure the partial ordering of the DDG is respected as the work units or nodes are processed or executed.

29. The storage media of claim 28, wherein the re-execution logic (1190) is configured to determine which expressions, computational operations or communications may be safely restarted on failure due to an idempotence property of linked nodes or work units.

30. The storage media of claim 9, wherein the compiler-interpreter is configured to receive an estimate of time complexity for arcs in the DDG according to the implementation of the arcs in a specified target architecture, selected from the group consisting of: reading from or writing to memory, reading from or writing to a database or file, and receiving data from or sending data to another processor over a communications channel.

31. The storage media of claim 9, wherein the compiler-interpreter is configured to receive: an estimate of size or space complexity for all inputs to the DDG; and an estimate of size or space complexity for constant value nodes in the DDG that do not have dependencies.

32. The storage media of claim 9, wherein the compiler-interpreter comprises a DDG analyzer (1315) configured to receive data concerning the arcs connecting a node in the DDG to its dependency nodes and dependent nodes; and generate memory allocation and deallocation logic for the nodes; wherein
  a. the memory allocation logic is configured to allocate memory for the intermediate values generated during the computation of the expression corresponding to a specific DDG node, and for the final value or collection of values generated by the expression, wherein:
    i. the memory allocation logic is configured to be inserted into the object code such that memory allocation logic executes before the code generated for the expression; or
    ii. the memory allocation logic is executed by the compiler-interpreter, an interpreter or a runtime environment before the expression is executed;
  b. the memory deallocation logic is configured:
    i. to free memory for the intermediate values generated during the computation of the expression corresponding to a specific DDG node once the expression has been executed, and
    ii. to free memory for the final value or collection of values generated by the expression once the final value or collection of values is no longer needed, wherein the memory allocation logic is:
      1. inserted into the object code such that it executes after the code generated for each dependent node of the specific DDG node has read the dependent node's dependencies; or 2. executed by the compiler-interpreter, an interpreter or a runtime environment after reading the dependencies for all dependent nodes of the specific DDG node.

33. The storage media of claim 9, wherein the compiler-interpreter comprises a code writer (1410) configured to generate executable code from the expression or computational operation linked to each node or work unit in the DDG.

34. The storage media of claim 9, wherein the compiler-interpreter is configured to: generate code from a data dependency represented by each arc in the DDG, wherein the compiler-interpreter is configured to: read from memory; write to memory; read from a database; read from a file; write to a database; write to a file; receive data from another processor over a communications channel; or send data to another processor over a communications channel.

35. The storage media of claim 9, wherein the compiler-interpreter comprises a cache generator (1510) configured to generate disableable memoization or caching logic (1520) for each node in the DDG.

36. The storage media of claim 9, wherein the compiler-interpreter is configured to compile code to reuse previously-cached values, or to reuse previously-cached values, whenever the same code is executed with the same inputs, to avoid recomputing values.

37. The storage media of claim 9, comprising instructions to cause the processor to execute a program editor configured to reuse previously-cached values to provide support to a user for partial evaluation and reactive programming.

38. The storage media of claim 9, wherein the compiler-interpreter is configured to generate object code for the computations, synchronization logic, memory allocation and memory deallocation logic, and restart-on-failure logic of each DDG node or work unit.

39. The storage media of claim 38, wherein the object code is selected from the group consisting of: intermediate representation (IR) code, bytecode, binary code, code in another programming language, logic circuit configurations, and machine code.

40. The storage media of claim 9, wherein the compiler-interpreter is configured to compare two versions of a program's source code to determine differences between the two programs.

41. The storage media of claim 9, wherein the compiler-interpreter is configured to perform differential compilation by generating differential object code corresponding to parts of the program that have changed between two versions of a program's source code.

42. The storage media of claim 9, wherein the compiler-interpreter is configured to interpret and execute the program directly from source code form that does not depend upon external inputs.

43. The storage media of claim 9, wherein the compiler-interpreter is configured to interpret or execute, then cache or memoize, any parts of the program that do not depend upon external inputs.

44. The storage media of claim 9, wherein the compiler-interpreter is configured incorporate cached or memoized values into generated object code as constant or lookup table (LUT) form.

45. The storage media of claim 9, wherein the compiler-interpreter is configured to read user-provided settings that specify how much overhead, in terms of compilation time, RAM, disk space or additional space that may be taken up in the generated object code, for evaluating portions of a program that do not depend on external inputs, and for storing the interpreted, executed or pre-computed instructions directly from source code form during compilation in order to trade off the size of generated object code and the amount of time spent by the compiler-interpreter in interpreting or executing code against total expected execution time of the generated object code.

46. A computer comprising a processor; non-transitory tangible computer readable storage media accessible to the processor; and a communications bus or network interface for connecting the processor to one or more additional processors; wherein the storage media comprises instructions to cause the processor to execute a compiler-interpreter for a language conforming to a syntax; the syntax including one or more operators selected from the group consisting of: a push operator and a recurrence expression; the compiler-interpreter being configured, by conforming to the syntax, to not attempt to read a value before the value is computed.

* * * * *